(12) United States Patent
Leddy et al.

(10) Patent No.: US 6,890,670 B2
(45) Date of Patent: May 10, 2005

(54) MAGNETICALLY MODIFIED ELECTRODES AS WELL AS METHODS OF MAKING AND USING THE SAME

(75) Inventors: Johna Leddy, Iowa City, IA (US); Pengcheng Zou, Iowa City, IA (US)

(73) Assignee: University of Iowa Research Foundation, Iowa City, IA (US)

(*) Notice: Subject to any disclaimer, the term of this patent is extended or adjusted under 35 U.S.C. 154(b) by 0 days.

(21) Appl. No.: 10/662,873

(22) Filed: Sep. 16, 2003

(65) Prior Publication Data

US 2004/0131889 A1 Jul. 8, 2004

Related U.S. Application Data

(60) Provisional application No. 60/410,812, filed on Sep. 16, 2002.

(51) Int. Cl.[7] .............................. B32B 9/00; B32B 5/16; H01M 4/36
(52) U.S. Cl. ...................... 428/692; 428/329; 29/623.1; 204/207; 427/127; 429/221
(58) Field of Search ................................ 428/547, 548, 428/557, 558, 570, 327, 329, 403, 504, 404, 405, 407, 692, 693, 900; 427/127, 129, 130; 204/155, 207, 211, 215; 429/10, 12, 40, 41, 209, 221, 223; 29/623.1, 623.5

(56) References Cited

U.S. PATENT DOCUMENTS

| | | | |
|---|---|---|---|
| 3,409,471 A | 11/1968 | Sturm et al. | |
| 3,811,952 A | 5/1974 | Siwersson et al. | 136/86 A |
| 3,853,628 A | 12/1974 | Fox | 136/86 D |
| 4,037,022 A | 7/1977 | Cheron | 429/10 |
| 4,201,827 A | 5/1980 | Heitkamp | 428/283 |
| 5,522,962 A * | 6/1996 | Koskenmaki et al. | 427/130 |
| 5,786,040 A | 7/1998 | Leddy et al. | 427/598 |
| 5,817,221 A | 10/1998 | Leddy et al. | 204/290 R |
| 5,869,200 A | 2/1999 | Nunnally | 429/10 |
| 5,871,625 A | 2/1999 | Leddy et al. | 204/290 R |
| 6,001,248 A * | 12/1999 | Leddy et al. | 428/692 |
| 6,106,963 A | 8/2000 | Nitta et al. | 429/19 |
| 6,207,322 B1 * | 3/2001 | Kelsey et al. | 29/623.1 |
| 6,303,242 B1 | 10/2001 | Leddy et al. | 429/10 |
| 6,322,676 B1 | 11/2001 | Leddy et al. | 204/296 |
| 6,355,166 B1 | 3/2002 | Amarasinghe et al. | 210/223 |
| 6,479,176 B1 | 11/2002 | Leddy et al. | 429/10 |
| 2004/0131889 A1 * | 7/2004 | Leddy et al. | 428/694 B |

FOREIGN PATENT DOCUMENTS

| | | |
|---|---|---|
| EP | 0980105 | 2/2000 |
| JP | 10106577 | 4/1998 |
| JP | 10106581 | 4/1998 |
| JP | 11323654 | 11/1999 |
| JP | 2000030743 | 1/2000 |
| JP | 2001155746 | 6/2001 |
| JP | 2001252553 | 9/2001 |
| WO | WO01/99127 A2 | 12/2001 |

OTHER PUBLICATIONS

Lois Anne Zook, "Morphological Modification of Nafion for Improved Electrochemical Flux," Thesis, Dec. 1996, pp. 1–134.

Nicholas J. Turro et al., "Magnetic Field and Magnetic Isotope Effects in Organic Photochemical Reactions. A Novel Probe of Reaction Mechanisms and a Method for Enrichment of Magnetic Isotopes," Acc. Chem. Res., 1980, vol. 13, pp. 369–377.

(Continued)

Primary Examiner—Stevan A. Resan
Assistant Examiner—Louis Falasco
(74) Attorney, Agent, or Firm—Fleshner & Kim, LLP

(57) ABSTRACT

The present invention is directed to methods for making magnetically modified electrodes and electrodes made according to the method. Such electrodes are useful as electrodes in batteries, such as Ni-MH batteries, Ni—Cd batteries, Ni—Zn batteries and Ni—Fe batteries.

56 Claims, 26 Drawing Sheets

OTHER PUBLICATIONS

W.B. Gu et al., "Modeling discharge and charge characteristics of nickel–metal hydride batters," Electrochimica Acta 44, 1999, pp. 4525–4541.

A.L. Buchachenko, "Magnetic Effects in Chemical Reactions," Russian Chemical Reviews, May 1976, vol. 45(5), pp. 375–390.

Johna Leddy et al., "Magnetic Ion Exchange Polymer Composites: Transport Enhancements Driven by Non–Uniform Magnetic Fields and Magnetic Moments of Transported Molecular and Ionic Species," $37^{th}$ Power Sources Proceedings, 1996, pp. 93–95.

Alexander H. Tullo, "Maintaining A Charge," C&EN Northeast News Bureau, Jul. 15, 2002, pp. 25–26.

Lester B. Lave et al., "Environmental Implications of Electric Cars," Science, vol. 268, May 19, 1995, pp. 993–995.

Robert F. Nelson, "Power requirements for batteries in hybrid electric vehicles," Journal of Power Sources, 2000, vol. 91, pp. 2–26.

D.A.J. Rand, "Battery Systems for Electric Vehicles—A State–of–the–Art Review," Journal of Power Sources, 1979, vol. 4, pp. 101–143.

Hongge Pan et al., "Effect of magnetization treatment on the electrochemical properties of $La_{0.9}Sm_{0.1}Ni_{2.0}Co_{3.0}$ electrode alloy," Journal of Alloys and Compounds, 2001, vol. 327, pp. 136–140.

Johna Leddy et al., "Magnetically Modified Fuel Cells," $39^{th}$ Power Source Proceedings, 2000, pp. 144–147.

Jianxin Ma et al., "New method to improve the electrochemical properties of hydrogen storage electrode alloy," SciFinder Scholar, Jinshu Xuebao, 2001, 37(1), pp. 57–60 (Abstract only).

V.I. Markarov et al., "Magnetic properties of powders, and their electrochemical activity," SciFinder Scholar, Tr. Novocherkassk. Politekh. Inst., 1970, 208, pp. 100–103 (Abstract only).

Masahiro Yamaguchi et al., "Effect of a magnetic field on the emf. of a Ni–MH secondary battery," Tohoku Daigaku Kinzoku Zairyo Kenkyusho Kyojiba Chodendo Zairyo Kenkyu Senta Nenji Hokoku, 1992, 329–333 (Abstract only).

Kanya Yamazaki et al., "Secondary nonaqueous electrolyte batteries containing magnetic additives," JP10106577, Apr. 24, 1998 (Abstract only).

\* cited by examiner

MAGNETICALLY MODIFIED ELECTRODES AS WELL AS METHODS OF MAKING AND USING THE SAME

The present application claims priority under 35 U.S.C. §119(e) of U.S. Provisional Application No. 60/410,812, filed Sep. 16, 2002, the disclosure of which is expressly incorporated by reference herein.

Part of the work performed during the development of this invention utilized U.S. government funds under grants Nos. CHE92-96013 and CHE93-20611 from the National Science Foundation, Chemistry Division, Analytical and Surface Science. The government may have certain rights in this invention.

BACKGROUND OF THE INVENTION

1. Field of the Invention

This invention relates generally to magnetically modified electrodes and methods of making the same. According to the present invention, magnetically modified electrodes exhibit improved properties compared to electrodes that are not magnetically modified.

2. Background of the Related Art

Bulk properties of molecules in magnetic fields are fairly well understood. In the detailed description of preferred embodiments, it will be shown that interfacial gradients in properly prepared composite materials can be exploited to enhance flux in many types of electrochemical systems such as fuel cells, batteries, membrane sensors, filters, and flux switches. First, however, the following discussion provides a brief overview of the current understanding of magnetic properties in composites. In particular, the discussion below summarizes the thermodynamic, kinetic and mass transport properties of bulk magnetic materials.

Rudimentary Magnetic Concepts

Paramagnetic molecules have unpaired electrons and are attracted into a magnetic field; diamagnetic species, with all electrons paired, are slightly repelled by the field. Radicals and oxygen are paramagnetic; most organic molecules are diamagnetic; and most metal ions and transition metal complexes are either para- or diamagnetic. How strongly a molecule or species in a solution or fluid responds to a magnetic field is parameterized by the molar magnetic susceptibility, $\chi_m$ (cm$^3$/mole). For diamagnetic species, $\chi_m$ is between $(-1$ to $-500) \times 10^{-6}$ cm$^3$/mole, and temperature independent. For paramagnetic species, $\chi_m$ ranges from 0 to $+0.01$ cm$^3$/mole, and, once corrected for its usually small diamagnetic component, varies inversely with temperature (Curie's Law). While ions are monopoles and will either move with or against an electric field, depending on the sign of the ion, paramagnetic species are dipoles and will always be drawn into (aligned in) a magnetic field, independent of the direction of the magnetic vector. The dipole will experience a net magnetic force if a field gradient exists. Because electrochemistry tends to involve single electron transfer events, the majority of electrochemical reactions should result in a net change in the magnetic susceptibility of species near the electrode.

Magnetic field effects on chemical systems can be broken down into three types: thermodynamic, kinetic, and mass transport. Macroscopic, thermodynamic effects are negligible, although local magnetic field effects may not be. Kinetically, both reaction rates and product distributions can be altered. Transport effects can lead to flux enhancements of several-fold. Quantum mechanical effects are also possible, especially on very short length scales, e.g., below 10 nm. The following summarizes what has been done with homogeneous fields applied to solutions and cells with external laboratory magnets.

Thermodynamics

A magnetic field applied homogeneously by placing a solution between the poles of a laboratory magnet will have a negligible nonexponential effect on the free energy of reaction. $\Delta G_m = -0.5 \Delta \chi_m B^2$ J/mole, where $\Delta G_m$ is the change of the free energy of reaction due to the magnetic field, $\Delta \chi_m$ is the difference in magnetic susceptibility of the products and reactants, and B is the magnetic induction in gauss. For the conversion of a diamagnetic species into a paramagnetic species, $\Delta \chi_m \leq 0.01$ cm$^3$/mole. In a 1 T (1 Tesla=10 kGauss) applied field, $|\Delta G_m| \leq 0.05$ J/mole. Even in the strongest laboratory fields of 10 T, the effect is negligible compared to typical free energies of reaction (~ kJ/mole). These are macroscopic arguments for systems where the magnet is placed external to the cell and a uniform field is applied to the solution. Microscopically, it may be possible to argue that local fields in composites are substantial, and molecules in composites within a short distance of the source of the magnetic field experience strong local fields. For example, for a magnetic wire or cylinder, the magnetic field falls off over a distance, x, as $x^{-3}$. The field experienced by a molecule 1 nm from the magnet is roughly $10^{21}$ times larger than the field experienced at 1 cm. This argument is crude, but qualitatively illustrates the potential advantage of a microstructural magnetic composite (as an example, in the magnetic/Nafion (DuPont) composites, a larger fraction of the redox species are probably transported through the 1.5 nm zone at the interface between the Nafion and the magnetic particles). These redox species must therefore experience large magnetic fields in close proximity to the interface.

Kinetics

Reaction rates, k, are parameterized by a pre-exponential factor, A, and a free energy of activation, $\Delta G^{\ddagger}$; $k = A \exp[-\Delta G^{\ddagger}/RT]$. An externally applied, homogeneous magnetic field will have little effect on $\Delta G^{\ddagger}$, but can alter A. Nonadiabatic systems are susceptible to field effects. Magnetic fields alter the rate of free radical singlet-triplet interconversions by lifting the degeneracy of triplet states (affecting $\Delta G^{\ddagger}$); rates can be altered by a factor of three in simple solvents. Because magnetic coupling occurs through both electronic nuclear hyperfine interactions and spin-orbit interactions, rates can be nonmonotonic functions of the applied field strength. Photochemical and electrochemical luminescent rates can be altered by applied fields. For singlet-triplet interconversions, magnetic fields alter product distributions when they cause the rate of interconversion to be comparable to the rate free radicals escape solvent cages. These effects are largest in highly viscous media, such as polymer films and micellar environments. Larger effects should be observed as the dimensionality of the system decreases. For coordination complexes, photochemical and homogeneous electron transfer rates are altered by magnetic fields. Spin-orbit coupling is higher in transition metal complexes than organic radicals because of higher nuclear charge and partially unquenched orbital angular momentum of the d-shell electrons. The rate of homogeneous electron transfer between Co(NH$_3$)$_6^{3+}$ and Ru(NH$_3$)$_6^{2+}$ is below that expected for diffusion controlled reactions; in a 7 T magnetic field, the rate is suppressed two- to three-fold. It has been argued that $\Delta \chi_m$ (and $\Delta G_m$) is set by the magnetic susceptibility of the products, reactants, and activated complex, and a highly paramagnetic activated complex accounts for the field effect. For reversible electron transfer at electrodes in magnetic fields, no significant effect is expected. For quasireversible electron transfer with paramagnetic and diamagnetic species, electron transfer rates and transfer coefficients ($\alpha$) are unchanged by magnetic fields applied parallel to electrodes. Magnetic fields applied perpendicular to electrodes in flow cells generate potential differences, which just superimpose on the applied electrode potentials. Potentials of 0.25V have been reported. Reversing the applied magnetic field reverses the sign of the potential difference. This effect does not change standard rate constants, only the applied potential.

Mass Transport

Magnetically driven mass transport effects have been studied in electrochemical cells placed between the poles of large magnets. Effects vary depending on the orientation of the electrode, the relative orientation of the magnetic field and the electrode, forced or natural convection, and the relative concentrations of the redox species and electrolyte.

For a charged species moving by natural or forced convection parallel to an electrode and perpendicular to a magnetic field which is also parallel to the electrode, a Lorentz force is generated which moves the charged particle toward the electrode. This magnetohydrodynamic effect is characterized by $$F = q(E + \upsilon \times B), \quad (1)$$

where F, E, $\upsilon$, and B are vectors representing the Lorentz force on the charged species, the electric field, the velocity of the moving species, and the magnetic field, respectively; q is the charge on the species. For flow cells and vertical electrodes, flux enhancements of a few-fold and reductions in the overpotential of a few tenths volts have been found in the presence of the magnetic field. Also, embedded in Equation 1 is the Hall effect; when a charged species moves through a perpendicular magnetic field, a potential is generated. This potential superimposes on the applied potential and causes migration in low electrolyte concentrations.

When the electrode and magnetic field are parallel to the earth, thermal motion leads to vortical motion at the electrode surface unless the field (B) and the current density (j) are spatially invariant and mutually perpendicular. This is parameterized as:

$$F_v = c^{-1}[j \times B]. \quad (2)$$

In Equation (2), $F_v$ is the vector of magnetic force per volume and c is the speed of light. In general, these forces are smaller than Lorentz forces; flux enhancements of a few-fold and potential shifts of 10 to 20 mV are observed. Flux enhancements of paramagnetic and diamagnetic species are similar, but paramagnetic electrolytes enhance the flux of diamagnetic $Zn^{2+}$ two-fold. Vortices suppress thermal motion and eddy diffusion.

The final configuration is for the magnetic field perpendicular to the electrode surface and, therefore, parallel to the electric field. Various, and sometimes inconsistent, results are reported for several configurations: for vertical electrodes in quiescent solution, flux enhancements of $\leq 1000\%$; for electrodes parallel to the earth with forced convection, flux retardations of 10%; and for electrodes parallel to the earth and no forced convection, both enhancements and no enhancements are reported.

This summarizes the thermodynamic, kinetic, and mass transport effects for systems where the magnetic field is applied uniformly across a cell with an external magnet. None of these macroscopic effects predict or address properties dependent on the magnetic susceptibility of the redox species. Quantum mechanical effects may also be important, especially on short length scales.

Fuel Cells

Since the incomplete reduction of oxygen limits the efficiency of $H_2/O_2$ solid polymer electrolyte fuel cells, the cathode must be pressurized about five-fold over the anode.

Proton exchange membrane (PEM) fuel cell design is one which employs hydrogen as an anode feed and oxygen in air as a cathode feed. These fuels are decomposed electrically (to yield water) at electrodes typically modified with a noble metal catalyst. The hydrogen and oxygen are separated from each other by a proton exchange membrane (such as Nafion) to prevent thermal decomposition of the fuels at the noble metal catalysts.

| Cathode | $O_2 + 4H^+ + 4e = 2H_2O$ | $E^\circ_{cathode} =$ | 1.23 V |
| Anode | $2H^+ + 2e = H_2$ | $E^\circ_{anode} =$ | 0.00 V |
| Net Reaction | $O_2 + 2H_2 = 2H_2O$ | $E^\circ_{cell} =$ | 1.23 V |

However, the fuel cell is typically run under non-equilibrium conditions, and, as such, is subject to kinetic limitations. These limitations are usually associated with the reaction at the cathode.

$$O_2 + 4H^+ + 4e = 2H_2O \quad E^\circ_{cathode} = 1.23V$$

As the reaction at the cathode becomes increasingly kinetically limited, the cell voltage drops, and a second reaction path, the two electron/two proton reduction of oxygen to peroxide, becomes increasingly favored. This consumes oxygen in two electron steps with lower thermodynamic potential.

$$O_2 + 2H^+ + 2e = H_2O_2 \quad E^\circ_{H_2O_2} = 0.68V$$

The standard free energy of this reaction is 30% of the free energy available from the four electron reduction of oxygen to water. The decrease in current associated with the decreased number of electrons transferred and the decreased cell potential couple to yield substantially lower fuel cell power output.

One approach to enhance the efficiency of the cathodic reaction is to increase the concentration (pressure) of the feeds to the cathode—protons and oxygen—so as to enhance the flux (i.e., the reaction rate at the cathode in moles/cm$^2$•s) at the cathode. The proton flux is readily maintained at a sufficiently high value by the proton exchange membrane (usually Nafion) so as to meet the demand set by the cathode reaction. Normally, the method of enhancing the flux and biasing the reaction to favor the formation of water is to pressurize the air feed to the cathode. Pressures of 5–10 atmospheres are typical.

The need to pressurize air to the cathode in PEM fuel cells has been a major obstacle in the development of a cost effective fuel cell as a replacement for the internal combustion engine, e.g., for vehicles. In particular, pressurization of the cathode requires compressors. In transportation applications, power from the fuel cell is needed to run the compressor. This results in approximately 15% reduction in the power output of the total fuel cell system.

Batteries and Applications of Batteries

Rechargeable batteries may be charged and discharged many times. The applications of rechargeable batteries are diverse and include cellular/cordless phones, computers, portable electronic devices, uninterrupted power sources, power tools, electric vehicles, hybrid electric vehicles, load leveling, remote power generation, and high speed-high density energy batteries.

In recent years, research has focused on the development of rechargeable alkaline batteries, which provide better performance and are more environmentally friendly than other rechargeable batteries. Boosted by advances in portable electronic devices, the technology of rechargeable batteries has developed for consumer applications. Prior to the 1980's, rechargeable batteries used by consumers were mainly nickel cadmium (Ni—Cd) or small sealed lead acid (Pb-acid). Cadmium, however, is a highly toxic metal and raises environmental concerns. With the successful development of metal hydride negative electrodes to replace the cadmium electrodes in Ni—Cd batteries, a new and environmentally less problematic, alkaline electrolyte system was born.

Since the late 1980's and early 1990's, the development of nickel metal hydride (Ni-MH) technology has provided an alternative to Ni—Cd batteries. Today, Ni-MH batteries are replacing Ni—Cd batteries in many applications; for instance, where a high specific energy is desired. It is expected that Ni-MH batteries will increasingly be used in portable, wireless electronics products and in high power and/or high capacity applications, displacing Ni—Cd in the battery market. This includes transportation applications where, recently, increased environmental concerns and the awareness of the rapid depletion of non-renewable petroleum reserves have compelled the automotive and motorcycle industries worldwide to take electric propulsion seriously.

Conventional combustion engine design has limited possibilities for improvement. For conventional combustion engines, the practical fuel efficiency is 20 to 30%; most fuel energy is wasted as heat. High emissions is another major problem. Transportation is a major contributor to greenhouse gas emissions and urban pollution. Increasing atmospheric concentrations of carbon dioxide lead to multiple global environmental problems, including global warming. Currently, governments are putting pressure on the auto industries because of the need for environmental protection and energy conservation. Increased vehicle fuel efficiency will lessen both of these problems. One option to resolve these problems is the use of electric vehicles and hybrid electric vehicles to replace internal combustion engine vehicles. Original interest in electric vehicles and hybrid electric vehicles arose mainly from the concern over atmospheric pollution. Studies show that transportation contributes approximately 40% of the total emissions. Because internal combustion engines are heat engines, it is not possible to reduce emission to zero. In 1973, the oil crisis reminded the world that fossil fuel supplies are not infinite. It further facilitated the development of electric vehicles and hybrid electric vehicles to reduce the dependence on fossil fuel supply.

An electric vehicle is powered by electric power such as rechargeable batteries or fuel cells instead of an internal combustion engine. For battery powered electric vehicles, the vehicles are powered by the electric energy stored in rechargeable batteries. The electric energy is directly converted to mechanical energy. No other energy conversion process is involved for battery powered electric vehicles, thus the theoretical efficiency can be as high as 100%. Additionally, there are no emissions for battery powered electric vehicles. For fuel cell powered electric vehicles, the chemical energy stored in the fuel is converted to electricity directly by fuel cells. Practical fuel cell efficiency can reach around 40 to 60%; the theoretical efficiency is 100%. The only by-product for hydrogen powered fuel cells is water.

A hybrid electric vehicle (HEV), in the simplest terms, is a vehicle with two discrete power sources, typically referred to as the primary and auxiliary power sources. The primary power source for a hybrid electric vehicle is usually an internal combustion engine; the auxiliary power source is some type of energy-storage device, usually batteries, that can absorb high, short bursts of current and discharge energy when necessary. In this design, the internal combustion engine is operated as much as possible at its maximum efficiency, thus minimizing emissions. When more power is needed, the auxiliary power source is called upon. The batteries used in HEVs must sustain large charge and discharge currents. The performance at high charge and discharge rates is crucial for the successful development of nickel metal hydride batteries in the electric vehicle and hybrid electric vehicle industries.

Currently, there are several models of commercial hybrid electric vehicles, such as Toyota Prius™ and Honda Insight™, in the U.S.A. auto market. High battery cost, lack of recharging infrastructure, limited range, and long recharging times limit commercial production of electric vehicles. Even though the electric vehicles are a much better option for transportation than internal combustion engine vehicles with respect to emissions, an internal combustion engine vehicle can be refueled in a minute or so, while recharging a battery powered electric vehicle takes hours with current technology, which is inconvenient for personal travel. At the current stage of battery technology, there is a limit to the rate at which a battery can accept charge. But with the development of rechargeable batteries and fuel cell research, electric vehicles are a promising technology for transportation applications.

The heart of electric vehicles and hybrid electric vehicles is the battery. An improved battery that weighs less, is more compact, stores more energy, lasts longer, recharges more rapidly, and costs less than existing ones is desirable.

Currently, there are two types of electrochemical power sources available for electric vehicles and hybrid electric vehicles, namely, the rechargeable battery and the fuel cell. A rechargeable battery consists of an assemblage of secondary cells that store electric energy as chemical energy and can be charged and discharged many times. Electric vehicle batteries, in current design, typically have voltages of 100 to 300 V.

A fuel cell consists of two electrodes that can catalyze the conversion of a particular fuel and an oxidant to electricity. Power can be drawn from the cell as long as fuels are supplied and the reaction products are removed.

Although fuel cells have a considerable advantage over rechargeable batteries in that they can be rapidly refueled in a manner similar to internal combustion engine vehicles, they are not a major choice for electric vehicles and hybrid electric vehicles in the near future because fuel cell technology is still immature.

Several types of rechargeable batteries have been tested for electric and hybrid electric vehicles. The main types of batteries are Ni-Metal Hydride (Ni-MH) rechargeable batteries, Pb-acid rechargeable batteries, Li-ion rechargeable batteries, and Ni—Cd rechargeable batteries. Even with improvements in battery performance, technological advances in vehicle design, and more efficient transmission and control systems, Pb-acid powered vehicles will not provide the speed and range available from internal combustion engine vehicles. Because of the high toxicity of cadmium and battery performance, Ni—Cd rechargeable batteries are not suitable for electric and hybrid electric vehicles. The safety characteristics and high cost of Li-ion rechargeable batteries make them an unsuitable choice for such applications. Among the aqueous batteries with potential to meet the near-term specific energy targets, Ni-MH rechargeable batteries are thought to provide the performance characteristics needed in electric and hybrid electric vehicles because of their high power density, high rate of discharge, long cycle life, and environmentally friendly chemistry. According to the U.S. Department of Energy (DOE) Partnership for a New Generation of Vehicle (PNGV) program, for the next decade or two, it is likely that the battery choice for near-tern development of electric and hybrid electric vehicles will be Ni-MH batteries.

Ni-MH batteries for electric and hybrid electric vehicle applications have been under development for more than a decade and are being manufactured by several battery companies. Toyota commercialized EV RAV4L EV™ using a Ni-MH battery produced by Panasonic EV Energy in 1996. In 1997, Honda started to lease Ni-MH powered EVs (Honda EV Plus™) in Japan and the U.S. . Currently in the U.S. market, the Prius™ from Toyota and Insight™ from Honda are the two major HEV models.

The performance of a nickel metal hydride rechargeable battery depends on many factors, including the active materials and its loading, electrode preparation, additives in each electrode, negative/positive capacity ratio, volume and concentration of alkaline electrolyte, separator, and cell activation. In general, a well-made Ni-MH battery shows very good electrochemical properties: high capacity, high working potential, excellent rate capacity, low self discharge rate, and long cycle life. In the current design of nickel metal hydride rechargeable batteries, battery capacity is generally limited by the nickel electrode for reasons of battery safety. In order to improve the actual performance of the nickel metal hydride batteries, a better performance of nickel hydroxide positive electrode is necessary to meet the requirements.

The Ni-MH battery is a unique rechargeable battery employing a negative electrode consisting of a metal alloy that stores hydrogen at high density. This battery was successfully commercialized by Sanyo and Matsushita in Japan in 1990 because of its higher energy density, high rate of discharge, long cycle life, lack of memory, and environmental cleanliness as compared to Ni—Cd batteries.

Since the discovery of hydrogen storage alloys such as $LaNi_5$ in about 1969, extensive research has been carried out. The Ni-MH battery was first brought into production in the late 1980's, as an environmentally more acceptable replacement for Ni—Cd batteries in consumer applications. Like Ni—Cd batteries, Ni-MH cells use a nickel positive electrode with $Ni(OH)_2$ as the active material and an aqueous KOH electrolyte. The main difference is that in the Ni-MH cells, the active material in the negative electrode is hydrogen absorbed in a metal alloy, which replaces the cadmium of Ni—Cd batteries.

A positive-limited cell enhances capacities and retains the well-characterized electrical and physical design features of the sealed nickel cadmium cell. The charge-discharge reactions in a Ni-MH battery proceed through a homogeneous solid-state mechanism where proton transfer occurs between nickel hydroxide and hydrogen storage alloy. This distinguishes Ni-MH cells from other batteries where the anode reaction proceeds through a dissolution-precipitation mechanism.

The high rate of charge and discharge of Ni—Cd and Ni-MH batteries is largely influenced by the internal resistance of the nickel electrode. The main reason for this is thought to be in the semiconducting properties of the nickel oxides, especially $Ni(OH)_2$. Attempts to reduce internal resistance include design control of the nickel substrate, the use of nickel hydroxide particles with high density, the addition of LiOH and/or $KBH_4$ to the electrolyte, and the addition of conductivity additives to the nickel hydroxide electrode.

Ni-MH batteries have replaced Ni—Cd batteries in many portable applications, due to their higher specific energy and energy density, as well as environmental cleanliness. Worldwide shipments for 1997 are estimated at over 570 million cells. The world production of Ni-MH batteries has continuously increased and reached approximately 1.2 billion in year 2000. The increase in the market for electronic equipment has sustained increased production. As regulations for the disposal of Ni—Cd batteries became stricter worldwide, the safety and cost advantages of Ni-MH batteries as well as their performance characteristics and excellent environmental compatibility, will promote the use of Ni-MH batteries in new and current application areas including HEVs, EVs, uninterrupted power suppliers (UPS), power-assisted bicycles, and electric tools.

Presently, state-of-the-art conventional Ni-MH cells have a specific energy of about 95 Wh $Kg^{-1}$ and a volumetric energy density of about 330 Wh $l^{-1}$. The specific power of the cells is about 200 W $kg^{-1}$, and the power density is about 485 W $l^{-1}$. State-of-the-art metal hydride electrodes are prepared from transition metal alloys with a non-traditional structure design that deliver a capacity of 550–650 Ah $Kg^{-1}$.

A nickel-metal hydride cell typically consists of four major components: the negative metal hydride electrode, the positive nickel electrode, the separator, and the electrolyte. Generally, both the nickel electrode and the metal hydride electrode are thin porous electrodes. In a nickel-metal hydride cell, the nickel electrode determines the cell capacity and the metal hydride electrode determines the cell cycle life.

The negative electrode is typically made with $AB_5$ or $AB_2$ based alloy powder, which is pasted onto either a nickel-plated punched steel sheet or nickel foam. The theoretical capacity for a metal hydride electrode is around 40% higher than that of a cadmium electrode. As a result, nickel metal hydride batteries have 30 to 50 percent higher capacity than the equivalent nickel cadmium batteries.

There remains, however, a need for improved electrodes, e.g., for use in batteries. Accordingly, there also remains a need for methods of making these electrodes.

SUMMARY OF THE INVENTION

Accordingly, the present invention provides electrodes. The present invention also provides methods of making and using these electrodes.

A first embodiment of the present invention is therefore directed to an electrode comprising: (i) a substrate having at least one surface and comprising a conductive material; and (ii) a plurality of magnetizable particles on the surface. In this embodiment, the magnetizable particles have been exposed to a magnetic field of sufficient strength for a sufficient time to align the magnetic moments of a portion of atoms within a majority of the particles and wherein the alignment is maintained upon removal of the magnetic field. Further, the portion of atoms aligned within each of the particles is sufficient to alter the rate of a chemical reaction involving the particle or occurring within the vicinity of the particle and/or the distribution of products resulting from a chemical reaction involving the particle or occurring within the vicinity of the particle.

In another embodiment, the present invention is directed to an electrode of matter comprising at least one magnetizable particle and at least one permanent magnetic particle. In this embodiment, the magnetizable particle is a non-permanent magnet particle, and the permanent magnetic particle has a magnetic field of sufficient strength to align the magnetic moments of a portion of atoms within the magentizable particle sufficient to alter the rate of and/or distribution of products resulting from a chemical reaction involving one or more of the magnetizable particles and/or permanent magnetic particles or occurring within the vicinity of one or more of the magnetizable particles and/or permanent magnetic particles.

In still another embodiment, the present invention is directed to a composition of matter comprising a plurality of magnetizable particles. In this embodiment, the magnetizable particles have been exposed to a magnetic field of sufficient strength to align the magnetic moments of a portion of atoms within the particles sufficient to alter the distribution of products resulting from a chemical reaction involving the magnetizable particles or occurring within the vicinity of the magnetizable particles.

In yet another embodiment, the present invention is directed to a composition of matter comprising a plurality of magnetic particles. In this embodiment, a portion of atoms within the magnetic particles have magnetic moments aligned sufficient to alter the distribution of products resulting from a chemical reaction involving the magnetic particles or occurring within the vicinity of the magnetic particles.

In still another embodiment, the present invention is directed to a composition of matter comprising a plurality of magnetizable particles in a binder, such as a non-ionic polymer and/or an ion-exchange polymer. The magnetizable particles of this embodiment have been exposed to a magnetic field of sufficient strength to align the magnetic moments of a portion of atoms within the magentizable particles sufficient to alter the distribution of products resulting from a chemical reaction involving the magnetizable particles or occurring within the vicinity of the magnetizable particles.

In yet another embodiment, the present invention is directed to a composition of matter comprising a plurality of magnetic particles in a binder, such as a non-ionic polymer and/or an ion-exchange polymer. In this embodiment, a portion of atoms within the magnetic particles have magnetic moments aligned sufficient to alter the distribution of products resulting from a chemical reaction involving the magnetic particles or occurring within the vicinity of the magnetic particles.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
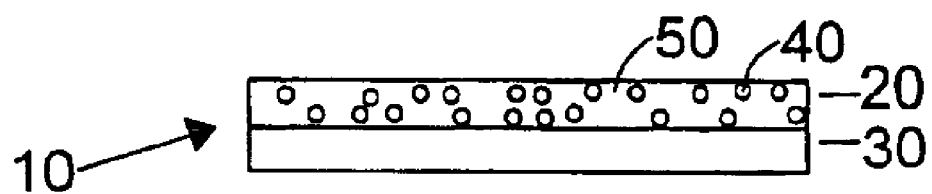
FIG. 1 shows an electrode according to an embodiment of the present invention.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

As used herein, the term "within the vicinity of the particle" is intended to mean sufficiently close to the particle for it to exert its effect(s) on the reactant(s) involved in the chemical reaction. Such distances will therefore vary depending, for example, on the nature of the particle, including its composition and size, and the strength of the magnetic field, as well as the reactant(s) involved in the affected chemical reaction.

According to the present invention, it has been found that electrode performance may be improved by employing magnetically modified electrodes. Such magnetically modified electrodes provide improved electrode performance, e.g., as compared to batteries not having magnetically modified electrodes. For instance, in rechargeable batteries, it has been found that magnetically modified electrodes provide decreased discharge and recharge times.

In a particularly preferred embodiment, the present invention involves an electrode comprising: (i) a substrate having at least one surface and comprising a conductive material; and (ii) a plurality of magnetizable particles on the surface. The magnetizable particles have been exposed to a magnetic field of sufficient strength for a sufficient time to align the magnetic moments of a portion of atoms within a majority of the particles and wherein said alignment is maintained upon removal of said magnetic field. Further, the portion of atoms aligned within each of the particles is sufficient to alter the rate of a chemical reaction involving the particle or occurring within the vicinity of the particle and/or the distribution of products resulting from a chemical reaction involving the particle or occurring within the vicinity of the particle.

In another embodiment, the present invention involves an electrode comprising at least one magnetizable particle and at least one permanent magnetic particle. The permanent magnetic particle has a magnetic field of sufficient strength to align the magnetic moments of a portion of atoms within the magentizable particle sufficient to alter the rate of and/or distribution of products resulting from a chemical reaction involving each of the magnetizable particles and/or the permanent magnetic particle or occurring within the vicinity of each of the magnetizable particles and/or the permanent magnetic particle.

In still another embodiment, the present invention involves a composition of matter comprising a plurality of magnetizable particles. The permanent magnetic particle has a magnetic field of sufficient strength to align the magnetic moments of a portion of atoms within the magnetizable particle sufficient to alter the rate of and/or distribution of products resulting from a chemical reaction involving the magnetizable particles or occurring within the vicinity of the magnetizable particles.

In still another embodiment, the present invention is directed to a composition of matter comprising a plurality of magnetic particles. In this embodiment, a portion of atoms within the magnetic particles have magnetic moments aligned sufficient to alter the distribution of products resulting from a chemical reaction involving the magnetic particles or occurring within the vicinity of the magnetic particles.

In yet another embodiment, the present invention is directed to a composition of matter comprising a plurality of magnetizable particles in a binder, such as a non-ionic polymer and/or an ion-exchange polymer. The magnetizable particles of this embodiment have been exposed to a magnetic field of sufficient strength to align the magnetic moments of a portion of atoms within the magentizable particles sufficient to alter the distribution of products resulting from a chemical reaction involving the magnetizable particles or occurring within the vicinity of the magnetizable particles.

In still another embodiment, the present invention is directed to a composition of matter comprising a plurality of magnetic particles in a binder, such as a non-ionic polymer and/or an ion-exchange polymer. In this embodiment, a portion of atoms within the magnetic particles have magnetic moments aligned sufficient to alter the distribution of products resulting from a chemical reaction involving the magnetic particles or occurring within the vicinity of the magnetic particles.

Substrates

Suitable substrates according to the present invention include materials known in the art. Preferably, the substrate is a conductor, semiconductor, or an insulator, more preferably a conductor. Illustrative examples of suitable substrates include, but are not limited to, metals, carbon, such as graphite, zinc, semiconductors, semimetals, magnetic materials, and combinations thereof. Illustrative examples of suitable metals according to the present invention include transition metals, such as Ni, Fe, Zn or Cd, and precious metals, such as Ag, Au, Pt, Ir, Ru, Rh, Os, and Ir. Particularly preferred metal substrates include nickel and platinum, more preferably nickel. Additionally, the substrate may include a mixture of two or more metals, or a metal and a non-metal, such as a polymeric material. Other suitable substrates according to the present invention include a matrix, e.g., metal matrix, including magnetic particles or magnetic components.

In certain preferred embodiments of the present invention, the substrate comprises a permanent magnetic material. Illustrative examples of suitable permanent magnetic materials include, but are not limited to, Co, Ni, Fe (including iron oxides), samarium cobalt, neodymium-iron-boron, and combinations thereof.

According to other embodiments, the substrate comprises a non-permanent magnetic material. According to these embodiments, the substrate is most preferably nickel.

The substrate may be continuous with no openings therein, such as a rod, foil or sheet, or may be configured to have openings therein, such as a mesh or screen. The substrate can have any geometrical shape suitable for a predetermined use. Non-limiting examples of such geometries include rods (hollow or solid), circles, squares, triangles, rectangles, and the like. In preferred embodiments of the present invention, the substrate is circular.

Magnetizable Particles

Magnetizable particles in accordance with the present invention are known in the art. Examples of the magnetizable particles include, but are not limited to, permanent magnetic materials, paramagnetic materials, superparamagnetic materials, ferromagnetic materials, ferrimagnetic materials, superconducting materials, anti-ferromagnetic materials, and combinations thereof.

According to certain embodiments of the present invention, the magnetizable particles comprise a permanent magnetic material. Suitable permanent magnetic materials are known and available to those skilled in the art. Illustrative examples of suitable permanent magnetic materials include, but are not limited to, samarium cobalt, neodynium-iron-boron, aluminum-nickel-cobalt, iron, iron oxide, cobalt, misch metal, ceramic magnets comprising barium ferrite and/or strontium ferrite, and mixtures thereof.

According to some embodiments of the present invention, the magnetizable particles comprise a paramagnetic material. Suitable paramagnetic materials are known and available to those skilled in the art. Illustrative examples of suitable paramagnetic materials include, but are not limited to, aluminum, stainless steel, gadolinium, chromium, nickel, copper, iron, manganese, and mixtures thereof.

According to certain embodiments of the present invention, the magnetizable particles comprise a superparamagnetic material. Suitable superparamagnetic materials are known and available to those skilled in the art. Illustrative examples of suitable superparamagnetic materials include, but are not limited to, iron oxides, such as $Fe_2O_3$ and $Fe_3O_4$.

According to particular embodiments of the present invention, the magnetizable particles comprise a ferromagnetic material. Suitable ferromagnetic materials are known and available to those skilled in the art. Illustrative examples of suitable ferromagnetic materials include, but are not limited to, Ni—Fe alloys, iron, and combinations thereof.

According to some embodiments of the present invention, the magnetizable particles comprise a ferrimagnetic material. Suitable ferrimagnetic materials are known and available to those skilled in the art. Illustrative examples of suitable ferrimagnetic materials include, but are not limited to, rare earth transition metals, ferrite, gadolinium, terbium, and dysprosium with at least one of Fe and Co, and combinations thereof.

According to certain embodiments of the present invention, the magnetizable particles comprise a superconducting material. Suitable superconducting materials are known and available to those skilled in the art. Illustrative examples of suitable superconducting materials include, but are not limited to, niob titanium, yttrium barium copper oxide, thallium barium calcium copper oxide, bismuth strontium calcium copper oxide, and combinations thereof.

According to some embodiments of the present invention, the magnetizable particles comprise an anti-ferromagnetic material. Suitable anti-ferromagnetic materials are known and available to those skilled in the art. Illustrative examples of suitable anti-ferromagnetic materials include, but are not limited to, FeMn, IrMn, PtMn, PtPdMn, RuRhMn, and combinations thereof.

According to some embodiments, preferred magnetizable particles comprise metals and the like. Such particles include, but are not limited to, transition metal compounds, such as oxides, carbonates, and hydroxides. Suitable examples include, but are not limited to, nickel hydroxides, such as nickel oxy hydroxide, zinc hydroxides, cobalt oxides, lithium hydroxides, lithium carbonate, manganese oxides, and combinations thereof.

While any magnetizable particles may be used according to the present invention, in preferred embodiments of the present invention, the magnetizable particles are Co, Fe, Ni, dysprosium, gadolinium, samarium cobalt, such as $Sm_2Co_7$ or $Sm_2Co_5$, neodymium-iron-boron, such as NeFeB, aluminum-nickel-cobalt, iron oxide, and combinations thereof.

Other suitable magnetizable particles according to the present invention include $AB_5$ alloys, such as $La_{0.9}Sm_{0.1}Ni_{2.0}Co_{3.0}$, and $AB_2$ alloys, such as $Ti_{0.51}Zr_{0.49}V_{0.70}Ni_{1.18}Cr_{0.12}$ or $MmNi_{3.2}Co_{1.0}Mn_{0.6}Al_{0.2}$, where Mm is misch metal (25 wt % La, 50 wt % Ce, 7 wt % Pr, and 18 wt % Nd). Such materials can be used alone or in combination. Thus, according to the present invention, the electrode may include stoichiometric, such as $Sm_2Co_7$ or $Fe_3O_4$, or non-stoichiometric, such as $La_{0.9}Sm_{0.1}Ni_{2.0}Co_{3.0}$, particles, or a combination thereof.

In addition to or in place of the above magnetizable materials, the magnetizable particles may comprise a ceramic magnet. Examples of ceramic magnets include, but are not limited to, those made of barium ferrite and/or strontium ferrite.

In preferred embodiments, the magnetizable material comprises a plurality of magnetizable materials. For instance, the electrode may include a non-permanent magnet magnetizable material and a permanent magnetic material. The permanent magnetic particle may have a magnetic field of sufficient strength to align the magnetic moments of a portion of atoms within the non-permanent magnet magnetizable particles sufficient to alter the rate of a chemical reaction involving the non-permanent magnet magnetizable particles and/or the permanent magnetic particle or occurring within the vicinity of the non-permanent magnet magnetizable particles and/or the permanent magnetic particles. The permanent magnetic particles may also have a magnetic field of sufficient strength to align the magnetic moments of a portion of atoms within the non-permanent magnet magnetizable particle sufficient to alter the distribution of products resulting from a chemical reaction involving the non-permanent magnet magnetizable particles and/or the permanent magnetic particles or occurring within the vicinity of the non-permanent magnet magnetizable particles and/or the permanent magnetic particles.

The optimal ratio of non-permanent magnet magnetizable particles to permanent magnetic particles may be determined empirically by a skilled artisan. For example, the weight ratio of the first magnetizable particles to permanent magnetic particles may range from about 20:1 to about 5:1, preferably from about 15:1 to about 8:1.

Illustrative examples of suitable permanent magnetic particles include, but are not limited to, samarium cobalt, neodynium-iron-boron, aluminum-nickel-cobalt, iron, including iron oxide, cobalt, misch metal, ceramic magnets comprising barium ferrite and/or strontium ferrite, and mixtures thereof.

In some preferred embodiments of the present invention, at least a portion of the magnetizable particles are coated with an inert material. For instance, the magnetizable particles may have one coating layer or a plurality of coating layers on at least a portion of their surface.

Suitable inert materials for coating the magnetizable particles include those materials that do not adversely interact with the environment in which the particles are used. Such coatings can be used, for instance, to render the magnetizable particles inert to corrosive effects of solvents. Examples of inert materials suitable in practicing the present invention include, but are not limited to, substituted and unsubstituted polystyrenes, silanes and combinations thereof. Preferably, the inert material is a silane. Preferred silane coatings include trialkoxysilanes, more preferably 3-aminopropyltrimethoxysilane. In certain preferred embodiments of the present invention, the magnetizable particles are silane-coated $Fe_3O_4$ or NdFeB. According to the present invention, the polymer coatings are preferably cross-linked. Such coatings may be made by methods known in the art. For example, silane coated magnetizable particles can be made as disclosed in WO 01/99127, the disclosure of which is herein incorporated by reference in its entirety.

In view of the above, illustrative examples of the inert material include, but are not limited to, homopolymers formed from the following monomers: styrene, styrene derivatives, 2-hydroxyethyl acrylate, 2-hydroxyethyl methacrylate, iso-decyl methacrylate, methyl methacrylate, methyl acrylate, vinyl acetate, ethylene glycol, ethylene, 1,3-dienes, vinyl halides, and vinyl esters.

Further illustrative examples of the inert material include, but are not limited to, copolymers formed from at least one Monomer A and at least one Monomer B. Examples of Monomer A include, but are not limited to, styrene, methyl acrylate, iso-decyl methacrylate, 2-hydroxyethyl acrylate, and 2-hydroxyethyl methacrylate. Examples of Monomer B include, but are not limited to, 4-styrenesulfonic acid and ethylene glycol dimethacrylate.

While the size of the magnetizable particles is not limited, in certain preferred embodiments of the present invention, the magnetizable particles have sizes ranging from about 0.1 microns to about 15 microns, such as about 0.1 to about 10 microns, about 0.5 to about 10 microns, about 2 microns to about 8 microns, or about 3 microns to about 6 microns.

Magnetizable Particles and Binders

In certain preferred embodiments, the magnetizable particles are combined with a binder to form a coating layer on the substrate.

The coating layer may include a binder. Examples of suitable binders include, but are not limited to, polymers, starches, fatty acids, liposomes, and combinations thereof.

Certain preferred embodiments include non-ionic polymers as binders. Suitable non-ionic polymers include chemically modified cellulosic polymers and polyacrylates. In certain particularly preferred embodiments of the present invention, the binder is hydroxypropyl methylcellulose (HPMC), hydroxy methylcellulose, carboxymethyl cellulose, methyl cellulose, or combinations thereof. Other examples of non-ionic polymeric binders include polyvinylalcohol and polyethylene oxide.

Preferred embodiments include ion-exchange polymers as binders. Ion-exchange polymers are known and available to those skilled in the art. Illustrative examples of ion-exchange polymers include, but are not limited to, Nafion and poly(vinyl pyridine). While not wishing to be limited to theory, Nafion exhibits superior transport, selectivity, and stability characteristics compared to polymers with no inherent microstructure.

In addition to the foregoing, the coating layer may include additives. Non-limiting examples of such additives include stabilizers, gelling agents, surfactants, cross-linking agents, viscosity reducing agents, viscosity enhancing agents, agents that enhance drying, and other compounds or materials that affect the physical properties of the mixture.

Suitable stabilizers are known in the art. Illustrative examples of suitable stabilizers include, but are not limited to, EDTA, ethlenediamine, pentamethyl-diethylenetriamine, and combinations thereof.

Suitable gelling agents are known in the art. Illustrative examples of suitable gelling agents include, but are not limited to, polymers, such as carboxymethycellulose, polyacrylic acid (e.g., Carbopol 940® from B. F. Goodrich in Brecksville, Ohio, or POLYGEL-4P® from 3V in Bergamo, Italy), and sodium polyacrylate (e.g., CL-15® from Allied Colloids in Yorkshire, England), salts, and combinations thereof.

Suitable surfactants are known in the art. The surfactants that may be used include, for example, nonionic surfactants, cationic surfactants, and/or anionic surfactants.

Illustrative examples of nonionic surfactants include, but are not limited to, organic aliphatic surfactants, alkyl aromatic hydrophobic surfactants, and surfactants that are condensation products of a hydrophilic altylene oxide, such as ethylene oxide. Hydrophobic compounds having a carboxy, hydroxy, amido, or amino group may be condensed with ethylene oxide to form a nonionic surfactant. A desired balance between hydrophobic and hydrophilic elements (hydrophilicity-lipophilicity balance or HLB) may be attained by controlling the length of an ethylene oxide chain of the codensate. HLB of the surfactant may be controlled by the size or kind of a hydrophilic (water-loving or polar) group and a lipophilic (oil-loving or non-polar) group of the surfactant. In some embodiments, HLB of the nonionic surfactant ranges from about 6 to about 19.

Useful nonionic surfactants include, for example, those selected from the group consisting of non-copolymerizable nonionic surfactants, ethylenically-unsaturated copolymerizable nonionic surfactants, and mixtures thereof.

Illustrative examples of anionic surfactants include, but are not limited to, those having: (a) a hydrophobic moiety selected from the group consisting of $C_6$–$C_{20}$ alkyl group, alkylaryl group, and alkenyl group; and (b) a hydrophilic moiety comprising an anionic group selected from the group consisting of sulfate, sulfonate, phosphonate, polyoxyethylene sulfate, polyoxyethylene sulfonate, polyoxyethylene phosphonate, and alkali metal and ammonium salts thereof, or tertiary amino salt group of these anionic groups.

A copolymerizable surfactant comprising $C_2$–$C_{18}$ alkenyl polyoxypropylene or $C_2$–$C_{18}$ polyoxybutylene as the hydrophobic moiety, an anionic group of polyoxyethylene sulfate as the hydrophilic moiety, and an ethylenically-unsaturated double bond may also be useful.

To obtain a more stable macro- or micro-emulsion, an ethylenically-unsaturated polymerizable anionic surfactant may be used. Specific examples of the copolymerizable anionic surfactant include Mazonm® SAM 211, which is commercially available from PPG Industries Inc. and Adekareasorp® SE-10N (product No.): ammonia salt of α-sulfo-ω-{1-nonylphenoxymethyl-2-(2-propenyloxy)ethoxy}-poly-(oxy-1,2-ethanediyl) manufactured by Asahi Denka Kogyo Co.

The non-reactive surfactant may be sodium polyoxyethylene alkyl(C10–C16) ether sulfates such as Emale® E-27C, Emale® E-70C, etc., which are commercially available from Kao Corp.

As the cationic surfactant, for example, there can be used quaternary ammonium salts wherein at least one higher molecular weight groups (having 6 or more carbon atoms) and two or more lower molecular weight groups (having 1 to 5 carbon atoms) are linked to a common nitrogen atom to produce a cation, resulting in electrical balance. In this case, the anion includes those selected from the group consisting of halide (e.g. bromide, chloride, etc.), acetate, nitrate and lower alkosulfate (e.g. methosulfate, etc.), but are not limited thereto.

Suitable cross-linking agents are known in the art. Illustrative examples of suitable cross-linking agents include, but are not limited to, polyol, polyamine, polycarboxylic acid, and combinations thereof.

Suitable reducing agents are known in the art. Illustrative examples of viscosity reducing agents include, but are not limited to, carbon, hydrogen, hydrazine, sodium formate, formic acid, formaldehyde, and combinations thereof.

Suitable viscosity reducing agents are known in the art. Illustrative examples of viscosity reducing agents include, but are not limited to, solvents and combinations of solvents.

Illustrative examples of viscosity enhancing agents include, but are not limited to, celluloses, ionically conductive polymers, such as polyamide-co-diallyldimethyl-ammonium chloride (PAA), inorganic filler adjuncts, such as fumed alumina or silanized fumed silica, and combinations thereof.

Suitable drying enhancement agents are known in the art. Illustrative examples of suitable drying enhancement agents include, but are not limited to, glycerol, vegetable oil, polyethylene glycol, and combinations thereof.

According to certain preferred embodiments of the present invention, the magnetizable particles are present in an amount of from about 0.1 wt % to about 50 wt % of the coating layer, such as about 0.1 to about 30 wt %, about 1 to about 25 wt %, about 1 to about 15 wt %, or about 2 to about 12 wt %, based on the total weight of the coating layer.

In particularly preferred embodiments of the present invention, the coating layer comprises about 5 wt % to about 10 wt % of $Fe_3O_4$, NdFeB, Co, or $Sm_2CO_7$, and the balance nickel hydroxide.

The optimal thickness of the coating layer may be determined empirically by one skilled in the art. While the thickness of the coating layer is not particularly limited, the thickness of the coating layer generally ranges from about 1 micron to about 10 microns, such about 2 microns to about 8 microns, or about 3 microns to about 6 microns.

Methods of Making

The electrodes of the present invention may be made by any of the various methods and techniques known and available to those skilled in the art. Particularly preferred methods will now be described in greater detail.

A preferred embodiment of the present invention is directed to a method for forming a magnetically modified electrode, which comprises providing a substrate; and forming a coating layer comprising magnetizable particles on the substrate.

Another preferred embodiment of the present invention is directed to a method of making a magnetically modified electrode, which comprises providing a substrate comprising a magnetic material; and forming a coating layer on the substrate, wherein the coating layer comprises magnetizable particles.

Still another preferred embodiment of the present invention is directed to a method for forming a magnetically modified electrode, which comprises: providing a substrate; and forming a coating layer comprising magnetizable particles on the substrate, wherein the method further comprises subjecting the particles to an external magnetic field before, during, and/or after forming the coating layer.

In embodiments of the present invention employing a mixture of particles, e.g., non-permanent magnet magnetizable particles and permanent magnet particles, it is preferable to shake or stir the mixture prior to use. For instance, in preferred embodiments of the present invention, the magnetizable particles and permanent magnet particles are weighed and placed into a container and the container is sealed. The container may then be shaken at a rate and for a time effective to form a mixture of non-permanent magnet magnetizable particles and permanent magnet particles. In a preferred embodiment of the present invention, the container is shaken at a rate of about 1,000 oscillations per minute for about 30 minutes.

According to certain methods of the present invention, the coating layer is preferably formed by mixing the magnetizable particles, a solvent and, optionally, a binder and applying the mixture to at least a portion of a substrate. Optionally, the mixture may be dried for a time effective to remove at least a portion of the solvent from the mixture. The components of the mixture can be mixed in any order.

In certain preferred embodiments of the present invention, the binder is dissolved in the solvent and then the magnetizable particles are added to the solution. Preferably, the solvent is heated prior to addition of the binder. More preferably, the solvent is heated to boiling prior to addition of the binder. In other preferred embodiments of the present invention, the solvent is cooled below room temperature prior to addition of the binder.

Solvents suitable in practicing the present invention include any solvent capable of dissolving the binder, if employed, that do not adversely the particles of the coating layer. Examples of suitable solvents include both non-polar and polar solvents. Non-limiting examples of suitable solvents include water, alkanes, such as benzene, toluene and hexane; and alcohols, such as methanol, ethanol, isopropanol, and t-butanol. In certain preferred embodiments of the present invention, the solvent is water. Such solvents can be used alone or in combination.

In other preferred embodiments of the present invention, a polymer serves as both the solvent and the binder. In such embodiments, a polymer is heated to a temperature effective to melt the polymer, and magnetizable particles are added to the melted polymer. The mixture is then distributed onto a substrate surface and allowed to cool and solidify.

In some embodiments, at least a portion of a mixture comprising a solvent, a non-ionic polymer and magnetizable particles is applied to a substrate. Depending upon the volume of the mixture, the entire mixture or a portion thereof is applied to a substrate, The mixture is applied to the entire surface of the substrate or a lesser portion thereof.

The mixture may be applied to the substrate by methods known in the art. Suitable methods include spray coating, spin coating, painting, drop depositing, decal transferring, laminating, rolling, and the like. In preferred embodiments of the present invention, the mixture is applied by spreading a wet slurry onto the substrate and allowing the slurry to dry.

According to the present invention, the mixture is preferably dried following application to the substrate. Preferably, the mixture is dried for a time effective to remove at least a portion of the solvent therefrom. More preferably, the mixture is dried for a time effective to remove substantially all of the solvent.

The mixture may be dried at a temperature suitable for evaporation of the particular solvent used. Preferably, the mixture is dried at room temperature. In other preferred embodiments of the present invention, the mixture is dried with heating. In certain preferred embodiments of the present invention, the mixture is dried under vacuum. In still other preferred embodiments of the present invention, the mixture is dried with heating and under vacuum.

According to certain preferred methods of the present invention, the magnetizable particles are subjected to an external magnetic field before, during, and/or after forming the coating layer. The magnetic field is applied, for instance, by use of a permanent magnet or an electromagnet. For instance, a magnet may be brought near or in contact with a substrate having a mixture applied thereto. Alternatively, a magnet is immersed into the container holding the mixture.

In another preferred embodiment of the present invention, a circular permanent magnet is placed around the coated substrate. Examples of suitable permanent magnets include, but are not limited to, neodymium-iron-boron magnets and iron oxide magnets.

In other preferred embodiments of the present invention, prior to forming the coating mixture, the magnetizable particles are exposed to an external magnetic field.

In certain embodiments, the magnetizable particles are exposed to a magnetic field of sufficient strength for a sufficient time to align the magnetic moments of a portion of atoms within a majority of the particles, such that the alignment is maintained upon removal of the magnetic field.

Preferably, the magnetic field strength is about 0.05 to about 2.0 T, more preferably about 0.1 to about 1.0 T, and even more preferably about 0.2 to about 0.5 T. In certain preferred embodiments of the present invention, the magnetic field strength is about 0.2 T.

In a preferred embodiment, the portion of atoms aligned within each of the particles is sufficient to alter the rate of a chemical reaction involving the particle or occurring within the vicinity of the particle.

When non-permanent magnet magnetizable particles are used in admixture with permanent magnetic particles, the permanent magnetic particles may have a magnetic field of sufficient strength to align the magnetic moments of a portion of atoms within the non-permanent magnet magentizable particles sufficient to alter the rate of a chemical reaction involving the non-permanent magnet magnetizable particles and/or the permanent magnetic particles or occurring within the vicinity of the non-permanent magnet magnetizable particles and/or the permanent magnetic particles.

Methods of Using

The electrodes of the present invention may be used in manners known in the art. Particularly preferred methods will now be described in greater detail.

As noted above, the portion of atoms aligned within each of the particles may be sufficient to alter the rate of a chemical reaction involving the particle or occurring within the vicinity of the particle and/or the distribution of products resulting from a chemical reaction involving the particle or occurring within the vicinity of the particle. Accordingly, in this embodiment, the chemical reaction occurs at the electrode.

In some embodiments, a permanent magnetic particle has a magnetic field of sufficient strength to align the magnetic moments of a portion of atoms within a magetizable particle sufficient to alter the rate of a chemical reaction involving the magnetizable particles and/or the permanent magnetic particle or occurring within the vicinity of the magnetizable particles and/or the permanent magnetic particle.

The chemical reaction may involve the flux of a solute through a composite containing a plurality of the magnetizable particles. The chemical reaction may also involve mass transport. Further, the chemical reaction may involve transfer of at least one subatomic particle. Examples of the transferred subatomic particles include, but are not limited to, electrons and protons.

In some embodiments, the portion of atoms aligned within each of the particles is sufficient to alter the distribution of products resulting from a chemical reaction involving the particle or occurring within the vicinity of the particle. For example, when first magnetizable particles are used with permanent magnetic particles, the permanent magnetic particles may have a magnetic field of sufficient strength to align the magnetic moments of a portion of atoms within the first magentizable particles sufficient to alter the distribution of products resulting from a chemical reaction involving each of the first magnetizable particles and/or the permanent magnetic particles or occurring within the vicinity of each of the first magnetizable particles and/or the permanent magnetic particles.

In preferred embodiments of the present invention, the electrodes are used in a battery comprising a positive electrode, a negative electrode, and an electrolyte. The batteries may be primary or rechargeable batteries. Such batteries include, but are not limited to, Ni—Cd batteries, Ni—Fe batteries, Ni—Zn batteries and nickel metal hydride (Ni—MH) batteries. The electrode can be a positive electrode or a negative electrode.

According to the present invention, batteries having magnetized electrodes exhibit improved properties compared to batteries not having magnetized electrodes.

As an example, the electrode of the present invention may reduce minimum battery recharging time by at least about 50%, such as from about 50% to about 80%, at 25° C. relative to an otherwise identical battery in which the positive electrode is replaced with an unmagnetized electrode under the same test conditions.

As another example, the electrode of the present invention may increase maximum battery current by at least about 20%, such as from about 20% to about 230%, at 25° C. and at 200 mV/s relative to an otherwise identical battery in which the positive electrode is replaced with an unmagnetized electrode under the same test conditions.

The batteries of the present invention may be used for any purpose known in the art. For instance, the battenes may be used in cellular/cordless phones, computers, portable electronic devices, uninterrupted power sources, power tools, electric vehicles, hybrid electric vehicles, load leveling, remote power generation, and high speed-high density energy batteries.

In addition to batteries, the electrodes of the present invention may be used in fuel cells. Examples of fuel cells include, but are not limited to, proton exchange membrane (PEM) fuel cells.

Certain preferred embodiments of the present invention will now be described by reference to the drawings.

FIG. 1 illustrates an electrode according to one embodiment of the present invention. As shown in FIG. 1, an electrode 10 includes a coating layer 20 formed on a substrate 30. The coating layer 20 includes particles capable of generating electrochemical energy in the presence of a magnetic field 40 dispersed in a binder 50. While FIG. 1 shows the coating layer 20 in direct contact with the substrate 30, intermediate layers may be formed therebetween.

Figure 2:
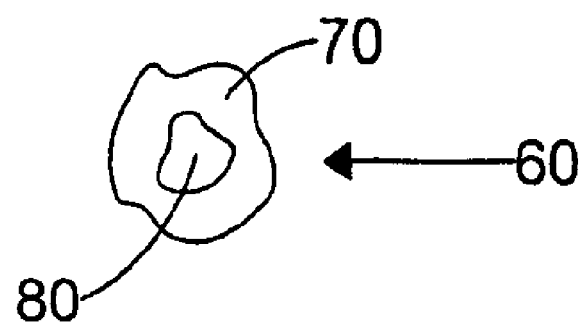
FIG. 2 shows a coated magnetic particle according to an embodiment of the present invention.

FIG. 2 illustrates a coated magnetic particle according to one embodiment of the present invention. As shown in FIG. 2, a coated magnetic particle 60 includes an inert coating 70, such as a silane, formed on a magnetic core 80, such as NdFeB or $Sm_2Co_7$. Such particles may include intermediate coatings or additional coatings formed over the inert coating.

Nickel Metal Hydride Batteries

Currently, most consumer Ni-MH batteries utilize $AB_5$ alloys as the active material for the negative electrode. The $AB_5$-type alloys appear to offer the best set of features for commercial nickel metal hydride cell applications, but $AB_2$-type alloys yield superior energy storage densities. The commonly used $AB_5$ alloys are able to deliver a capacity of around 300 Ah $kg^{-1}$, while $AB_2$-type alloys can deliver a capacity of about 450 Ah $kg^{-1}$. However, the production of $AB_2$ alloys is more complex, the alloy itself being more susceptible to corrosion.

Nickel hydroxide is used as the active material in nickel metal hydride battery positive electrodes. Because the nickel metal hydride battery capacity is positive electrode controlled, the performance of nickel metal hydride batteries is strongly influenced by the nickel electrode. Additives such as nickel metal, cobalt, and cobalt oxide are sometimes used.

The electrochemical reaction schemes of nickel hydroxide in the nickel metal hydride batteries are not completely understood. During the charge-discharge, the electrochemical mechanism is as follows:

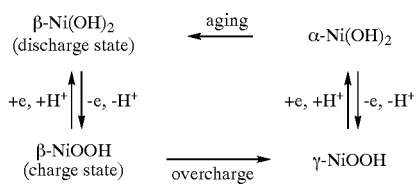

The reactions for the nickel hydroxide positive electrode in a nickel metal hydride battery can be represented by the following:

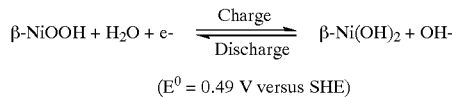

$(E^0 = 0.49 \text{ V versus SHE})$

In the preparation of the nickel electrode, discharge-state $\beta$-Ni(OH)$_2$ is used because it is stable in alkaline electrolytes and has a good reversibility to $\beta$-NiOOH. $\beta$-Ni(OH)$_2$ has a hexagonal brucite structure with an inter-sheet distance of 4.6 Å. $\beta$-NiOOH has a similar structure to $\beta$-Ni(OH)$_2$ and the lattice constant of inter-sheets is 4.85 Å.

The theoretical oxidation state of nickel is +2 in $\beta$-Ni(OH)$_2$ and +3 in $\beta$-NiOOH In the charge/discharge process, both electrons and protons are exchanged and, the processes are thought to be controlled by bulk solid diffusion of protons. The mechanism involves an equivalent diffusion of hydrogen ions through the solid-state lattices of $\beta$-Ni(OH)$_2$ and $\beta$-NiOOH so that there is a continuous change in the composition of the active material between fully charged $\beta$-NiOOH and fully-discharged $\beta$-Ni(OH)$_2$. However, under real conditions, the average nickel oxidation state of $\beta$-NiOOH is ~2.8, and only 0.8 electrons are available in $\beta$-Ni(OH)$_2$/$\beta$-NiOOH conversion.

Nickel oxyhydroxide (NiOOH) is thermodynamically unstable in the nickel metal hydride battery. Oxygen evolution occurs at the positive electrode as a parallel and competing reaction in the charge process. The parasitic reaction is represented as follows:

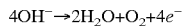

Figure 3:
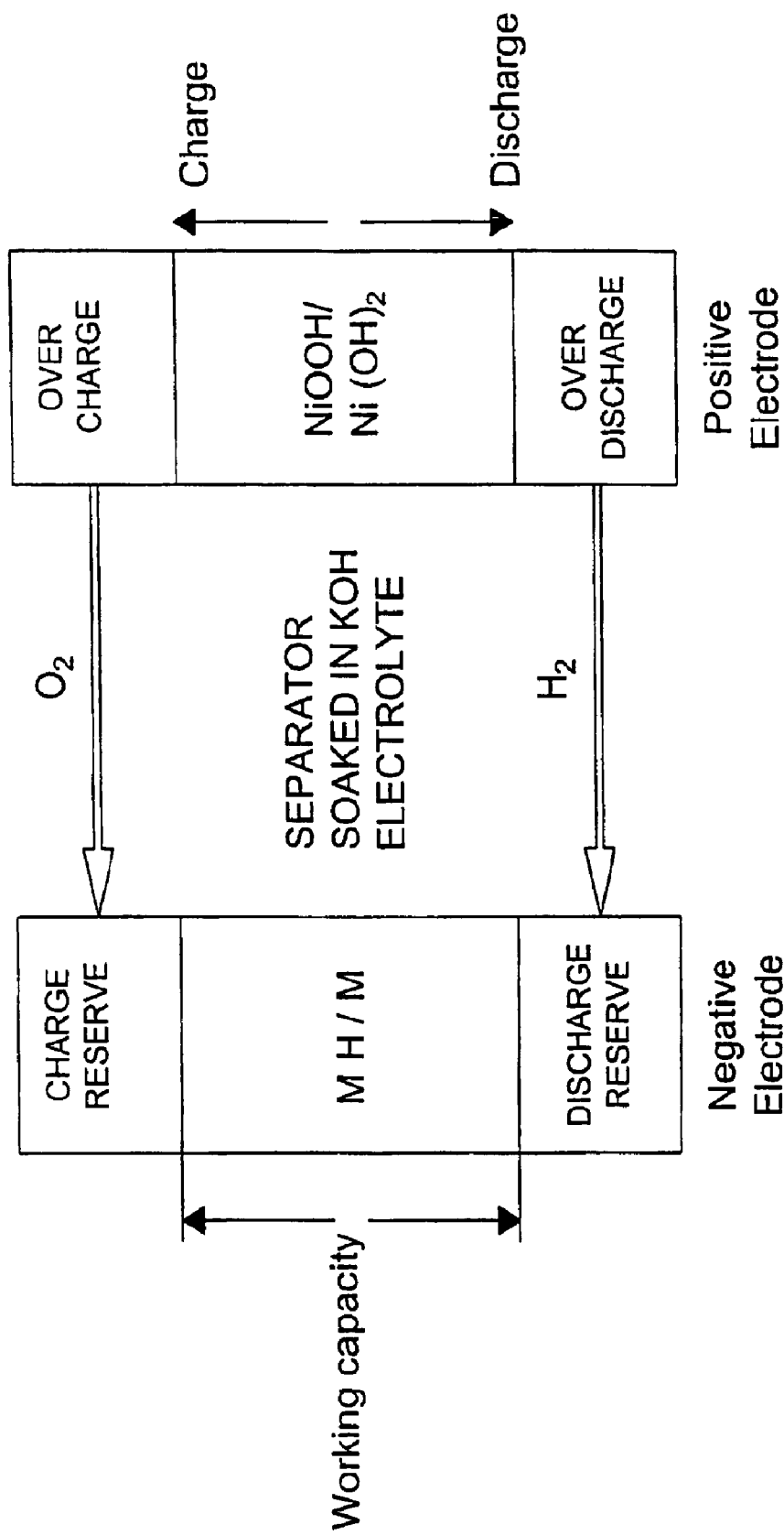
FIG. 3 shows the operating principle of a nickel-metal hydride cell.
Figure 4:
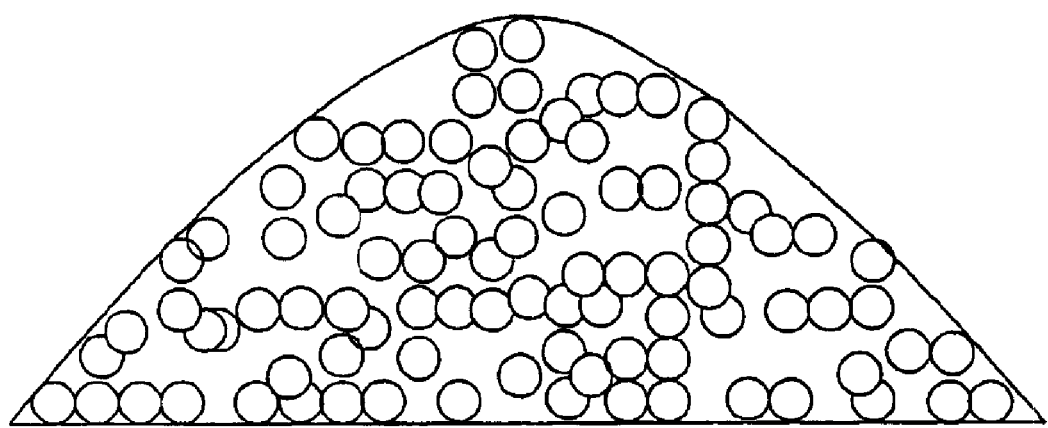
FIG. 4 shows a film configuration for non-magnetized electrodes.

To ensure proper functioning of a sealed Ni-MH battery, the capacity of a nickel metal hydride battery is limited by the nickel positive electrode. The negative electrode to positive electrode capacity ratio typically varies between 1.3 and 2.0. This means that the negative electrode has extra capacity. When a battery is charged, the positive electrode will reach full capacity first. If the charge process continues, oxygen evolves. The oxygen gas then diffuses to the negative electrode where it is recombined to form water. This oxygen cycle is very important for sealed nickel metal hydride battery applications. The mechanism is shown in FIG. 3.

Accordingly, the overall cell reaction for a nickel metal hydride battery is:

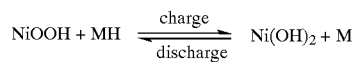

Overall, this is a one electron process with a standard potential of about 1.32 V. The charge state active material for nickel positive electrode is NiOOH and the discharge state is Ni(OH)$_2$.

The electrolyte in a nickel metal hydride cell is typically a concentrated potassium hydroxide (KOH) solution. Typical KOH solutions include, but are not limited to, 30 wt % potassium hydroxide, since such solutions have good ionic conductivity over a wide range of temperatures. In addition to KOH, additives such as LiOH or KBH$_4$ may be added to the electrolyte.

During the charge and discharge cycle of a Ni-MH battery, there is no net change in the electrolyte quantity or concentration. Water is generated during charge and consumed during discharge.

A separator is used in batteries to separate the positive electrode from the negative electrode. Examples of suitable materials for the separator include, but are not limited to, sulphonated or carbonated polypropylene. Such materials show good resistance to oxidation during charge and discharge cycles.

FIG. 3 shows the basic operating principle of a sealed Ni-MH rechargeable battery. Normally, in a nickel metal hydride battery, the negative electrode has extra capacity to avoid hydrogen gas generation during overcharge and oxygen gas generation during overdischarge.

At the negative electrode in the presence of the alloy and with an electrical potential applied, a hydrogen atom adsorbs on the surface of the alloy by electrolysis of water. The hydrogen atom diffuses into the metal and is stored in the alloy. The water is reduced, forming hydroxyl ions. The mechanism is illustrated below:

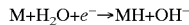

At the positive electrode, nickel hydroxide is oxidized to nickel oxyhydroxide. The hydroxide ion combines with the hydrogen from the nickel hydroxide to form water, as follows:

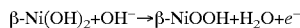

At the negative electrode, hydrogen is desorbed and combines with hydroxyl ion to form water, as shown below:

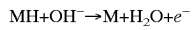

At the positive electrode, nickel oxyhydroxide is reduced to nickel hydroxide.

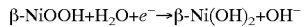

Because there is no net change in the electrolyte concentration or quantity, maintenance of electrolyte concentration results in good gas recombination, good high and low temperature performance, and good cycle life.

Once the battery is fully charged or discharged, if current is forced to flow through the battery, an overcharge or overdischarge process proceeds. Because both overcharge and overdischarge are harmful to battery performance, they are minimized in battery operation.

When the cell is fully charged, the Ni(OH)$_2$ is almost used up. As the charge process goes on, the overcharge reactions proceed. On overcharge, in the positive electrode, $\beta$-NiOOH transforms irreversibly to $\gamma$-NiOOH. The oxidation state of nickel in $\gamma$-NiOOH is +3.7. $\gamma$-NiOOH is electrochemically reversible with $\alpha$-Ni(OH)$_2$. Because a large number of electrons are exchanged per nickel atom during the α⇌γ phase transition, a higher theoretical capacity is expected for a nickel positive electrode comprising α-Ni(OH)$_2$. However, in an alkaline medium, α-Ni(OH)$_2$ transforms to β-Ni(OH)$_2$ on aging, resulting in the loss of positive electrode capacity. γ-NiOOH contains Ni$^{4+}$ and has a lattice constant of about 7 Å. Thus, the conversion of β-Ni(OH)$_2$ to γ-NiOOH is accompanied by a large volumetric change during overcharge process, and this may result in loss of contact between the active materials, thus causing capacity loss during charge-discharge cycling. Therefore, overcharging of the electrode is avoided in battery applications.

Besides the conversion of β-Ni(OH)$_2$ to γ-NiOOH on overcharge, the oxygen evolution reaction also occurs. Hydroxide ion is forced to lose electrons to form oxygen gas during the overcharge process, which causes the buildup of oxygen gas. For a sealed nickel metal hydride battery, the oxygen gas needs to cross the separator and move to the negative electrode where it reacts with the metal hydride. These reactions during cell overcharge are represented as follows:

$$4OH^- \rightarrow 2H_2O + O_2 + 4e^-$$

$$M + H_2O + e^- \rightarrow MH + OH^-$$

$$4MH + O_2 \rightarrow 4M + 2H_2O$$

Thus, the oxygen that crosses the cell consumes the charge of the negative electrode.

After the battery is completely discharged, an overdischarging process proceeds if the battery is forced to discharge further. Under deep-discharge conditions, due to the difference in storage capacities of the positive and negative electrodes, hydrogen evolution occurs at the positive electrode which is oxidized to water at the negative electrode. The reactions during the overdischarge process can be represented as follows:

$$H_2O + e^- \rightarrow \tfrac{1}{2}H_2 + OH^-$$

$$MH + OH^- \rightarrow M + H_2O + e^-$$

$$H_2 + 2OH^- \rightarrow 2H_2O + 2e^-$$

Thus, there are recombination mechanisms for both oxygen and hydrogen evolved during overcharge and overdischarge, respectively, permitting sealed operation of the Ni/MH batteries. Both reactions, however, reduce the charge on the negative electrode.

Magnetic effects on chemical reactions have been examined for many years. See, e.g., Turro et al., *Magnetic Field and Magnetic Isotope Effects in Organic Photochemical Reactions. A Novel Probe of Reaction Mechanisms and a Method for Enrichment of Magnetic Isotopes*, Accounts of Chemical Research 1980, 13, 369–377; and Buckachenko, A L., *Magnetic Effects in Chemical Reactions*, Ress. Chem. Rev. 1976, 45, 373–390. The field effect on fuel cells has been studied during the last several years. See, Leddy et al., *Magnetically Modified Fuel Cells*, in *39th Power Sources Proceedings*; 2000 pages 144–147. It has been shown that magnetic modification enhances fuel cell performance. Enhancements are most substantial in the kinetically controlled region above 0.5 V where power is increased several fold over similarly formed nonmagnetic fuel cells.

Gu and coworkers have identified three limitations to Ni-MH cell performance: finite diffusion rates inside the active material particles (Ni(OH)$_2$/NiOOH and ABE), ohmic drop in the electrolyte associated with ion motion in a viscous matrix, and charge transfer processes at the electrode/electrolyte interfaces, see, e.g., Gu et al., *Modeling Discharge an Charge Characteristics of Nickel-Metal Hydride Batteries*, Electrochimica ACTA 1999, 146, 2769–2779.

EXPERIMENTAL

I. General Considerations

A. Background

The performance of nickel hydroxide positive electrodes was examined. The performance of the nickel hydroxide electrode was evaluated by using a paste-type electrode including nickel hydroxide particles, binder, and, in some cases, other magnetizable microparticles or glass beads. As used herein, the phrase "nickel hydroxide slurry" is simply intended to indicate that the slurry at least contained nickel hydroxide particles; such slurries may also include glass beads or other magnetizable particles, as set forth hereinbelow. To form the electrode, the nickel hydroxide slurry was cast onto a platinum electrode that was used as the substrate and the current collector. Magnetized and non-magnetized electrodes, either with or without glass beads or other magnetizable particles, were examined by cyclic voltammetry and peak currents were recorded.

Experiments were carried out with a classical three-electrode electrochemical cell utilizing a working electrode, a counter electrode, and a reference electrode. The working electrode, where the reaction of interest took place, was a platinum disk coated with a nickel hydroxide slurry held downward and parallel to the earth. The electrode was coated with nickel hydroxide, nickel hydroxide plus other magnetizable materials, or nickel hydroxide plus glass beads. The surface area of the working electrode (Pine Instruments) was 0.459 cm$^2$. The counter electrode was a large piece of nickel foam that was spot welded to a nickel plate. The nickel foam was held parallel to the working electrode. A saturated calomel electrode (SCE) was employed as the reference electrode because it is an ideal, nonpolarizable electrode that provides a stable reference potential. In such a three-electrode system, no current passes through the reference electrode.

Data were collected using a Bioanalytical Systems (BAS) potentiostat, Model 100B/W Version 2. This potentiostat is a computer controlled system. The temperature of the cell was controlled by a refrigerated constant temperature circulator (Model VWR 1155).

B. Materials

Nickel hydroxide and cobalt extra fine powder were obtained from Union Miniere (UM), a Belgian-based group. UM Cobalt & Energy Products manufactures spherical nickel hydroxide at its wholly owned subsidiary TIMEX Inc., in Leduc (Alberta, Canada). The physical and chemical analysis data for nickel hydroxide are listed in Table 1. The physical and chemical properties of the extra fine cobalt powder are listed in Table 2. Nickel foam was obtained from INCO Selective Surfaces Inc. (Wyckoff, N.J.). Hydroxypropyl methylcellulose (2 wt % in H$_2$O) with viscosity of 15,000 cps, KOH, and nickel plate were purchased from Aldrich Chemical Company, Inc. (Milwaukee, Wis.). Unless otherwise indicated, iron oxide Fe$_3$O$_4$) particles and neodymium iron boron NdFeB) particles were coated with 3-aminopropyltrimethoxysilane. Uncoated samarium cobalt (Sm$_2$Co$_7$) was obtained from Polyscience.

TABLE 1

Physical and Chemical Properties of Spherical Nickel Hydroxide Particles (from UM Cobalt and Energy)

| | Principle uses | Ni-MH Batteries |
|---|---|---|
| Physical Data | Insoluble in water | |
| | Appearance | green powder |
| | Molecular weight | 92.7 |
| | Apparent density g/cm$^3$ | >1.6 |
| | Tap density g/cm$^3$ | 2.2 |

TABLE 1-continued

Physical and Chemical Properties of Spherical Nickel
Hydroxide Particles (from UM Cobalt and Energy)

| | Principle uses | Ni-MH Batteries |
|---|---|---|
| | Crystallinity FWHM 38.5 | 1.0 |
| | D(50) (Microtrac) m | 9–12 |
| | Surface Area, BET m$^2$/g | 12 or 20 |
| Chemical | Ni wt % | 57–62 |
| Typical | Co wt % | 0–5 |
| Value | Zn wt % | 0–5 |
| | Cd wt % | 0.0005 |
| | Mn wt % | 0.04 |
| | Cu wt % | 0.0005 |
| | Pb wt % | 0.0001 |
| | Fe wt % | 0.002 |
| | Ca wt % | 0.04 |
| | C wt % | 0.04 |
| | NO$_3$ wt % | 0.004 |
| | N as NH$_3$ wt % | 0.0175 |
| | SO$_4$ wt % | <0.4 |
| | H$_2$O wt % | <1.5 |

TABLE 2

Physical and Chemical Properties of Cobalt
Powder (from UM Cobalt and Energy)

| Physical Properties | Average diameter, nm | 1.42 | |
|---|---|---|---|
| | Tap density, g/cm | 2.2 | |
| | Apparent density, g/cm | 1.0 | |
| | Size Analysis | 0 to 5 nm | min %90 |
| | | 5 to 10 nm | max %10 |
| | | >10 nm | max %0.5 |
| Elemental Analysis: | | | |
| Chemical | Co | min wt % 99.85 | |
| Typical | C | max wt % 0.030 | |
| Value | S | max wt % 0.001 | |
| | Si | max wt % 0.005 | |
| | Mg | max wt % 0.005 | |
| | Mn | max wt % 0.005 | |
| | Cu | max wt % 0.002 | |
| | Ni | max wt % 0.080 | |
| | Ca | max wt % 0.005 | |
| | Fe | max wt % 0.015 | |
| | H$_2$ | loss than 0.46 wt % | |
| | O$_2$ | less than 0.23 wt % | |

C. Cleaning of Electrodes Prior to Coating

When cleaning the working electrode, the first step was to remove any previous films from the Pt electrode surface. The nickel hydroxide film can be removed by washing the electrode in water and then wiping the Pt electrode surface with a Kimwipe, taking care not to scratch the electrode surface.

The Pt electrode was then polished with silica powder in a slurry with water. To polish the electrode, the largest grit of silica powder was used first and then progressively finer grits were employed. In this study, silica powder of 3.0, 1.0, 0.3, and 0.05 microns was used. After polishing in one silica powder, the electrode was rinsed thoroughly to prevent mixing the powders. To provide consistent polishing to the entire electrode, the electrode was moved in a figure eight pattern.

After polishing, the electrode was rinsed thoroughly with Milli-Q purified water, placed in a beaker of Milli-Q water, and sonicated for 5 minutes. After sonication, the electrode was rinsed with water and then dipped into a beaker of concentrated nitric acid for approximately 30 seconds. Again, the electrode was rinsed thoroughly with Milli-Q water to rinse off the acid. After the final rinse with water, the electrode was left to air dry. Once dry, if a mirror-like finish was not apparent, the entire polishing procedure was repeated to remove any residue or visible imperfections.

The counter nickel foam electrode was cleaned by soaking in a beaker of concentrated nitric acid for several minutes. Upon removal, it was rinsed with copious amounts of Milli-Q water, then air-dried.

In this experiment, the SCE reference electrode was removed from the testing system immediately each time after the test was finished and thoroughly rinsed with Milli-Q water. The KCl solution in the SCE electrode was replaced every week.

D. Preparation of Slurries

For slurries containing only nickel hydroxide, nickel hydroxide powder was weighed on a 1/10000 gram balance. The nickel hydroxide powder was not shaken before use in the slurry.

Mixtures containing nickel hydroxide particles and either glass beads, cobalt powder, $Sm_2Co_7$, silane coated $Fe_3O_4$, or silane coated NdFeB were prepared. In these mixtures, the glass beads, $Fe_3O_4$ particles, NdFeB particles, and $Sm_2Co_7$ particles had diameters of about 2 micrometers, about 2 to 4 micrometers, about 5 to 7 micrometers, and about 5 to 7 micrometers, respectively.

By way of example, for the nickel hydroxide and cobalt mixture, nickel hydroxide powder and cobalt powder were weighed on a 1/10000 gram balance. The powders were poured into a 10 mL glass bottle and sealed. The bottle was shaken at 1000 oscillations per minute for about 30 minutes using a shaker (Thermolyne Maxi-Mix III™ Type 65800). The mixed powder was then ready to use in the slurry. For $Ni(OH)_2$/glass beads, $Ni(OH)_2/Sm_2Co_7$, $Ni(OH)_2/Fe_3O_4$, and $Ni(OH)_2$/NdFeB mixtures, the same procedure as for the $Ni(OH)_2$/Co mixture was followed.

The slurry was prepared as follows: 1.

1. Weighed 0.012 g hydroxypropyl methylceluose (HPMC);
2. Weighed 1.50 g pure nickel hydroxide or mixture;
3. Weighed 5.0 g Milli-Q water;
4. Poured the water into a clean 10 ml beaker;
5. Heated the beaker until the water was boiling on a Corning Stirrer/Hotplate;
6. Put a clean stir bar in the beaker and turned the stir speed to position 3;
7. Poured the HPMC into the beaker and turned off the heater;
8. Stirred the HPMC and water for one hour until the HPMC was completely dissolved;
9. Removed the stir bar,
10. Added the nickel hydroxide or mixture to the beaker;
11. Stirred the slurry for ten minutes with a clean glass stirring rod;
12. Allowed the slurry to rest for 16 hours;
13. Pipetted 3.7 gram water out of the slurry; and
14. Sealed the beaker for future use.

E. Preparation of Coated Electrodes

For non-magnetized electrodes, the polished and dried Pt electrode was placed on the lab bench such that the electrode surface was pointed upwards and parallel to the ceiling. The slurry was stirred with a clean glass stirring rod for three minutes until the particles were distributed evenly. Then, 5 μl of the slurry was removed by pipette and placed onto the center of the Pt electrode. The electrode was turned clockwise three times until the Pt surface was totally covered by the slurry, taking care not to scratch the Pt surface. All electrodes were coated with 5 μl of slurry unless otherwise noted. The electrode was left on the table at ambient temperature for one hour so that the water evaporated to form a film.

Figure 5:
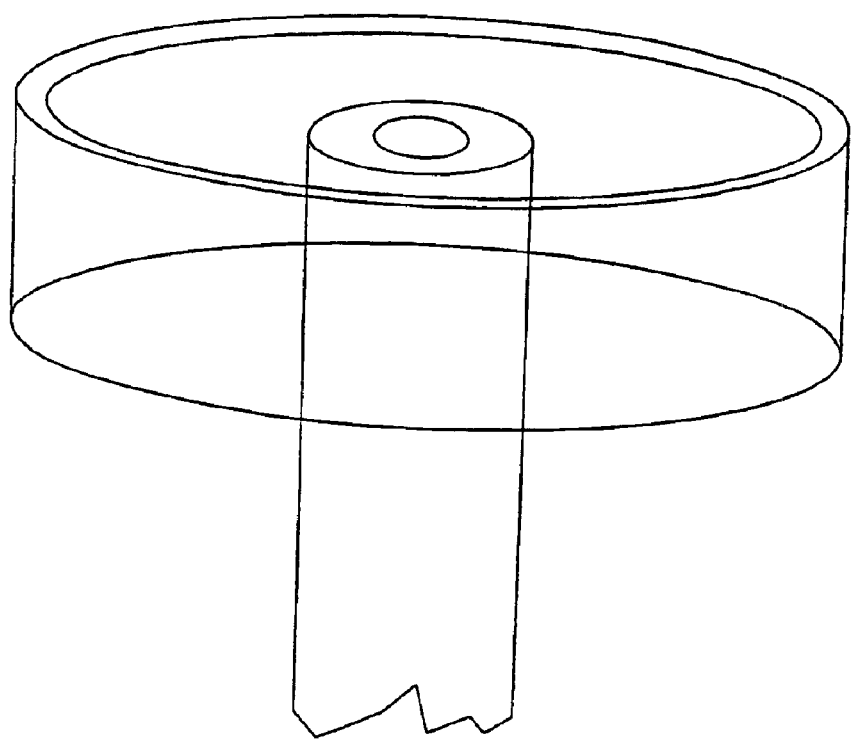
FIG. 5 shows an electrode configuration for drying a mixture according to the present invention.
Figure 6:
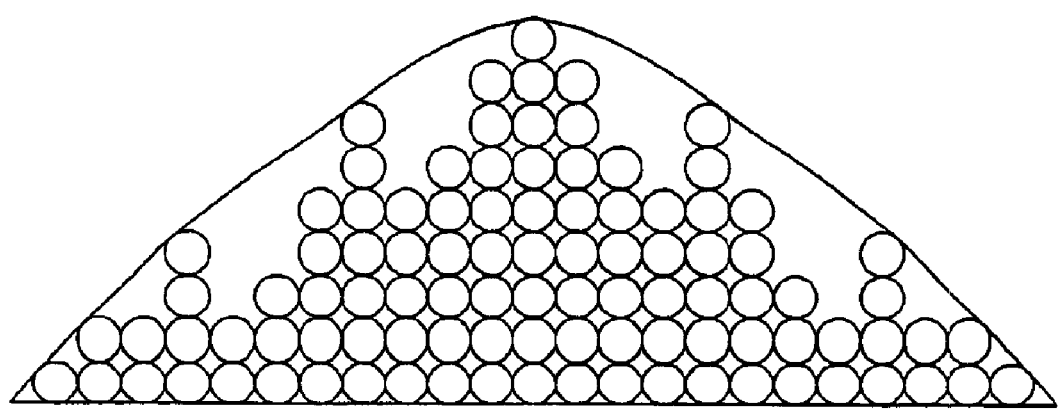
FIG. 6 shows a film configuration for magnetized electrodes.

For magnetized electrodes, the polished and dried Pt electrode was placed on the lab bench such that the electrode surface was pointed upwards and parallel to the surface of the lab bench. A magnet was placed around the Pt electrode as shown in FIG. 5. Then, 5 µl of the slurry was removed by pipette and placed onto the center of the Pt electrode, and the electrode was turned following the same procedure as for the non-magnetized electrode. The electrode was left on the bench at ambient temperature for one hour to evaporate the water. The particle distribution of a magnetized film is shown in FIG. 6. Unless otherwise indicated, the magnetic field had a field strength of about 0.2 T.

F. Activation of Electrodes

Before testing, the electrode was activated so that the optimized electrochemical properties were examined in the testing phase. The electrode was activated as follows:

1. The coated electrode was placed in a KOH solution for 10 minutes;
2. The working, counter, and reference electrodes were connected to the BAS testing system; and
3. The electrode was charged and discharged following the procedure listed in Table 3. The electrode was scanned from the initial potential to the high potential and then to the low potential.
4. The electrode was then ready for testing. Cyclic voltammetric tests were run in the same solution.

TABLE 3

Electrode Activation Procedure (2 Cycles for Each Step)

| Step | Init(mV) | High E(mV) | Low E(mV) | InitP/N | V(mV/sec) |
|---|---|---|---|---|---|
| 1 | 0 | 600 | 0 | P | 5 |
| 2 | 0 | 600 | 0 | P | 5 |
| 3 | 0 | 500 | 0 | P | 50 |
| 4 | 0 | 400 | 0 | P | 100 |
| 5 | 0 | 400 | 0 | P | 200 |
| 6 | 0 | 400 | 0 | P | 300 |
| 7 | 0 | 400 | 0 | P | 400 |

II. Electrodes Tested at Ambient Temperature

A. Background

Pt electrodes were coated with a slurry, as set forth above. Pt electrodes coated with a slurry containing only unmagnetized nickel hydroxide particles mimic the electrode structure used in conventional batteries containing a nickel hydroxide electrode. Electrode structures incorporating different types of particles were also examined. Some electrode structures included nickel hydroxide and other magnetizable particles. A structure formed with glass beads served as a control. For $Fe_3O_4$, $Sm_2Co_7$, and NdFeB, the maximum energy product increases in the order of $Fe_3O_4 < Sm_2Co_7 <$ NdFeB. Results were compared for each class of electrodes. Studies included performance as a function of temperature. Finally, results as a function of magnetic energy products and temperature were examined.

Electrodes were coated according to the procedures described above. Two sets of data were considered. The first set of data examined the effect of different coating thicknesses and allowed a scan rate study to investigate mass transport effects in the films. The second set of data are based on better formed films.

B. Films of Different Thicknesses

Different amounts of nickel hydroxide slurry were cast onto the Pt electrode. The electrodes were either not magnetized during casting or magnetized. Films were formed with 2.5, 5.0, or 10.0 µl of slurry. Cyclic voltammograms were recorded for magnetized and non-magnetized films.

Figure 7:
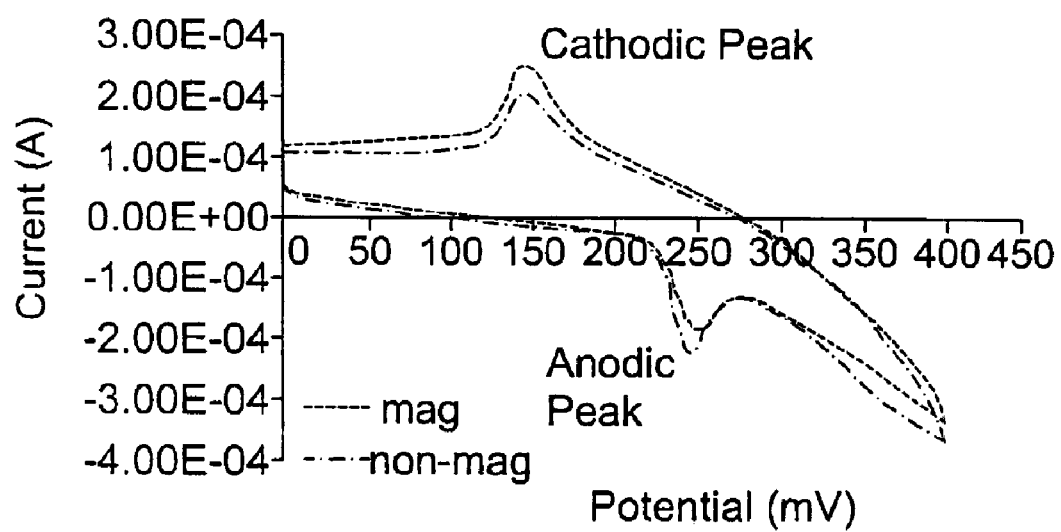
FIG. 7 shows cyclic voltammograms of magnetized and non-magnetized electrodes containing nickel hydroxide.

FIG. 7 illustrates the cyclic voltammograms for both types of electrodes with 5.0 µl slurry at a scan rate of 200 mV/sec. The cathodic peak is due to the reduction of NiOOH to $Ni(OH)_2$, and anodic peak is for the reverse process. As shown in FIG. 7, the peaks for magnetized electrodes were slightly sharper and bigger than those for non-magnetized electrodes. In the cyclic voltammograms, the cathodic peak was sharper than the anodic peak for both types of electrodes.

The peak currents for non-magnetized and magnetized electrodes coated with slurries containing only nickel hydroxide are shown in Table 4. These results indicate that for both non-magnetized and magnetized electrodes, the peak current ($i_p$) increases with the volume of $Ni(OH)_2$ slurry pipetted onto the electrode. For the electrodes with 2.5 µl and 5.0 µl of $Ni(OH)_2$ slurry, magnetized electrodes showed better performance than non-magnetized electrodes. Magnetized electrodes showed peak currents that were 20% to 200% bigger than non-magnetized electrodes. For electrodes coated with 10.0 µl of slurry, the peak currents were similar for both types of electrodes. While not wishing to be bound by theory, an explanation may be that the film structure for the magnetized electrodes formed with 10.0 µl slurry is different from the magnetized electrodes formed with either 2.5 or 5.0 µl slurry.

TABLE 4

Peak Currents for Non-magnetized and Magnetized $Ni(OH)_2$ Electrode at Different Scan Rates for 3 Slurry Volumes.

| Scan Rate (mV/sec) | $i_p(\mu A)$ | | | | | | | | |
|---|---|---|---|---|---|---|---|---|---|
| | non-mag | | | mag | | | Ratio | | |
| | 2.5 µl | 5.0 µl | 10.0 µl | 2.5 µl | 5.0 µl | 10.0 µl | 2.5 µl | 5.0 µl | 10.0 µl |
| 50 | 4.39 | 6.64 | 124 | 5.27 | 19.4 | 141 | 1.20 | 2.92 | 1.14 |
| 100 | 10.3 | 14.9 | 229 | 16.2 | 36.7 | 220 | 1.57 | 2.46 | 0.96 |
| 200 | 18.8 | 34.6 | 384 | 37.5 | 82.7 | 359 | 1.99 | 2.39 | 0.93 |
| 300 | 27.3 | 52.2 | 504 | 57.0 | 123 | 474 | 2.09 | 2.36 | 0.94 |
| 400 | 31.4 | 68.4 | 522 | 71.4 | 152 | 555 | 2.27 | 2.22 | 1.06 |

In Table 4, the peak currents for both magnetized and non-magnetized electrodes with 5 µl slurry at different scan rates are listed for representative data. At different scan rates, the peak currents of magnetized electrodes are about one to three times greater than those of non-magnetized electrodes. For both non-magnetized and magnetized electrodes, the peak currents get larger as the scan rates increase.

While not wishing to be bound by theory, it is thought that the electrode response can be controlled by either the diffusion of the reactive species to the active electrode interface or the limited amount of material on the electrode surface. The first yields the diffusion controlled response in which, for cyclic voltammetry under reversible conditions at a planar electrode, the peak current may be represented as follows:

$$i_p = 0.4463 \left(\frac{F^3}{RT}\right)^{1/2} n^{3/2} A D_0^{1/2} C_0^* v^{1/2}$$

where $i_p$ (A) is the peak current at a given cyclic voltammetric scan rate (υ, V/s). The diffusion coefficient ($cm^2/s$), concentration ($moles/cm^3$), electrode area ($cm^2$), and number of electrons transferred are $D_0$, $C_0^+$, A, and n, respectively. F, R, and T are Faraday's constant, the universal gas constant, and temperature (K), respectively.

When the response is determined by the amount of material on the electrode, the response is referred to as thin layer and the voltammograms have the shape of a Gaussian curve. The peak current for reversible conditions is defined as follows, where l is the thickness of the electroactive layer.

$$i_p = \frac{n^2 F^2 v A l C_0^*}{4RT}$$

Figure 8:
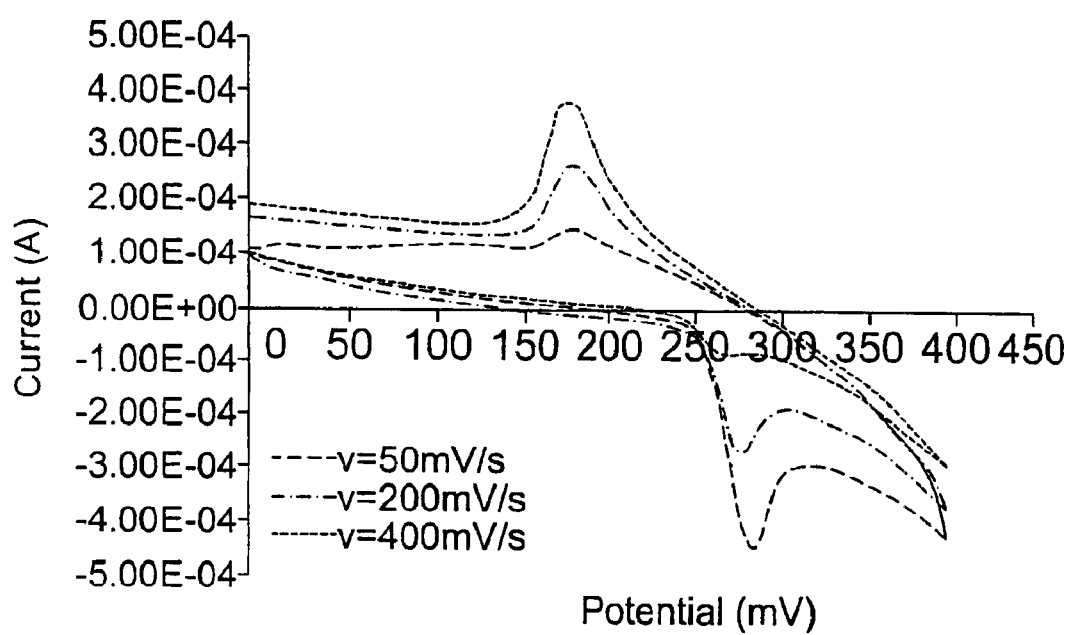
FIG. 8 shows cyclic voltammograms of magnetized and non-magnetized electrodes containing nickel hydroxide at different scan rates.
Figure 9:
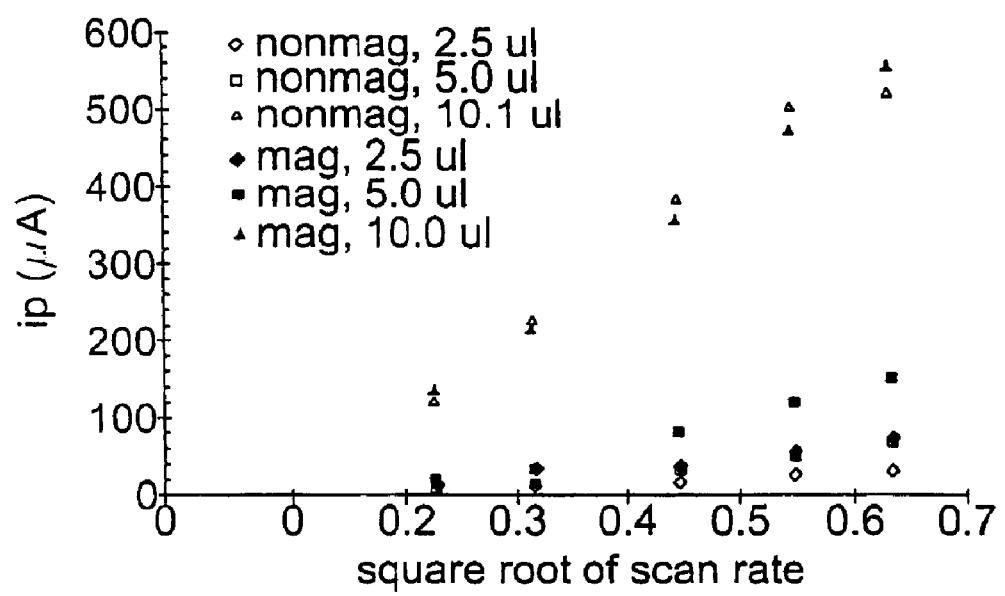
FIG. 9 shows the relationship between cathodic peak current and the square root of the scan rate for magnetized and non-magnetized electrodes containing nickel hydroxide.

The cyclic voltammograms for magnetized electrodes at different scan rates are shown in FIG. 8. In FIG. 8, the cathodic peak currents are shown as a function of $v^{1/2}$ (where $v$ is scan rate) for both types of electrodes. Table 5 gives the analysis data for peak currents as a function of the square root of scan rates. The relation between peak current and scan rate is shown in FIG. 9, and the analysis data is listed in Table 6. Based on the correlation coefficients and near zero intercepts, the electrodes with 2.5 μl and 5.0 μl slurry exhibit thin firm characteristics. For the electrodes with 10.0 μl slurry, the response is diffusion controlled. Thus, for the thin films, all the material in the films is reduced during the scan for scan rates as high as 400 mV/s.

TABLE 5

The Analysis Data for Peak Currents as a Function of the Square Root of Scan Rate.

| | non-mag | | | mag | | |
|---|---|---|---|---|---|---|
| | 2.5 μl | 50. μl | 10.0 μl | 2.5 μl | 5.0 μl | 10.0 μl |
| slope | 67.787 | 152.89 | 1015.8 | 164.83 | 335.11 | 1032.2 |
| intercept | −10.944 | −30.923 | −87.71 | −33.972 | 62.491 | −7.593 |
| $r^2$ | 0.9962 | 0.9873 | 0.9502 | 0.9946 | 0.9899 | 0.9983 |

TABLE 6

The Analysis Data for Peak Currents as a Function of Scan Rate.

| | non-mag | | | mag | | |
|---|---|---|---|---|---|---|
| | 2.5 μl | 50. μl | 10.0 μl | 2.5 μl | 5.0 μl | 10.0 μl |
| slope | 78.044 | 178.62 | 1144.8 | 191.41 | 390.02 | 1192.2 |
| intercept | 2.0488 | −2.1616 | 112.2 | −2.7226 | 0.8549 | 99.439 |
| $r^2$ | 0.9788 | 0.9988 | 0.8944 | 0.9942 | 0.994 | 0.9872 |

The potential difference (Delta E) for non-magnetized and magnetized electrodes at different scan rates are listed in Table 7. It increases with scan rate between 86 mV and 114 mV. For magnetized electrodes, the potential difference is slightly smaller than that of non-magnetized electrodes at the same scan rate.

TABLE 7

Delta E for Non-magnetized and Magnetized Ni(OH)$_2$ at Different Scan Rates.

| | Delta E (mV) | | | | | |
|---|---|---|---|---|---|---|
| Scan Rate | non-mag | | | mag | | |
| (m/V/sec) | 2.5 μl | 50. μl | 10.0 μl | 2.5 μl | 5.0 μl | 10.0 μl |
| 50 | 87 | 85 | 88 | 88 | 85 | 87 |
| 100 | 91 | 86 | 90 | 94 | 87 | 90 |
| 200 | 103 | 94 | 96 | 103 | 91 | 97 |

TABLE 7-continued

Delta E for Non-magnetized and Magnetized Ni(OH)$_2$ at Different Scan Rates.

| | Delta E (mV) | | | | | |
|---|---|---|---|---|---|---|
| Scan Rate | non-mag | | | mag | | |
| (m/V/sec) | 2.5 μl | 50. μl | 10.0 μl | 2.5 μl | 5.0 μl | 10.0 μl |
| 300 | 105 | 97 | 101 | 107 | 95 | 102 |
| 400 | 114 | 103 | 108 | 114 | 102 | 108 |

That there was a magnetic effect can be demonstrated by considering the peak currents found for magnetized and non-magnetized electrodes. It was noted that electrodes formed on the same day exhibited more similar characteristics. This may arise from settling and aging of the slurries. The data shown in Table 8 were collected for nonmagnetized and magnetized electrodes and are paired for electrodes formed on the same day. The currents were collected for 5.0 μl films at 200 mV/s. The average and standard deviation for 6 samples of pairwise ration is average $\chi=2.69$ and s=1.16. That this average is above 1.00 and there was a magnetic effect is determined from a one sided student's t-test. For n samples and n−1 degrees of freedom, $t_{calc}=(-1.00)/s$. The hypothesis that the system mean, $\mu<1.00$, is rejected at a given confidence level provided that the t-value from a one sided t-table, $t_{table}$, is greater than $t_{calc}$. From the data in Table 8, $t_{calc}<t_{table}$ for confidence levels as high as 99.5%.

TABLE 8

Pairwise Ratio of Magnetic to Nonmagnetic Peak Currents for 5.0 μl Slurry at 200 mV/s.

| $i_p$(non-mag) (μA) | $i_p$(mag) (μA) | $\frac{i_p(\text{non-mag})}{i_p(\text{mag})}$ |
|---|---|---|
| 18.8 | 82.7 | 4.40 |
| 19.9 | 71.6 | 3.60 |
| 54.6 | 79.6 | 1.46 |
| 49.5 | 74.2 | 1.50 |
| 36.4 | 92.8 | 2.55 |

TABLE 8-continued

Pairwise Ratio of Magnetic to Nonmagnetic Peak
Currents for 5.0 µl Slurry at 200 mV/s.

| $i_p$(non-mag) (µA) | $i_p$(mag) (µA) | $\frac{i_p(\text{non-mag})}{i_p(\text{mag})}$ |
|---|---|---|
| 46.3 | 121.1 | 2.62 |
|  | Average | 2.69 |
|  | St. Dev. | 1.16 |

The activation process was also tested for both magnetized and non-magnetized electrodes. The results are listed in Table 9. At the first cycle (segment 1 and segment 2), both electrodes have no peaks corresponding to the interchange of $Ni(OH)_2$ and NiOOH Starting from cycle two (segment 3 and segment 4), both electrodes show the oxidation and reduction reactions for nickel hydroxide and nickel oxyhydroxide. The peak currents for the magnetized electrode are consistently bigger than those of the non-magnetized electrode at the same segment; this shows that the magnetized electrode was easier to activate than the non-magnetized electrode.

TABLE 9

Activation Performance for Magnetized and Non-magnetized Electrodes
Coated Only With Nickel Hydroxide (v = 5 mV/sec).

|  | $E_p$(mV) | | $i_p$(µA) | |
|---|---|---|---|---|
|  | mag | non-mag | mag | non-mag |
| Segment 1 | — | 517 | — | 445 |
| Segment 2 | 148 | — | 7.25 | — |
| Segment 3 | 224 | 220 | −35.5 | −28.8 |
| Segment 4 | 144 | 143 | 16.8 | 7.10 |
| Segment 5 | 222 | 219 | −43.6 | −29.6 |
| Segment 6 | 144 | 142 | 23.7 | 14.7 |

C. Optimally Formed Films
1. Nickel Hydroxide

Figure 10:
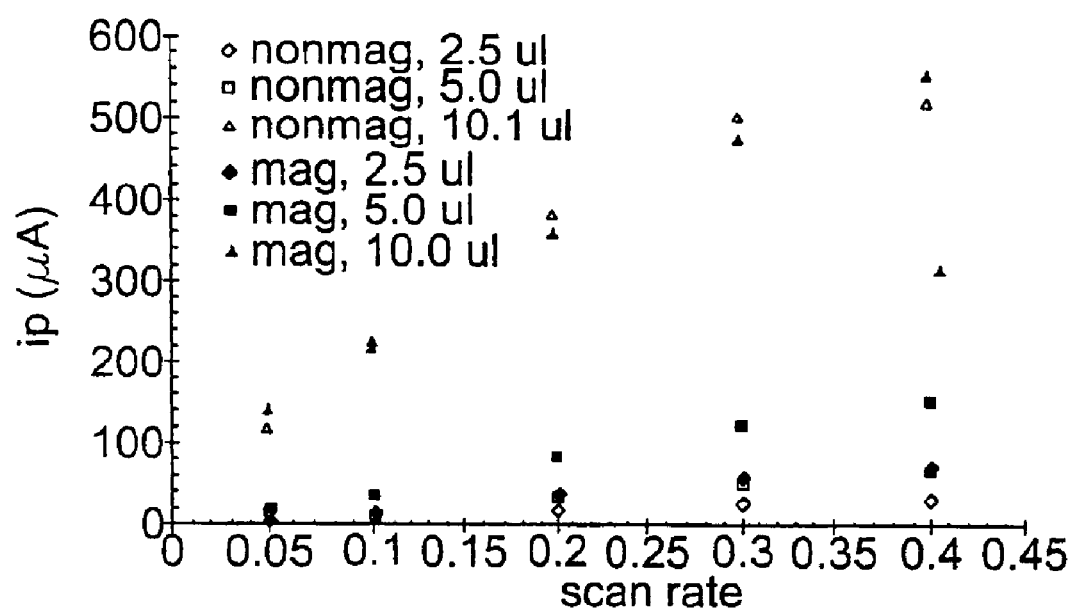
FIG. 10 shows the relationship between cathodic peak current and scan rate for magnetized and non-magnetized electrodes containing nickel hydroxide.

The following data were collected using the best established protocol for coating $Ni(OH)_2$ films. The data shown in Table 10 were collected for non-magnetized and magnetized electrodes and are paired for electrodes formed on the same day. The currents were collected at a scan rate of 200 mV/s. Unless otherwise stated, the films were formed with 5 µl of slurry. FIG. 10 shows the relationship between cathodic peak current and scan rate for magnetized and non-magnetized electrodes coated with a slurry containing nickel hydroxide.

TABLE 10

Pairwise Ratio of Magnetic to Nonmagnetic Peak
Currents for 5.0 µl Slurry at 200 mV/s for
Benchmark Nickel Hydroxide Electrodes.

| $i_p$(non-mag) (µA) | $i_p$(mag) (µA) | $\frac{i_p(\text{non-mag})}{i_p(\text{mag})}$ |
|---|---|---|
| 118.7 | 162 | 1.36 |
| 169.3 | 192 | 1.13 |
|  | Average | 1.25 |
|  | St. Dev. | 0.16 |

That there was a magnetic effect is determined from a pairwise examination of the ratio of the peak currents for the magnetic and non-magnetic samples. The samples were formed from 5.0 µl and peak currents recorded at 200 mV/s.

For average $\chi \pm s = 1.25 \pm 0.16$ and one degree of freedom, the hypothesis that there was no magnetic effect is rejected at the 87% level.

2. Nickel Hydroxide with 5 wt % Glass Beads

Figure 11:
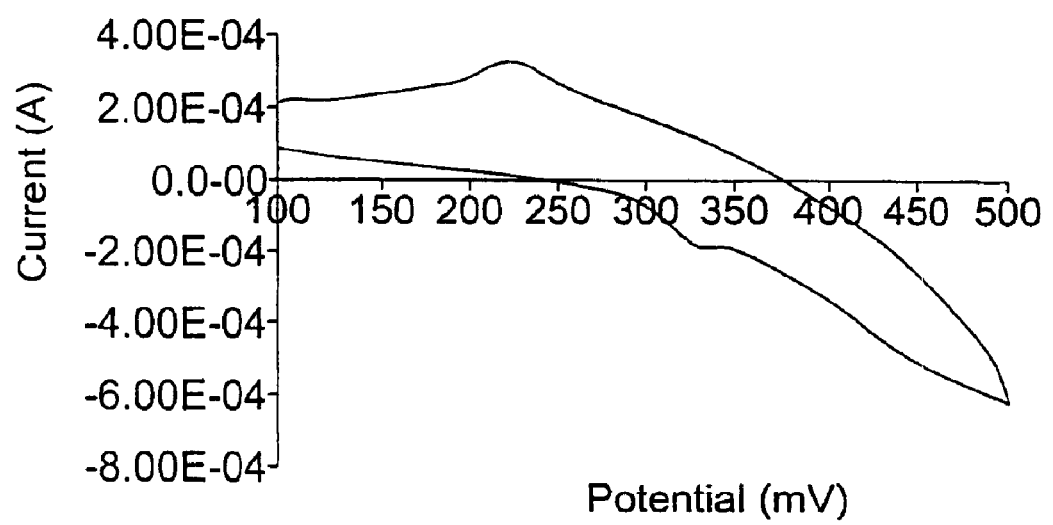
FIG. 11 shows a cyclic voltammogram for a non-magnetized electrode containing nickel hydroxide and 5 wt % glass beads.

In order to compare the results of electrodes with silane coated $Fe_3O_4$ and silane coated NdFeB, 5 wt % uncoated glass beads added to nickel hydroxide powder served as the control. FIG. 11 is the cyclic voltammogram for the electrode formed with 5 µl of slurry. The peak currents are listed in Table 11. In Table 11, "forward" means the electrodes were tested at 25° C. in the beginning of testing process and "reverse" means that the temperature was cooled to −15° C., then warmed back up to 25° C., and the electrodes were tested at 25° C. again. Compared to the results of electrodes formed from slurries containing only nickel hydroxide, the peak currents of electrode with 5 wt % glass beads are 7% smaller.

TABLE 11

Peak Currents for $Ni(OH)_2$ + Glass Bead
(5%) Mixture Electrode (V = 200 mV/sec)

| cathodic peak $i_p$(µA) | | anodic peak $i_p$(µA) | |
|---|---|---|---|
| forward | reverse | forward | reverse |
| 9.90 | 20.5 | −131 | −78.3 |

3. Nickel Hydroxide with 15 wt % Cobalt

Figure 12:
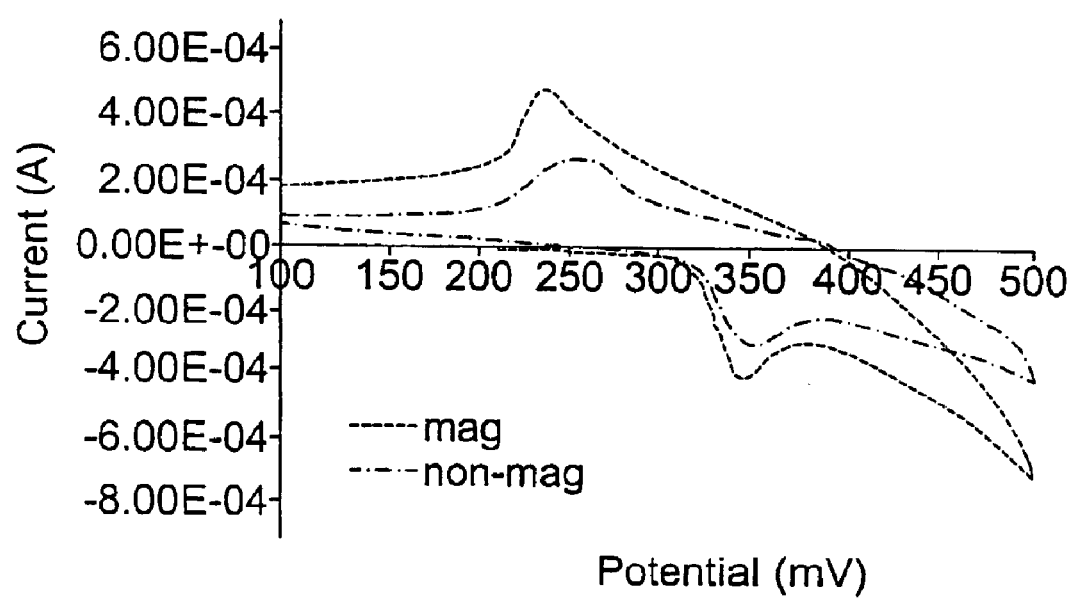
FIG. 12 shows cyclic voltammograms for magnetized and non-magnetized electrodes containing nickel hydroxide and 15 wt % Co.

Cobalt has been found to be an advantageous additive in nickel metal hydride batteries because it can enhance battery utilization and reduce battery deterioration. Because cobalt is also magnetizable, the non-magnetized and magnetized nickel hydroxide with cobalt powder electrodes were examined. The cyclic voltammograms for the magnetized and non-magnetized electrodes made from slurries containing nickel hydroxide and 15 wt % cobalt are shown in FIG. 12. Tables 12 and 13 give the cathodic peak and anodic peak currents, respectively, for both the non-magnetized and magnetized electrodes.

Two samples were tested for both magnetized and non-magnetized electrodes. Compared to the electrode not containing cobalt, the peak currents were lower as shown by the ratio of mag/nonmag $Ni(OH)_2$ in Table 12. For the electrode with 15 wt % cobalt, the average cathodic peak current values show that magnetized electrodes performed better than non-magnetized electrodes. For the anodic peak, the non-magnetized electrodes had higher currents than magnetized electrodes, but oxygen evolution reaction was included in this peak.

TABLE 12

Cathodic Currents for Non-magnetized and Magnetized
$Ni(OH)_2$ + Co(15%) (v = 200 mV/sec).

| $i_p$(µA) | | ratio | |
|---|---|---|---|
| non-mag | mag | mag/non-mag | mag/non-mag $N_i(OH)_2$ |
| 65.8 ± 23.6 | 83.6 ± 22.2 | 1.27 ± 0.45 | .58 ± 0.36 |

TABLE 13

Anodic Currents for Non-magnetized and Magnetized Ni(OH)$_2$ + Co(15%) (v = 200 mV/sec).

| non-mag | | mag | | ratio | |
|---|---|---|---|---|---|
| forward | reverse | forward | reverse | forward | reverse |
| −277 | −161 | −224 | −146 | 0.81 | 0.90 |

The potential difference (Delta E) for electrodes with 15 wt % cobalt (Table 14) was slightly larger than that of pure nickel hydroxide electrodes. For magnetized electrodes, the potential difference was 10 mV to 30 mV larger than non-magnetized electrodes.

TABLE 14

Delta E for Magnetized and Non-magnetized Ni(OH)$_2$+ Co(15%) Mixture Electrodes (v = 200 mV/sec).

| non-mag | | mag | |
|---|---|---|---|
| forward | reverse | forward | reverse |
| 88 | 126 | 110 | 135 |

4. Nickel Hydroxide with Iron Oxide

Figure 13:
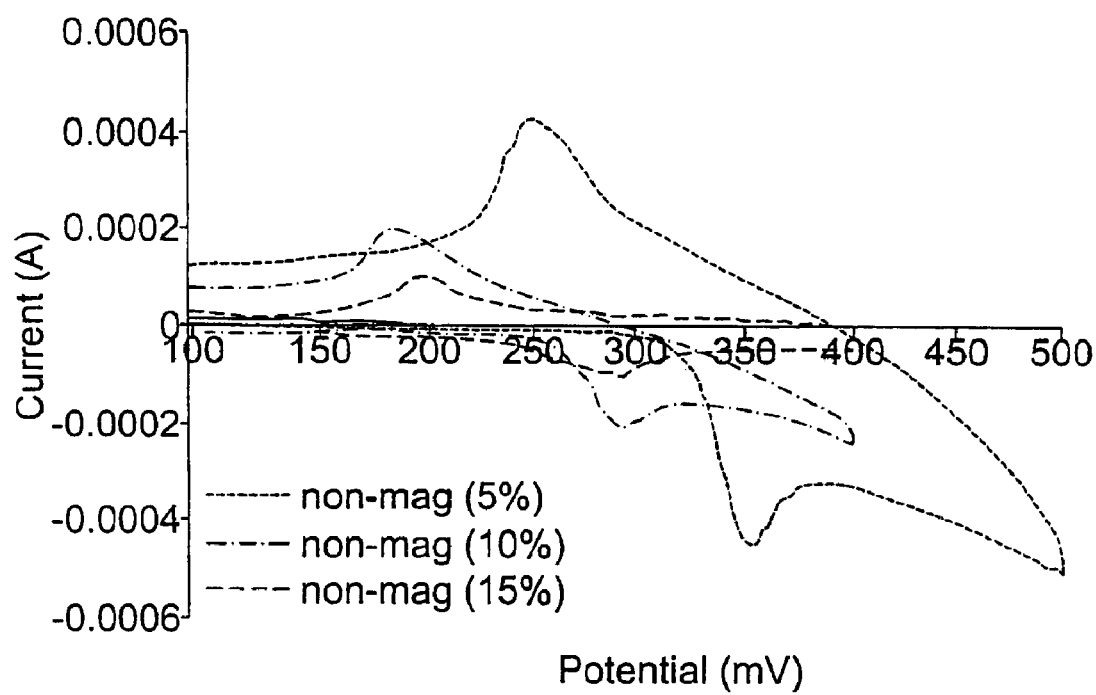
FIG. 13 shows cyclic voltammograms for non-magnetized electrodes containing nickel hydroxide and 5, 10 or 15 wt % $Fe_3O_4$.
Figure 14:
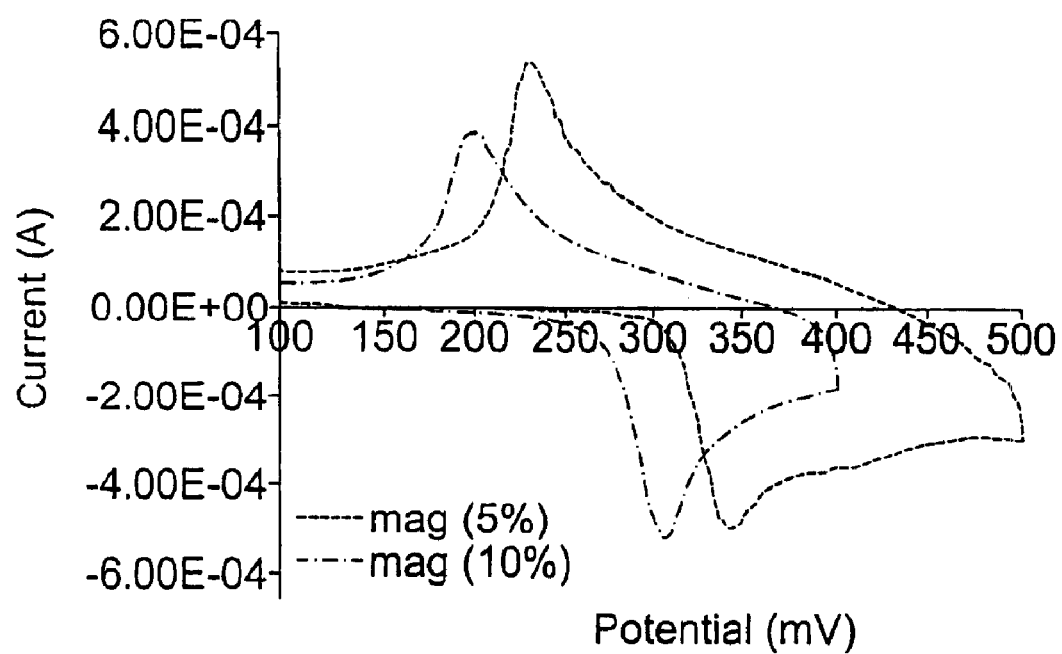
FIG. 14 shows cyclic voltammograms for magnetized electrodes containing nickel hydroxide and 5 or 10 wt % $Fe_3O_4$.

The slurries used to prepare these electrodes contained nickel hydroxide powder and differing amounts of iron oxide (Fe$_3$O$_4$) particles. FIG. 13 shows the cyclic voltammograms for non-magnetized electrodes coated with films containing nickel hydroxide and 5, 10, or 15 wt % iron oxide particles. The voltammograms were carried out at room temperature. FIG. 14 shows the cyclic voltammograms for magnetized electrodes coated with films containing nickel hydroxide and 5 or 10 wt % iron oxide.

The cathodic peak currents for non-magnetized nickel hydroxide with 5, 10, and 15 wt % iron oxide and magnetized nickel hydroxide with 5 and 10 wt % iron oxide are listed in Table 15. For each type of electrode, 2 to 4 samples were tested. For the non-magnetized and magnetized electrodes containing 5 wt % iron oxide, the peak currents were larger than the non-magnetized electrodes coated with only nickel hydroxide or the electrodes containing 5 wt % glass beads. The cathodic peak currents for magnetized electrodes containing 10 wt % iron oxide were larger than those for non-magnetized electrodes. For electrodes containing 5 wt % iron oxide, magnetized electrodes had larger peak currents than non-magnetized electrodes, compared to electrodes coated with only nickel hydroxide.

With increasing iron oxide content, performance of the non-magnetized electrodes dropped. Magnetized electrodes had the same trend with respect to iron oxide content, but for magnetized electrodes containing 10 wt % iron oxide, the decrease of the peak current was smaller than for non-magnetized electrodes.

Magnetized electrodes containing 15 wt % iron oxide were also tested. But at high iron oxide content, in the presence of a magnet, the iron oxide particles clustered in the center of the electrode. The peak currents were too small to be recorded. Table 16 gives the anodic peak currents for both non-magnetized and magnetized electrodes. Potential differences for both types of electrodes are listed at Table 17, where they are 10 mV to 20 mV larger than the potential difference for the electrodes with pure nickel hydroxide. For the anodic currents and potential difference, only average data are listed.

TABLE 15

Cathodic Currents for Non-magnetized and Magnetized Ni(OH)$_2$ containing Varying Amounts of Fe$_3$O$_4$ (v = 200 mV/sec).

| | $i_p$ ($\mu$A) | | ratio | |
|---|---|---|---|---|
| | | | mag/ | mag/ |
| Amount | non-mag | mag | non-mag | non-mag Ni(OH)$_2$ |
| 5% | 211 ± 140 | 267 ± 43.8 | 1.27 ± 0.86 | 1.85 ± 0.55 |
| 10% | 64.9 ± 14.1 | 215 ± 6.43 | 3.31 ± 0.73 | 1.49 ± 0.37 |
| 15% | 41.1 ± 13.5 | — | — | — |

TABLE 16

Anodic Currents for Non-magnetized and Magnetized Ni(OH)$_2$ Containing Varying Amounts of Fe$_3$O$_4$ Electrodes (v = 200 mV/sec).

| | $i_p$($\mu$A) | | | | ratio | |
|---|---|---|---|---|---|---|
| | non-mag | | mag | | mag/non-mag | |
| Amount | forward | reverse | forward | reverse | forward | reverse |
| 5% | −560 | −397 | −543 | −335 | 0.97 | 0.84 |
| 10% | −70.6 | −51.2 | −412 | −246 | 5.83 | 4.80 |
| 15% | −145 | −85.9 | ~0 | ~0 | NA | NA |

TABLE 17

Average Delta E for Non-magnetized and Magnetized Ni(OH)$_2$ Containing Varying Amounts of Fe$_3$O$_4$ (v = 200 mV/sec).

| | Delta E (mV) | | | |
|---|---|---|---|---|
| | non-mag | | mag | |
| Amount | Forward | reverse | forward | reverse |
| 5% | 12 | NA | 103 | 128 |
| 10% | 90 | 74 | 97 | 100 |
| 15% | 105 | 128 | NA | NA |

The pairwise ratio of magnetic to nonmagnetic peak currents recorded for 5.0 $\mu$l slurries at 200 mV/s are shown in Table 18. For 2 degrees of freedom, the hypothesis that $\mu$<1.00 is rejected at the 87% confidence level.

TABLE 18

Pairwise Ratio of Magnetic to Nonmagnetic Peak Currents for 5.0 $\mu$l Slurry at 200 mV/s.

| $i_p$ (non-mag) ($\mu$A) | $i_p$ (mag) ($\mu$A) | $\frac{i_p(\text{non-mag})}{i_p (\text{mag})}$ |
|---|---|---|
| 91.4 | 119.0 | 1.30 |
| 111.9 | 298.4 | 2.67 |
| 237.9 | 276.7 | 1.16 |
| | Average | 1.17 |
| | St. Dev. | 0.83 |

5. Nickel Hydroxide Containing NdFeB

Figure 15:
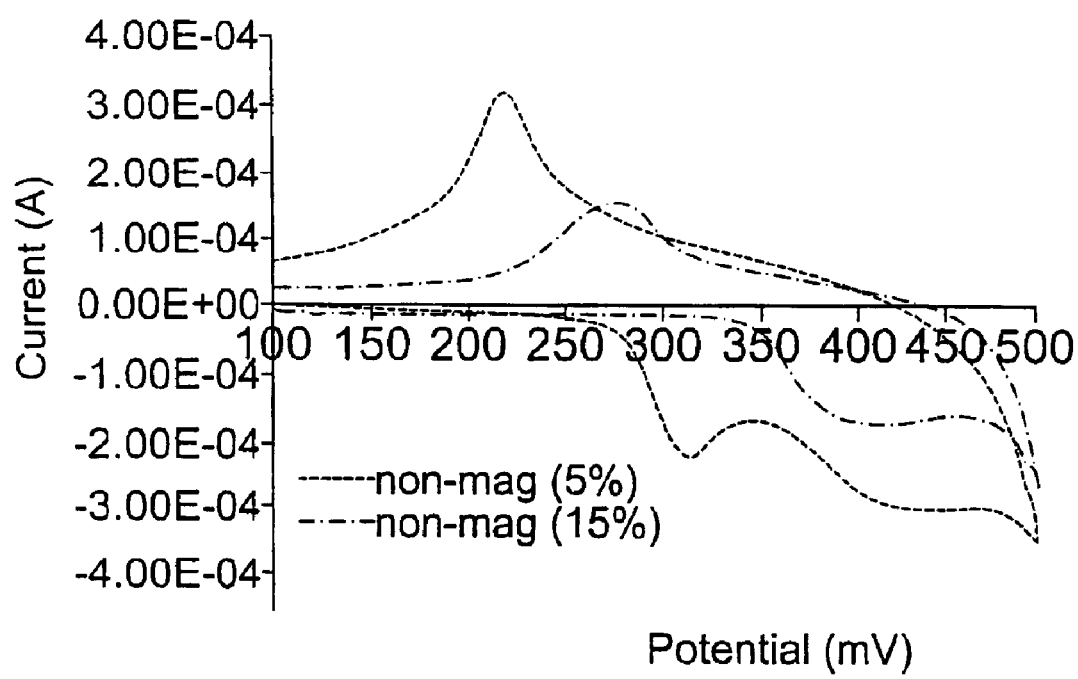
FIG. 15 shows cyclic voltammograms for non-magnetized electrodes containing 5 or 15 wt % NdFeB.
Figure 16:
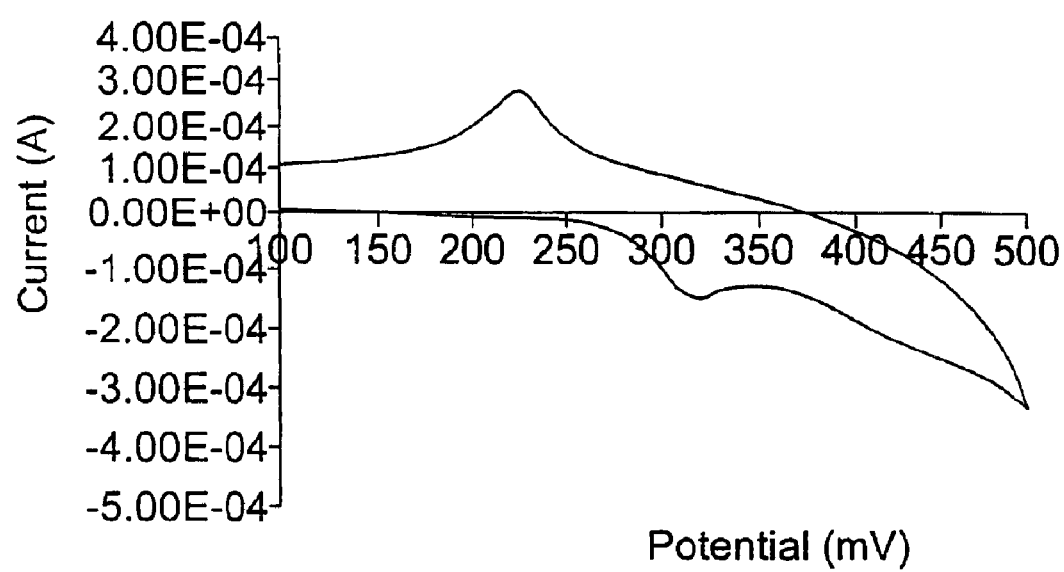
FIG. 16 shows cyclic voltammograms for magnetized electrodes containing nickel hydroxide and NdFeB.

The cyclic voltammograms for non-magnetized electrodes coated with nickel hydroxide containing 5 or 15 wt % NdFeB tested at 25° C. are shown at FIG. 15. FIG. 16 shows the cyclic voltammograms for magnetized electrodes coated with nickel hydroxide containing 5 wt % NdFeB.

Table 19 gives the cathodic peak currents for non-magnetized and magnetized electrodes coated with nickel hydroxide containing 5 or 15 wt % NdFeB. The average anodic peak currents are listed in Table 20. Two to three samples were tested for each loading. For magnetized electrodes containing 15 wt % NdFeB, results are not recorded because the particles clustered in the center.

For non-magnetized electrodes, electrodes containing 5 wt % NdFeB had larger cathodic peak currents than electrodes containing 15 wt % NdFeB. Compared to the non-magnetized electrodes containing 5 wt % NdFeB, the average cathodic peak current value for magnetized electrodes was smaller. Because only one set of magnetized and non-magnetized electrodes was tested on the same date, the pairwise analysis is not included here.

The average cathodic peak current for magnetized electrodes containing 5 wt % NdFeB was slightly smaller than non-magnetized electrodes coated only with nickel hydroxide. Table 21 lists the average Delta E for non-magnetized and magnetized electrodes tested at ambient temperature. Delta E values are 10 mV larger than the electrodes coated only with nickel hdroxide.

TABLE 19

Cathodic Currents for Non-magnetized and Magnetized $Ni(OH)_2$ Containing Varying Amounts of NdFeB (v = 200 mV/sec).

| | $i_p$ ($\mu A$) | | ratio | |
| --- | --- | --- | --- | --- |
| Amount | non-mag | mag | mag/non-mag | mag/non-mag $Ni(OH)_2$ |
| 5% | 169 ± 44.6 | 138 ± 30.8 | 0.82 ± 0.28 | 0.95 ± 0.31 |
| 15% | 62.0 ± 9.9 | 0 | NA | NA |

TABLE 20

Anodic Currents for Non-magnetized and Magnetized $Ni(OH)_2$ Containing Varying Amounts of NdFeB (v = 200 mV/sec).

| | $i_p(\mu A)$ | | | | ratio | |
| --- | --- | --- | --- | --- | --- | --- |
| | non-mag | | mag | | mag/non-mag | |
| Amount | forward | reverse | forward | reverse | forward | reverse |
| 5% | −252 | −200 | −191 | −171 | 760.84 | 0.86 |
| 15% | −171 | −145 | — | — | — | — |

TABLE 21

Average Delta E for $Ni(OH)_2$ with 2 Amounts of NdFeB Mixture Electrodes (v = 200 mV/sec).

| | Delta E(mV) | | | |
| --- | --- | --- | --- | --- |
| | non-mag | | mag | |
| Amount | forward | reverse | forward | reverse |
| 5% | 98 | 114 | 99 | 104 |
| 15% | 123 | 156 | NA | NA |

6. Nickel Hydroxide Containing $Sm_2CO_7$

Figure 17:
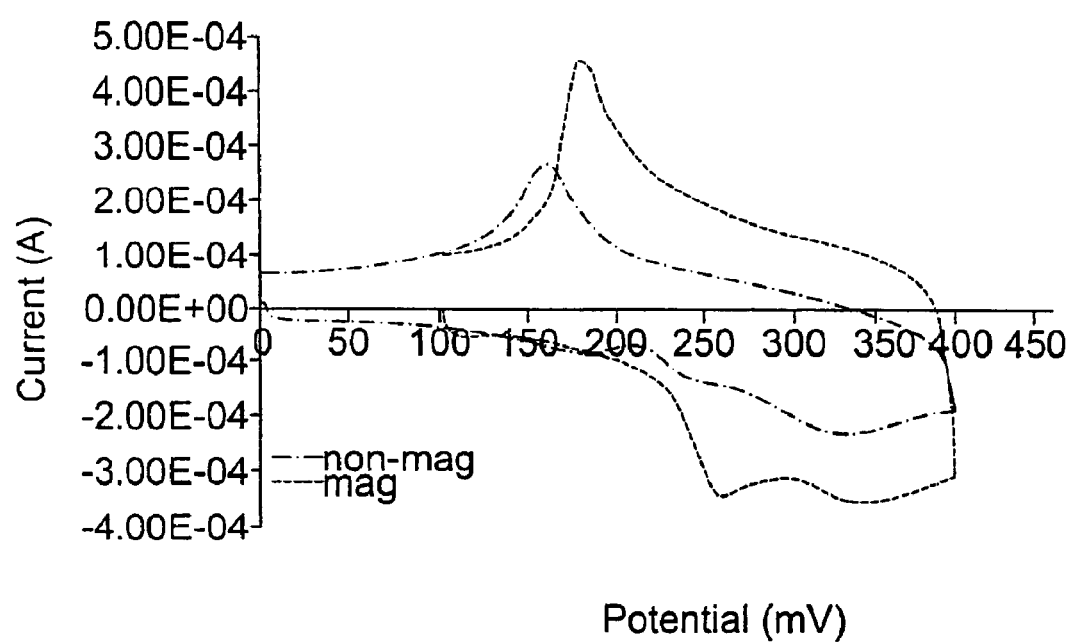
FIG. 17 shows cyclic voltammograms for non-magnetized electrodes containing nickel hydroxide and 5 wt % samarium cobalt.

FIG. 17 shows the cyclic voltammograms for non-magnetized and magnetized electrodes coated with nickel hydroxide containing 5 wt % uncoated $Sm_2Co_7$. Magnetized electrodes had sharper and bigger peaks than non-magnetized electrodes. The cathodic peak and anodic peak currents for non-magnetized electrodes containing 5 and 10 wt % $Sm_2Co_7$ and magnetized electrodes containing 5 wt % $Sm_2Co_7$ are listed in Tables 22 and Table 23, respectively. Two samples were tested for each case. For electrodes containing 5 wt % $Sm_2Co_7$, the cathodic peak currents for magnetized electrodes were bigger than the currents for non-magnetized electrodes. Compared to non-magnetized electrodes coated only with nickel hydroxide, the magnetized electrodes containing 5 wt % $Sm_2Co_7$ showed better performance. For non-magnetized electrodes, the electrodes containing 10 wt % $Sm_2Co_7$ showed better performance than electrodes containing 5 wt % $Sm_2CO_7$. For magnetized electrodes containing 10 wt % $Sm_2Co_7$, the result was not recorded because the particles clustered in the electrode center. Table 24 shows the average Delta E values for the electrodes. Magnetized electrodes have slightly smaller Delta E values than non-magnetized electrodes.

TABLE 22

Cathodic Currents for Non-magnetized and Magnetized $Ni(OH)_2$ Containing Varying Amounts of $Sm_2Co_7$ (v = 200 mV/sec).

| | $i_p$ ($\mu A$) | | ratio | |
| --- | --- | --- | --- | --- |
| Amount | non-mag | mag | mag/non-mag | mag/non-mag $Ni(OH)_2$ |
| 5% | 122 ± 32.3 | 334 ± 162 | 2.74 ± 1.51 | 2.32 ± 1.24 |
| 10% | 176 ± 48.7 | 0 | NA | NA |

TABLE 23

Anodic Currents for Non-magnetized and Magnetized $Ni(OH)_2$ Containing Varying Amounts of $Sm_2Co_7$ (v = 200 mV/sec).

| | $i_p(\mu A)$ | | | | ratio | |
| --- | --- | --- | --- | --- | --- | --- |
| | non-mag | | mag | | mag/non-mag | |
| Amount | forward | reverse | forward | reverse | forward | reverse |
| 5% | −356 | −262 | −554 | −333 | 1.56 | 1.27 |
| 10% | −191 | −162 | — | — | — | — |

TABLE 24

Average Delta E for Non-magnetized and Magnetized $Ni(OH)_2$ Containing Varying Amounts of $Sm_2Co_7$ (v = 200 mV/sec).

| | Delta E (Mv) | | | |
| --- | --- | --- | --- | --- |
| | non-mag | | mag | |
| Amount | forward | reverse | forward | reverse |
| 5% | 95 | 126 | 87 | 89 |
| 10% | 81 | 78 | NA | NA |

A pairwise examination (Table 25) of the $Sm_2Co_7$ data indicates that there was a magnetic effect. For average $\chi \pm s = 2.63 \pm 0.12$, the hypothesis that there was no magnetic effect is rejected at the 98.3% level.

TABLE 25

Pairwise Ratio of Magnetic to Non-magnetic
Peak Currents for 5.0 µl Slurry at 200 mV/s
for Ni(OH)$_2$ Containing 5% Sm$_2$Co$_7$

| $i_p$ (non-mag) (µA) | $i_p$ (mag) (µA) | $\frac{i_p(\text{non-mag})}{i_p(\text{mag})}$ |
|---|---|---|
| 80.9 | 220 | 2.72 |
| 176 | 448 | 2.55 |
|  | Average | 2.63 |
|  | St. Dev. | 0.12 |

D. Results

Electrode performance at ambient temperature was tested for electrodes with coatings comprising pure nickel hydroxide, 5 wt % glass beads, 15 wt % Co, iron oxide, NdFeB, or Sm$_2$Co$_7$. The electrode with 5 wt % glass beads was used as a control. Among all types of electrodes, the electrodes with 5 wt % glass beads showed the worst performance, the magnetized electrodes with 5 wt % Sm$_2$Co$_7$ or Fe$_3$O$_4$ had the largest peak currents. For the electrodes with pure nickel hydroxide, 10 wt % iron oxide, or 5 wt % Sm$_2$Co$_7$, the magnetized electrodes showed better performance than the non-magnetized electrodes. At ambient temperature, the testing results showed that the magnetized electrodes with 5 wt % iron oxide and 5 wt % Sm$_2$Co$_7$, had 10 to 230% larger peak currents than non-magnetized electrodes with pure nickel hydroxide.

III. Electrodes Tested at Different Temperatures

A. Background

Non-magnetized and magnetized electrodes were evaluated over a range of temperatures from 25° C. to −15° C. The electrodes were coated with the following; nickel hydroxide, nickel hydroxide plus 5 wt % glass beads, nickel hydroxide plus 15 wt % Co, nickel hydroxide plus 15 wt % iron oxide, nickel hydroxide plus 15 wt % NdFeB, or nickel hydroxide plus 15 wt % Sm$_2$Co$_7$. In general, magnetic effects increased with decreasing temperature.

In the forward process, the system was cooled from 25 to −15° C. at 5° C. intervals. In the reverse process, the system was warmed back up from −15° C. to 25° C.

1. Nickel Hydroxide

Figure 18:
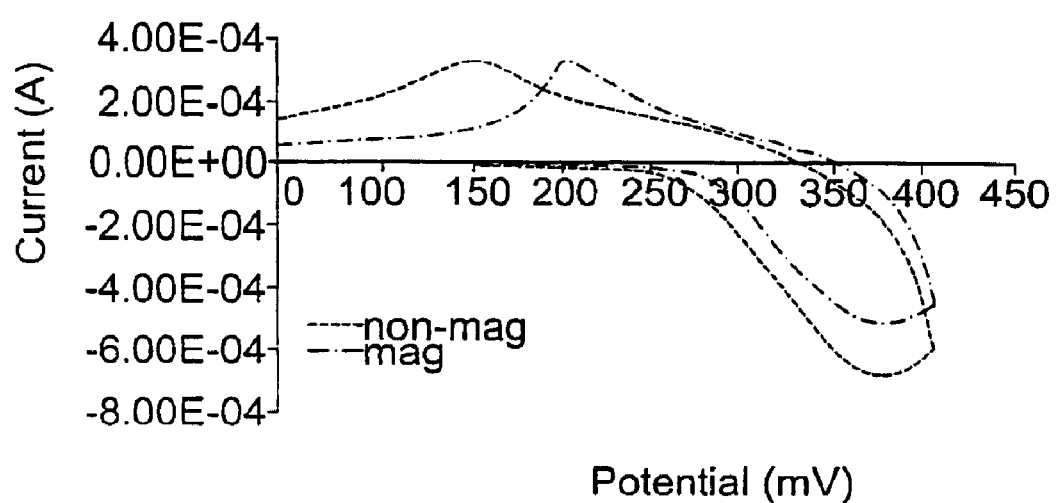
FIG. 18 shows cyclic voltammograms for magnetized and non-magnetized electrodes containing nickel hydroxide.
Figure 19:
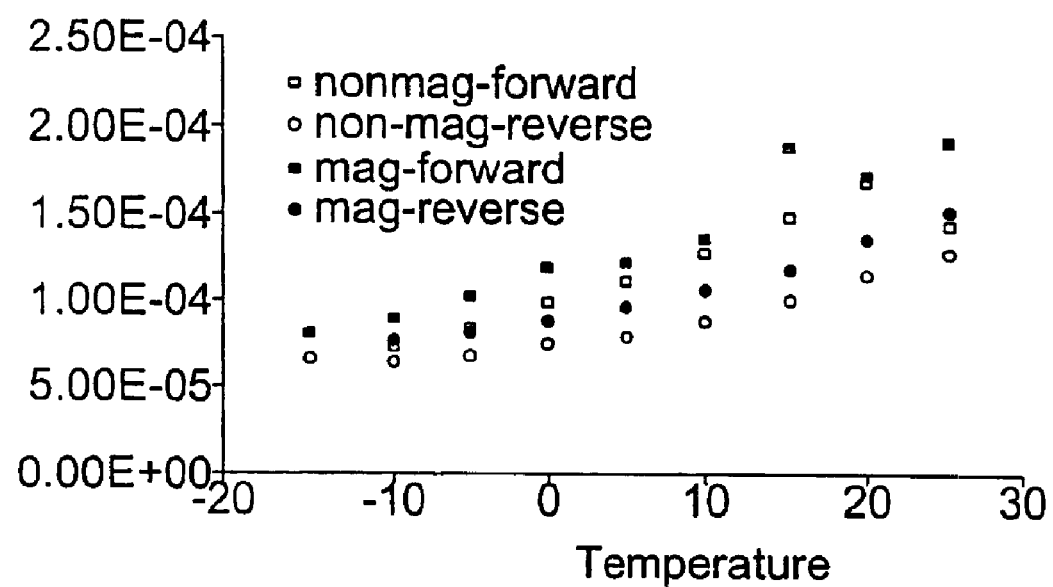
FIG. 19 shows cathodic currents for magnetized and non-magnetized electrodes containing nickel hydroxide at different testing temperatures.

The cyclic voltammograms for non-magnetized and magnetized electrodes tested at −15° C. are shown in FIG. 18. The curve shape changes at low temperature for both types of electrodes, especially for the anodic peak. The peak currents decreased when the temperature dropped FIG. 19).

Table 26 shows the cathodic peak currents ($i_p$) at different temperatures for magnetized and non-magnetized electrodes formed with 5.0 µl of slurry. For non-magnetized and magnetized electrodes, two samples were tested. At −15° C., the cathodic peak currents were 60% of that at 25° C. At each specific temperature, the peak current for the magnetized electrodes was 10 to 40 percent larger than that of the non-magnetized electrodes. During the reverse process, the peak currents increased as temperature increased, but the peak currents were smaller than that of the forward process at the same testing temperature.

TABLE 26

Cathodic Current for Magnetized and
Non-magnetized Nickel Hydroxide
at Different Testing Temperatures (v = 200 mV/sec).

| Temperature | $i_p$ (µA) | | | |
|---|---|---|---|---|
| | non-mag | | mag | |
| ° C. | forward | reverse | forward | reverse |
| 25 | 144 ± 35 | 128 ± 7.2 | 192 ± 29 | 152 |
| 20 | 168 + 32 | 115 ± 7.2 | 174 | 136 |
| 15 | 148 + 46 | 99.9 + 14 | 189 | 118 |
| 10 | 127 + 33 | 87.9 + 15 | 136 | 106 |
| 5 | 111 ± 14 | 78.7 ± 21 | 122 | 95.6 |
| 0 | 97.9 ± 4.2 | 75.3 ± 21 | 119 | 88.2 |
| −5 | 83.4 ± 13 | 67.6 ± 31 | 102 | 81.2 |
| −10 | 74.9 + 18 | 63.9 + 34 | 88.8 | 77.3 |
| −15 | 65.7 + 27 | 65.7 ± 27 | 80.9 ± 8.1 | 80.9 |

2. Nickel Hydroxide Containing 5 wt % Glass Beads

Figure 20:
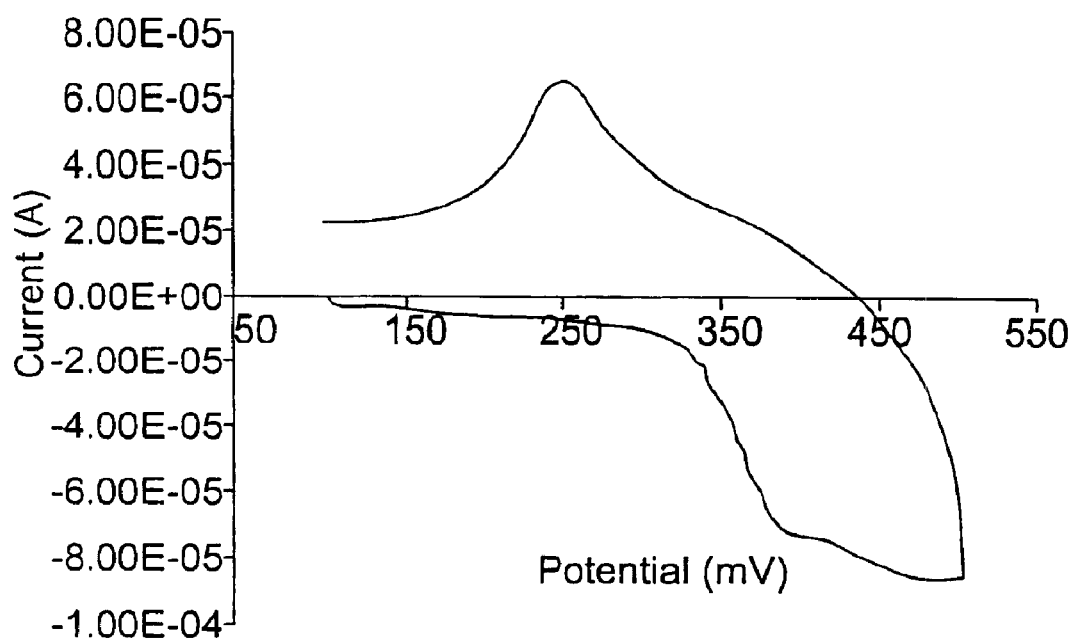
FIG. 20 shows cyclic voltammograms for non-magnetized electrodes containing nickel hydroxide and 5 wt % glass beads at −15° C.

A cyclic voltammogram for a non-magnetized electrode containing 5 wt % glass beads at −15° C. is shown in FIG. 20. The electrode performance with change of temperature is shown in Table 27. Only one sample was tested for the electrode with 5 wt % glass beads. Compared to electrodes coated only with nickel hydroxide, the peak currents of an electrode containing 5 wt % glass beads were smaller than both the non-magnetized and magnetized pure nickel hydroxide electrode at each temperature. While not wishing to be bound by theory, it is thought that the smaller currents result from the glass beads occupying volume in the film but not providing any current carrying material.

TABLE 27

Peak Currents for Non-magnetized Ni(OH)$_2$ +
GlassBead(5%) at Different
Testing Temperature (v 200 mV/sec).

| | $i_p$ (cathodic peak) (µA) | | $i_p$ (anodic peak) (µA) | |
|---|---|---|---|---|
| Temperature | forward | reverse | forward | reverse |
| 25 | 9.90 | 20.5 | −131 | −78.3 |
| 20 | 14.7 | 18.5 | −127 | −75.7 |
| 15 | 17.9 | 16.2 | −104 | −71.3 |
| 10 | 19.3 | 15.0 | −91.3 | −69.6 |
| 5 | 16.9 | 14.2 | −83.4 | −67.2 |
| 0 | 15.3 | 13.1 | −74.8 | −64.7 |
| −5 | 14.3 | 12.5 | −69.8 | −61.8 |
| −10 | 12.7 | 11.9 | −61.1 | −58.8 |
| −15 | 12.0 | 12.0 | −58.0 | −58.0 |

3. Nickel Hydroxide Containing 15 wt % Cobalt

Figure 21:
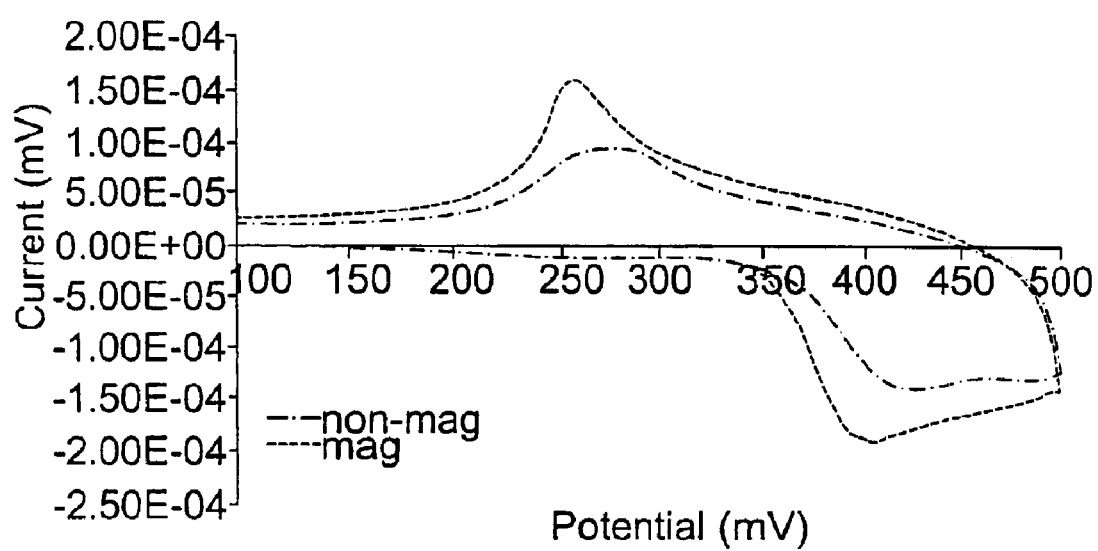
FIG. 21 shows cyclic voltammograms for magnetized and non-magnetized electrodes containing nickel hydroxide and 15 wt % cobalt at −15° C.

The cyclic voltammograms for magnetized and non-magnetized electrodes coated with nickel hydroxide containing 15 wt % cobalt tested at −15° C. are shown at FIG. 21. The electrodes tested at ambient temperature had larger and sharper peaks than electrodes tested at −15° C. At −15° C., the cyclic voltammograms for the electrode containing 15 wt % cobalt had sharper peaks than those coated only with nickel hydroxide.

Table 28 gives the cathodic peak currents for non-magnetized and magnetized electrodes containing 15 wt % cobalt. For non-magnetized electrodes, one sample was tested. For magnetized electrodes, three samples were tested.

Table 29 shows the anodic peak currents at different testing temperatures. Magnetized electrode peak currents were 30 to 100% larger than non-magnetized electrode peak currents at different temperatures compared to the cathodic peak Table 30 gives the potential difference for one sample.

TABLE 28

Cathodic Currents for Non-magnetized and Magnetized $Ni(OH)_2 + Co(15\%)$ at Different Testing Temperature (v = 200 mV/sec).

| Temperature | $i_p$ ($\mu A$) | | | |
|---|---|---|---|---|
| | non-mag | | mag | |
| ° C. | forward | reverse | forward | reverse |
| 25 | 65.8 ± 23.6 | 51.6 | 83.6 ± 22.2 | 75.4 ± 28 |
| 20 | 46.8 | 50.6 | 83.5 ± 22 | 71.6 ± 27 |
| 15 | 40.8 | 48.7 | 83.1 ± 30 | 67.1 ± 26 |
| 10 | 41.7 | 46.9 | 75.2 ± 30 | 63.5 ± 26 |
| 5 | 43.1 | 45.1 | 66.9 ± 26 | 60.5 ± 27 |
| 0 | 41.6 | 39.6 | 59.6 ± 24 | 56.5 ± 26 |
| −5 | 39.5 | 35.3 | 55.7 ± 24 | 51.3 ± 25 |
| −10 | 34.7 | 31.3 | 52.2 ± 23 | 46.6 ± 24 |
| −15 | 29.0 + 7.3 | 29.0 | 44.3 ± 24.8 | 44.3 + 24 |

TABLE 29

Average Anodic Currents for Non-magnetized and Magnetized $Ni(OH)_2 + Co(15\%)$ at Different Testing Temperature (v = 200 mV/sec).

| Temperature | $i_p$ ($\mu A$) | | | |
|---|---|---|---|---|
| | non-mag | | mag | |
| ° C. | forward | reverse | forward | reverse |
| 25 | −277 | −161 | −224 | −146 |
| 20 | −211 | −155 | −219 | −144 |
| 15 | −186 | −152 | −204 | −141 |
| 10 | −178 | −151 | −179 | −138 |
| 5 | −167 | −148 | −158 | −136 |
| 0 | −157 | −140 | −144 | −132 |
| −5 | −148 | −134 | −134 | −127 |
| −10 | −137 | −127 | −127 | −121 |
| −15 | −123 | −123 | −119 | −119 |

TABLE 30

Delta E for Non-magnetized and Magnetized $Ni(OH)_2 + Co(15\%)$ Mixture Electrode at Different Testing Temperature (v = 200 mV/sec).

| Temperature | Delta E (mV) | | | |
|---|---|---|---|---|
| | non-mag | | mag | |
| ° C. | forward | reverse | forward | reverse |
| 25 | 88 | 126 | 110 | 135 |
| 20 | 87 | 119 | 116 | 135 |
| 10 | 100 | 120 | 120 | 135 |
| 5 | 106 | 119 | 126 | 138 |
| 0 | 114 | 126 | 133 | 139 |
| −5 | 119 | 127 | 136 | 144 |
| −10 | 128 | 134 | 141 | 159 |
| −15 | 140 | 140 | 165 | 165 |

4. Nickel Hydroxide Containing Iron Oxide

Figure 22:
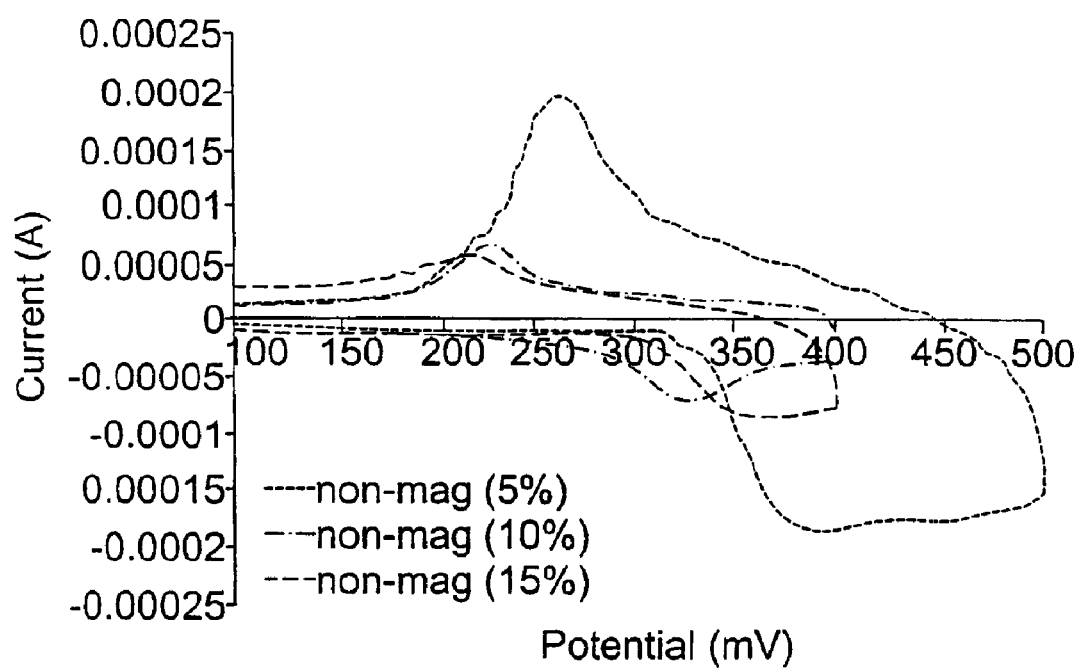
FIG. 22 shows cyclic voltammograms for non-magnetized electrodes containing 5, 10 or 15 wt % $Fe_3O_4$ at −15° C.
Figure 23:
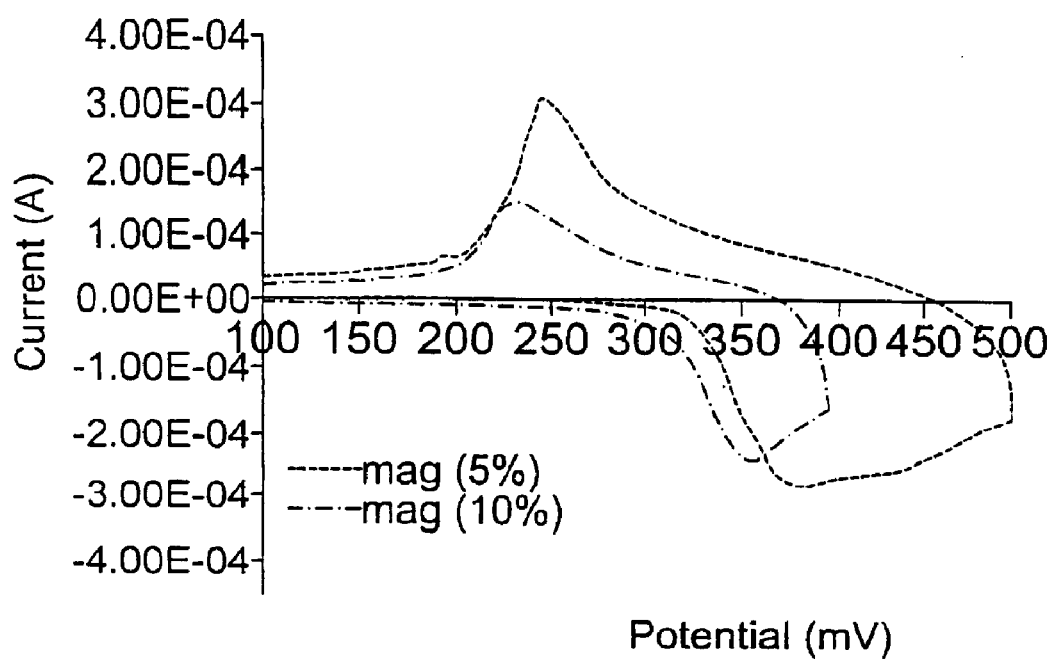
FIG. 23 shows cyclic voltammograms for magnetized electrodes containing nickel hydroxide and 5 or 10 wt % $Fe_3O_4$ at −15° C.

Cyclic voltammograms for non-magnetized electrodes containing 5, 10, or 15 wt % iron oxide tested at −15° C. are shown in FIG. 22. FIG. 23 shows the cyclic voltammograms for magnetized electrodes containing 5 and 10 wt % iron oxide tested at −15° C. The magnetized electrodes had slightly sharper peaks than the non-magnetized electrodes.

Tables 31 and Table 32 show the cathodic and anodic peak currents for both non-magnetized and magnetized electrodes containing 5 wt % iron oxide tested at different temperatures. Two samples were tested for each case. Table 33 lists the corresponding Delta E values.

Tables 34 and 35 give the cathodic peak currents, and Table 36 gives the Delta E values for electrodes containing 10 wt % iron oxide. One sample was tested for both magnetized and non-magnetized electrodes.

One sample containing 15 wt % iron oxide was tested. Peak currents for non-magnetized electrodes are listed in Tables 37 and 38, and Delta E values are in shown in Table 39. With increasing iron oxide content, the peak currents dropped for both magnetized and non-magnetized electrodes.

TABLE 31

Cathodic Currents for Non-magnetized and Magnetized $Ni(OH)_2 + 5\%\ Fe_3O_4$ at Different Testing Temperatures (v = 200 mV/sec)

| Temperature | $i_p$ ($\mu A$) | | | |
|---|---|---|---|---|
| | non-mag | | mag | |
| ° C. | forward | reverse | forward | reverse |
| 25 | 211 ± 140 | 186 ± 103 | 267 ± 43 | 233 ± 15 |
| 20 | 174 ± 20 | 169 ± 78 | 275 ± 2.1 | 220 ± 13 |
| 15 | 170 ± 91 | 156 ± 50 | 256 ± 11 | 210 ± 13 |
| 10 | 160 ± 84 | 140 ± 49 | 239 ± 1.8 | 198 ± 8.1 |
| 5 | 155 ± 76 | 130 ± 44 | 214 ± 11 | 186 ± 4.6 |
| 0 | 145 ± 66 | 122 ± 38 | 197 ± 8.8 | 171 ± 6.4 |
| −5 | 137 ± 59 | 118 ± 35 | 182 ± 12 | 161 ± 6.4 |
| −10 | 126 ± 49 | 112 ± 39 | 172 ± 3.4 | 157 ± 8.1 |
| −15 | 117 ± 41 | 117141 | 159 ± 3.9 | 159 ± 3.9 |

TABLE 32

Anodic Currents for Non-magnetized and Magnetized $Ni(OH)_2 + 5$ wt % $Fe_3O_4$ at Different Testing Temperatures (v = 200 mV/sec)

| Temperature | $i_p$ ($\mu A$) | | | | ratio | |
|---|---|---|---|---|---|---|
| | non-mag | | mag | | mag/non-mag | |
| ° C. | forward | reverse | forward | reverse | forward | reverse |
| 25 | −560 | −397 | −543 | −335 | 0.97 | 0.84 |
| 20 | −474 | −365 | −509 | −326 | 1.07 | 0.89 |
| 15 | −450 | −336 | −455 | −317 | 1.01 | 0.94 |
| 10 | −424 | −313 | −402 | −302 | 0.95 | 0.96 |
| 5 | −392 | −296 | −364 | −286 | 0.93 | 0.97 |
| 0 | −364 | −283 | −338 | −272 | 0.93 | 0.96 |
| −5 | −335 | −274 | −319 | −262 | 0.95 | 0.96 |
| −10 | −308 | −274 | −291 | −258 | 0.94 | 0.94 |
| −15 | −282 | −282 | −268 | −268 | 0.95 | 0.95 |

TABLE 33

Average Delta E for Non-magnetized and Magnetized
Ni(OH)$_2$ + 5% Fe$_3$O$_4$
at Different Testing Temperatures (v = 200 mV/sec).

| Temperature | Delta E (mV) | | | |
|---|---|---|---|---|
| | non-mag | | mag | |
| ° C. | forward | reverse | forward | reverse |
| 25 | 112 | NA | 103 | 128 |
| 20 | 124 | NA | 104 | 121 |
| 15 | 126 | NA | 108 | 121 |
| 10 | 125 | NA | 111 | 119 |
| 5 | 131 | 136 | 114 | 124 |
| 0 | 135 | 143 | 117 | 126 |
| −5 | 140 | 145 | 119 | 130 |
| −10 | 138 | 149 | 124 | 131 |
| −15 | 148 | 148 | 129 | 129 |

TABLE 34

Cathodic Currents for Non-magnetized and Magnetized
Ni(OH)$_2$ + 10%
Fe$_3$O$_4$ at Different Testing Temperatures (v = 200 mV/sec).

| Temperature | i$_p$ (µA) | | | | ratio | |
|---|---|---|---|---|---|---|
| | non-mag | | mag | | mag/non-mag | |
| ° C. | forward | reverse | forward | reverse | forward | reverse |
| 25 | 64.9 | 45.1 | 215 | 158 | 3.31 | 3.50 |
| 20 | 59.1 | 44.4 | 192 | 154 | 3.24 | 3.47 |
| 15 | 50.1 | 43.5 | 169 | 147 | 3.37 | 3.38 |
| 10 | 48.3 | 42.2 | 154 | 137 | 3.12 | 3.25 |
| 5 | 46.4 | 41.4 | 142 | 123 | 3.06 | 2.98 |
| 0 | 44.1 | 39.8 | 131 | 113 | 2.97 | 2.84 |
| −5 | 40.9 | 38.6 | 121 | 109 | 2.98 | 2.85 |
| −10 | 37.3 | 37.3 | 112 | 102 | 3.00 | 2.73 |
| −15 | 36.2 | 36.2 | 93.9 | 93.9 | 2.59 | 2.59 |

TABLE 35

Anodic Currents for Non-magnetized and Magnetized
Ni(OH)$_2$ + 5% Fe$_3$O$_4$
at Different Testing Temperatures (v = 200 mV/sec).

| Temperature | i$_p$ (µA) | | | | ratio | |
|---|---|---|---|---|---|---|
| | non-mag | | mag | | mag/non-mag | |
| ° C. | forward | reverse | forward | reverse | forward | reverse |
| 25 | −706 | −512 | −412 | −246 | 0.58 | 0.48 |
| 20 | −589 | −530 | −381 | −249 | 0.64 | 0.47 |
| 15 | −531 | −540 | −347 | −267 | 0.65 | 0.49 |
| 10 | −546 | −557 | −320 | −267 | 0.59 | 0.48 |
| 5 | −550 | −564 | −300 | −251 | 0.55 | 0.45 |
| 0 | −563 | −569 | −299 | −243 | 0.52 | 0.43 |
| −5 | −566 | −571 | −270 | −240 | 0.48 | 0.42 |
| −10 | −562 | −567 | −257 | −235 | 0.46 | 0.41 |
| −15 | −563 | −563 | −228 | −228 | 0.40 | 0.4 |

TABLE 36

Delta E for Non-magnetized and Magnetized
Ni(OH)$_2$ + 10% Fe$_3$O$_4$ at
Different Testing Temperatures (v = 200 mV/sec).

| Temperature | Delta E (mV) | | | |
|---|---|---|---|---|
| | non-mag | | mag | |
| ° C. | forward | reverse | forward | reverse |
| 25 | 90 | 74 | 97 | 100 |
| 20 | 80 | 77 | 101 | 100 |
| 15 | 85 | 78 | 991 | 100 |
| 10 | 84 | 82 | 101 | 101 |
| 5 | 86 | 85 | 103 | 106 |
| 0 | 89 | 86 | 105 | 107 |
| −5 | 91 | 92 | 106 | 106 |
| −10 | 95 | 96 | 108 | 110 |
| −15 | 98 | 98 | 111 | 111 |

TABLE 37

Cathodic Currents For Non-magnetized and Magnetized
Ni(OH)$_2$ + 15% Fe$_3$O$_4$
at Different Testing Temperatures (v = 200 mV/sec).

| Temperature | i$_p$ (µA) | |
|---|---|---|
| | non-mag | |
| ° C. | forward | reverse |
| 25 | 41.1 | 39.1 |
| 20 | 50.1 | 39.2 |
| 15 | 45.9 | 39.7 |
| 10 | 43.4 | 38.7 |
| 5 | 40.5 | 33.3 |
| 0 | 37.1 | 30.0 |
| −5 | 33.8 | 27.9 |
| −10 | 30.5 | 29.5 |
| −15 | 25.0 | 25.0 |

TABLE 38

Anodic Currents For Non-magnetized and Magnetized
Ni(OH)$_2$ + 15% Fe$_3$O$_4$
at Different Testing Temperature (v = 200 mV/sec).

| Temperature | i$_p$ (µA) | |
|---|---|---|
| | non-mag | |
| ° C. | forward | reverse |
| 25 | −145 | −85.9 |
| 20 | −134 | −84.5 |
| 15 | −115 | −84.5 |
| 10 | −106 | −82.6 |
| 5 | −97.5 | −81.7 |
| 0 | −87.7 | −77.5 |
| −5 | −82.9 | −73.7 |
| −10 | −77.6 | −71.0 |
| −15 | −69.9 | −69.9 |

TABLE 39

Delta E for Non-magnetized and Magnetized
Ni(OH)$_2$ + 15% Fe$_3$O$_4$ at
Different Testing Temperatures (v = 200 mV/sec).

| Temperature | Delta E (mV) non-mag | |
|---|---|---|
| ° C. | forward | reverse |
| 25 | 105 | 128 |
| 20 | 108 | 124 |
| 15 | 112 | 123 |
| 10 | 114 | 123 |
| 5 | 117 | 125 |
| 0 | 120 | 126 |
| −5 | 126 | 130 |
| −10 | 128 | 132 |
| −15 | 136 | 136 |

A pairwise examination of the 5 wt % Fe$_3$O$_4$ data indicates that there was a magnetic effect at −15° C. (Table 40). For average $\chi \pm s = 1.43 \pm 0.48$, the hypothesis that there was no magnetic effect is rejected at the 79% level.

TABLE 40

Pairwise Ratio of Magnetic to Nonmagnetic
Peak Currents for 5.0 μl Slurry at 200 mV/s for
Ni(OH)$_2$ and 5 wt. % Fe3O4 Electrode at −15° C.

| $i_p$ (non-mag)(μA) | $i_p$ (mag) (μA) | $\frac{i_p(\text{non-mag})}{i_p(\text{mag})}$ |
|---|---|---|
| 87.9 | 155.8 | 1.77 |
| 147.1 | 161.4 | 1.10 |
| | Average | 1.35 |
| | St. Dev. | 0.48 |

5. Nickel Hydroxide Containing NdFeB

Figure 24:
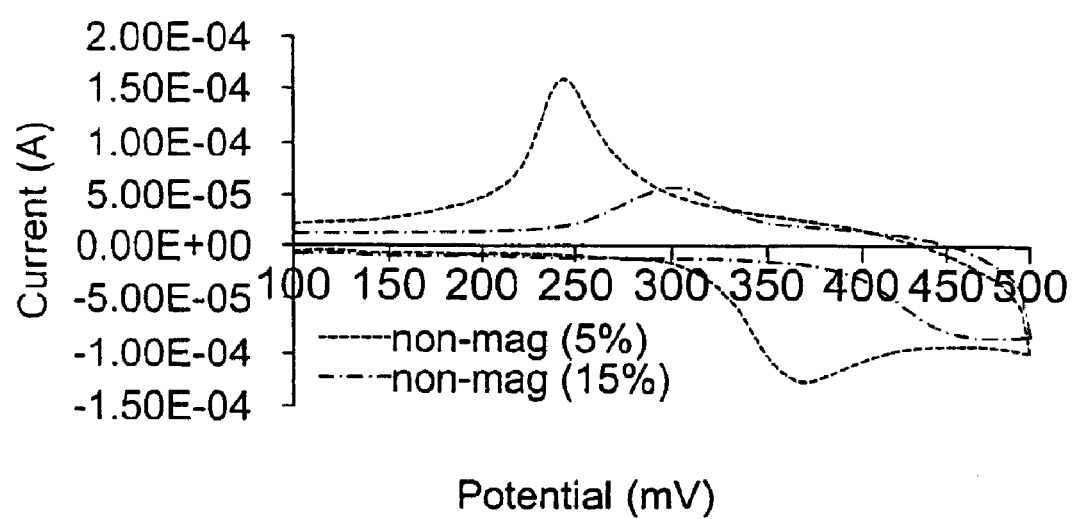
FIG. 24 shows cyclic voltammograms for non-magnetized electrodes containing nickel hydroxide and 5 or 15 wt % NdFeB at 15° C.

The cyclic voltammograms for non-magnetized electrodes coated with nickel hydroxide plus 5 or 15 wt % NdFeB tested at −15° C. are shown in FIG. 24. The cyclic voltammograms for the same electrodes tested at 25° C. have sharper peaks.

Figure 25:
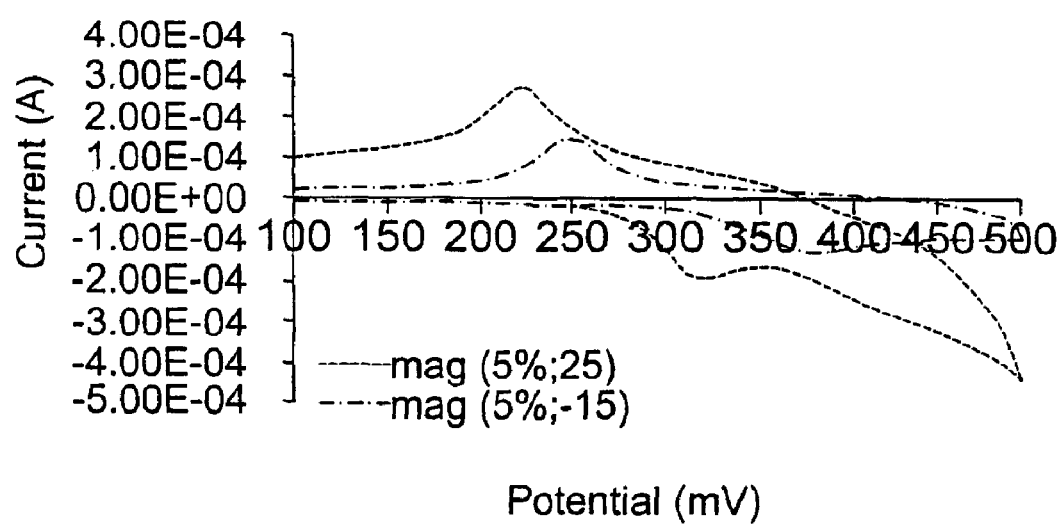
FIG. 25 shows cyclic voltammograms for magnetized electrodes containing nickel hydroxide and 5 wt % NdFeB at −15° C.

FIG. 25 shows the cyclic voltammograms for magnetized electrodes containing 5 wt % NdFeB tested at 25° C. and −15° C. Peak currents were lower and Delta E was larger at lower temperatures. The non-magnetized electrodes had sharper peaks and larger currents than the magnetized electrodes.

One sample was tested for both magnetized and non-magnetized electrodes containing 5 wt % NdFeB. Table 41 gives cathodic peak currents for non-magnetized and magnetized electrodes containing 5 wt % NdFeB tested at different temperatures.

TABLE 41

Average Cathodic Currents for Non-magnetized and Magnetized
Ni(OH)$_2$ + 5%
NdFeB Mixture Electrodes at Different Testing Temperatures
(v = 200 mV/sec).

| | $i_p$ (μA) | | | | ratio | |
|---|---|---|---|---|---|---|
| Temperature | non-mag | | mag | | mag/non-mag | |
| ° C. | forward | reverse | forward | reverse | forward | reverse |
| 25 | 169 | 186 | 138 | 162 | 0.82 | 0.87 |
| 20 | 132 | 153 | 140 | 156 | 1.06 | 1.02 |
| 15 | 155 | 188 | 136 | 149 | 0.88 | 0.79 |
| 10 | 129 | 136 | 138 | 140 | 1.07 | 1.03 |
| 5 | 157 | 168 | 136 | 132 | 0.87 | 0.79 |
| 0 | 123 | 119 | 131 | 123 | 1.07 | 1.03 |
| −5 | 147 | 148 | 125 | 116 | 0.85 | 0.78 |
| −10 | 112 | 90.4 | 115 | 109 | 1.03 | 1.20 |
| −15 | 126 | 126 | 107 | 107 | 0.85 | 0.85 |

Anodic peak currents are listed in Table 42. Compared to non-magnetized electrodes containing 5 wt % NdFeB, magnetized electrodes had lower peak currents. The cathodic peak and anodic peak currents for non-magnetized electrodes containing 15 wt % NdFeB tested at different temperatures are listed in Tables 44 and 45, respectively.

At the same testing temperature, electrodes containing 5 wt % NdFeB had larger peak currents than the electrode containing 15 wt % NdFeB. Table 43 gives Delta E values for non-magnetized and magnetized electrodes containing 5 wt % NdFeB. The Delta E for non-magnetized electrodes containing 15 wt % NdFeB is listed in Table 46. For non-magnetized and magnetized electrodes containing 5 wt % NdFeB, Delta E was about the same. For the non-magnetized electrodes, with increasing NdFeB content, Delta E increased.

TABLE 42

Average Anodic Currents for Non-magnetized and Magnetized
Ni(OH)$_2$ + 5%
NdFeB at Different Testing Temperatures (v = 200 mV/sec).

| | $i_p$ (μA) | | | | ratio | |
|---|---|---|---|---|---|---|
| Temperature | non-mag | | mag | | mag/non-mag | |
| ° C. | forward | reverse | forward | reverse | forward | reverse |
| 25 | −252 | −200 | −191 | −171 | 0.76 | 0.86 |
| 20 | −216 | −1694 | −180 | −167 | 0.83 | 1.00 |
| 15 | −227 | −212 | −167 | −161 | 0.74 | 0.76 |
| 10 | −180 | −1554 | −159 | −154 | 0.88 | 0.99 |
| 5 | −198 | −192 | −150 | −146 | 0.76 | 0.76 |
| 0 | −159 | −138 | −143 | −139 | 0.90 | 1.01 |
| −5 | −172 | −146 | −137 | −130 | 0.80 | 0.89 |
| −10 | −146 | −115 | −129 | −124 | 0.88 | 1.08 |
| −15 | −129 | −115 | −122 | −122 | 0.95 | 1.06 |

TABLE 43

Average Delta E for Non-magnetized and Magnetized
Ni(OH)$_2$ + 5% NdFeB at Different
Testing Temperatures (v = 200 mV/sec).

| | Delta E (mV) | | | |
|---|---|---|---|---|
| Temperature | non-mag | | mag | |
| ° C. | forward | reverse | forward | reverse |
| 25 | 98 | 114 | 99 | 104 |

TABLE 43-continued

Average Delta E for Non-magnetized and Magnetized Ni(OH)$_2$ + 5% NdFeB at Different Testing Temperatures (v = 200 mV/sec).

| Temperature | Delta E (mV) | | | |
|---|---|---|---|---|
| | non-mag | | mag | |
| ° C. | forward | reverse | forward | reverse |
| 20 | 99 | 103 | 99 | 106 |
| 15 | 102 | 109 | 104 | 108 |
| 10 | 103 | 109 | 108 | 114 |
| 5 | 111 | 118 | 112 | 118 |
| 0 | 111 | 117 | 118 | 122 |
| −5 | 123 | 123 | 123 | 129 |
| −10 | 125 | 130 | 130 | 136 |
| −15 | 135 | 135 | 135 | 138 |

TABLE 44

Average Cathodic Currents For Non-magnetized and Magnetized Ni(OH)$_2$ + 5% NdFeB at Different Testing Temperatures (v = 200 mV/sec).

| Temperature | $i_p$ ($\mu$A) non-mag | |
|---|---|---|
| ° C. | forward | reverse |
| 25 | 62.0 | 77.8 |
| 20 | 68.0 | 70.3 |
| 15 | 65.4 | 63.6 |
| 10 | 61.4 | 56.2 |
| 5 | 53.6 | 49.8 |
| 0 | 49.9 | 45.0 |
| −5 | 45.9 | 38.4 |
| −10 | 40.8 | 31.8 |
| −15 | 28.6 | 28.6 |

TABLE 45

Average Anodic Currents For Non-magnetized and Magnetized Ni(OH)$_2$ + 15% NdFeB at Different Testing Temperatures (v = 200 mV/sec).

| Temperature | $i_p$ ($\mu$A) non-mag | |
|---|---|---|
| ° C. | forward | reverse |
| 25 | −171 | −145 |
| 20 | −157 | −136 |
| 15 | −148 | −127 |
| 10 | −138 | −118 |
| 5 | −139 | −110 |
| 0 | −114 | −103 |
| −5 | −108 | −93.7 |
| −10 | −100 | −85.5 |
| −15 | −80.7 | −80.7 |

TABLE 46

Average Delta E For Non-magnetized Ni(OH)$_2$ + 15% NdFeB at Different Testing Temperatures (v = 200 mV/sec).

| Temperature | Delta E (mV) non-mag | |
|---|---|---|
| ° C. | forward | reverse |
| 25 | 123 | 156 |
| 20 | 130 | 161 |
| 15 | 149 | 158 |
| 10 | 155 | 156 |
| 5 | 160 | 159 |
| 0 | 157 | 158 |
| −5 | 160 | 158 |
| −10 | 158 | 161 |
| −15 | 163 | 163 |

6. Nickel Hydroxide Containing Sm$_2$CO$_7$

Figure 26:
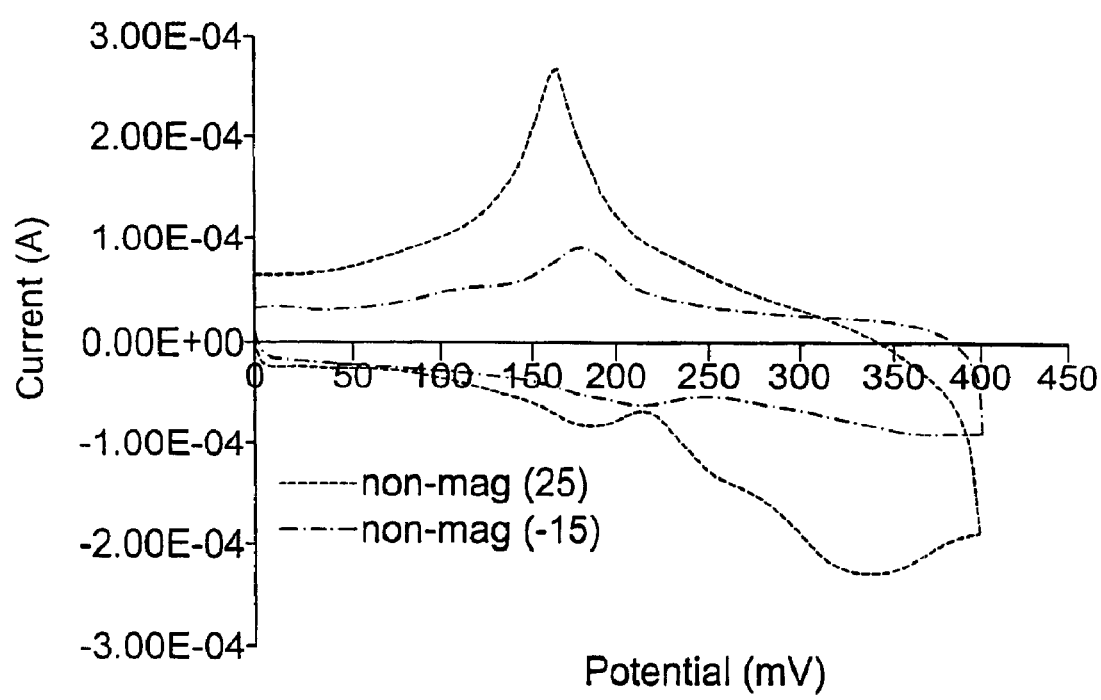
FIG. 26 shows cyclic voltammograms for non-magnetized electrodes containing nickel hydroxide and 5 wt % samarium cobalt at −15° C.
Figure 27:
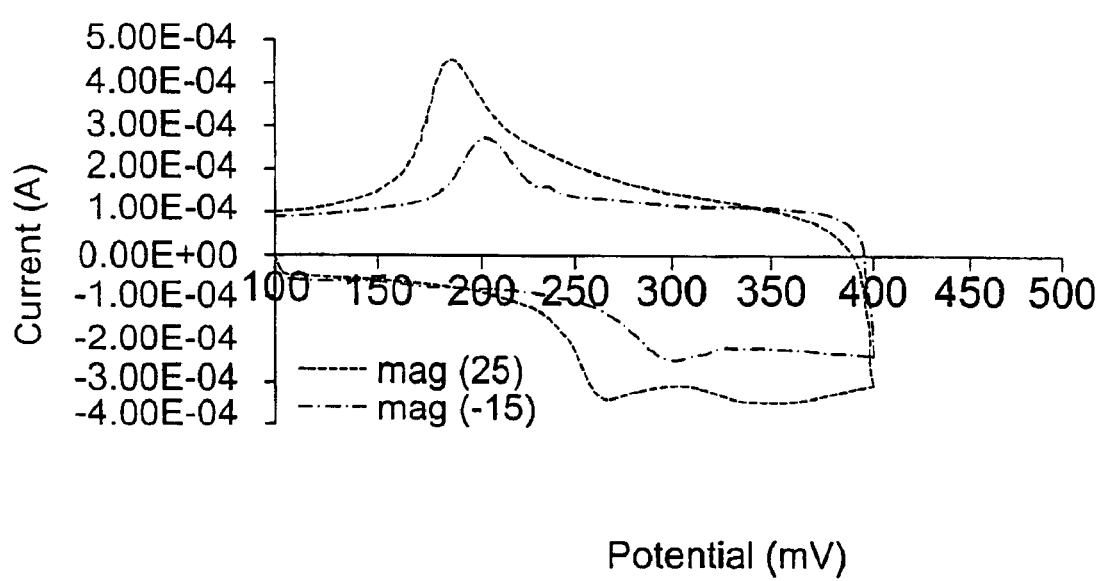
FIG. 27 shows cyclic voltammograms for magnetized electrodes containing nickel hydroxide and 5 wt % samarium cobalt at −15° C.

Cyclic voltammograms for non-magnetized and magnetized electrodes containing 5 wt % Sm$_2$Co$_7$ tested at 25° C. and −15° C. are shown in FIGS. 26 and 27, respectively. The cathodic and anodic peak currents for non-magnetized and magnetized electrodes containing 5 wt % uncoated Sm$_2$Co$_7$ are listed in Tables 47 and 48, respectively. Two samples were tested for each case.

Compared to the magnetized electrode coated only with nickel hydroxide, the magnetized electrodes containing 5 wt % Sm$_2$Co$_7$ had 74% larger cathodic peak currents and 130% larger currents than the nonmagnetized electrodes. Delta E for electrodes containing 5 wt % Sm$_2$Co$_7$ is listed in Table 49. Delta E for the magnetized electrodes is 20 to 30 mV less than for the nonmagnetized electrodes.

Tables 50 and 51 give the cathodic peak and anodic peak currents for non-magnetized electrodes containing 10 wt % uncoated Sm$_2$Co$_7$. One sample was tested for the electrodes containing 10 wt % Sm$_2$Co$_7$. Compared to the non-magnetized electrodes containing 5 wt % Sm$_2$CO$_7$, the electrodes containing 10 wt % Sm$_2$CO$_7$ showed better performance at different testing temperatures.

Table 52 gives the Delta E for the non-magnetized electrodes containing 10 wt % Sm$_2$CO$_7$. The non-magnetized electrodes containing 10 wt % Sm$_2$Co$_7$ had smaller Delta E's than non-magnetized electrodes containing 5 wt % Sm$_2$Co$_7$.

TABLE 47

Average Cathodic Currents for Non-magnetized and Magnetized Ni(OH)$_2$ + 5% Sm$_2$Co$_7$ at Different Testing Temperatures (v = 200 mV/sec).

| Temperature | $i_p(\mu A)$ | | | |
|---|---|---|---|---|
| | non-mag | | mag | |
| ° C. | forward | reverse | forward | reverse |
| 25 | 122 ± 76 | 130 ± 32 | 334 ± 161 | 280 ± 168 |
| 20 | 130 ± 71 | 128 ± 31 | 317 ± 147 | 257 ± 135 |
| 15 | 128 ± 62 | 124 ± 32 | 275 ± 109 | 243 ± 113 |
| 10 | 126 ± 58 | 119 ± 36 | 258 ± 108 | 223 ± 88 |
| 5 | 119 ± 51 | 108 ± 32 | 234 ± 86 | 206 ± 65 |
| 0 | 109 ± 45 | 96.4 ± 33 | 209 ± 62 | 169 ± 55 |
| −5 | 97.1 ± 40 | 87.0 ± 34 | 193 ± 43 | 171 ± 26 |
| −10 | 88.1 ± 37 | 79.4 ± 33 | 177 ± 38 | 155 ± 14 |
| −15 | 76.0 ± 36 | 76.0 ± 36 | 149 ± 2.8 | 149 ± 2.8 |

TABLE 48

Average Anodic Currents for Non-magnetized and Magnetized Ni(OH)$_2$ + 5% Sm$_2$Co$_7$ at Different Testing Temperatures (v = 200 mV/sec).

| Temperature | $i_p$ ($\mu$A) | | | |
|---|---|---|---|---|
| | non-mag | | mag | |
| °C. | forward | reverse | forward | reverse |
| 25 | −356 | −262 | −554 | −333 |
| 20 | −319 | −203 | −397 | −334 |
| 15 | −284 | −185 | −494 | −345 |
| 10 | −271 | −176 | −436 | −374 |
| 5 | −251 | −196 | −408 | −358 |
| 0 | −236 | −162 | −413 | −312 |
| −5 | −195 | −187 | −353 | −331 |
| −10 | −203 | −184 | −370 | −300 |
| −15 | −188 | −188 | −299 | −299 |

TABLE 49

Average Delta E for Non-magnetized and Magnetized Ni(OH)$_2$ + 5% Sm$_2$Co$_7$ at Different Testing Temperatures (v = 200 mV/sec).

| Temperature | Delta E (mV) | | | |
|---|---|---|---|---|
| | non-mag | | mag | |
| °C. | forward | reverse | forward | reverse |
| 25 | 95 | 126 | 87 | 89 |
| 20 | 100 | 134 | 86 | 89 |
| 15 | 106 | 131 | 88 | 92 |
| 10 | 107 | 126 | 91 | 92 |
| 5 | 115 | 131 | 93 | 92 |
| 0 | 117 | 126 | 93 | 103 |
| −5 | 120 | 151 | 96 | 97 |
| −10 | 131 | 135 | 100 | 103 |
| −15 | 132 | 132 | 103 | 103 |

TABLE 50

Average Cathodic Currents For Non-magnetized Ni(OH)$_2$ + 10% Sm$_2$Co$_7$ at Different Testing Temperatures (v = 200 mV/sec).

| Temperature | $i_p$ ($\mu$A) | |
|---|---|---|
| | non-mag | |
| °C. | forward | reverse |
| 25 | 176 | 141 |
| 20 | 161 | 143 |
| 15 | 157 | 143 |
| 10 | 152 | 144 |
| 5 | 153 | 142 |
| 0 | 150 | 140 |
| −5 | 146 | 137 |
| −10 | 138 | 134 |
| −15 | 132 | 132 |

TABLE 51

Average Cathodic Currents For Non-magnetized Ni(OH)$_2$ + 10% Sm$_2$Co$_7$ at Different Testing Temperatures (v = 200 mV/sec).

| Temperature | $i_p$ ($\mu$A) | |
|---|---|---|
| | non-mag | |
| °C. | forward | reverse |
| 25 | −191 | −162 |
| 20 | −16 | −163 |
| 15 | −166 | −164 |
| 10 | −163 | −164 |
| 5 | −164 | −163 |
| 0 | −162 | −162 |
| −5 | −163 | −160 |
| −10 | −161 | −158 |
| −15 | −157 | −157 |

TABLE 52

Average Delta E for Non-magnetized Ni(OH)$_2$ + 10% Sm$_2$Co$_7$ at Different Testing Temperatures (v = 200 mV/sec).

| Temperature | Delta E (mV) | |
|---|---|---|
| | non-mag | |
| °C. | forward | reverse |
| 25 | 81 | 78 |
| 20 | 81 | 81 |
| 15 | 83 | 83 |
| 10 | 87 | 85 |
| 5 | 88 | 89 |
| 0 | 92 | 91 |
| −5 | 93 | 93 |
| −10 | 97 | 98 |
| −15 | 99 | 99 |

A pairwise examination of the 5% Sm$_2$Co$_7$ data indicates that there was a magnetic effect at −15° C. (Table 53). For average $\chi$=2.20±1.00, the hypothesis that there was no magnetic effect is rejected at the 84% level.

TABLE 53

Pairwise Ratio of Magnetic to Nonmagnetic Peak Currents for 5.0 $\mu$l Slurry at 200 mV/s for Ni(OH)$_2$ and 5 Wt % Sm$_2$Co$_7$ Electrode at −15° C.

| $i_p$ (non-mag) ($\mu$A) | $i_p$ (mag) ($\mu$A) | $\frac{i_p(\text{non-mag})}{i_p (\text{mag})}$ |
|---|---|---|
| 50.6 | 147 | 2.91 |
| 101.4 | 151 | 1.49 |
| | Average | 2.20 |
| | St. Dev. | 1.00 |

B. Results

Electrode performances were tested at different temperatures. Electrodes were coated with the following: nickel hydroxide, nickle hydroxide with 5 wt % glass beads, nickle hydroxide with 15 wt % Co, nickle hydroxide with iron oxide, nickle hydroxide with NdFeB, or nickle hydroxide with Sm$_2$Co$_7$. The electrode with 5 wt % glass beads was used as a control.

Peak currents decreased with decreasing temperature. For magnetized electrodes, peak currents decreased less than for non-magnetized electrodes. At −15° C., magnetized electrodes typically showed better performance than non-magnetized electrodes.

III. Observations

The above results show that magnetic fields affect nickel hydroxide electrode performance. For electrodes coated only with nickel hydroxide, magnetized electrodes performed better than non-magnetized electrodes.

The cathodic peak currents with pairwise analysis data for electrodes tested at ambient temperature and −15° C. are listed in Tables 54 and 55, respectively. When the solution temperature decreases from 25 to −15° C. at intervals of 5° C., the peak currents got smaller; the peak currents at −15° C. are ~50 to 60% of the peak currents at 25° C. for both types of electrodes. When the temperature was increased from −15° C. to 25° C., the peak currents got larger, but the peak currents over the reverse process were smaller than the peak currents over the forward process for the same testing temperature. While not wishing to be bound by theory, it is thought that this could be due to a structure change at lower temperatures that is irreversible at higher temperatures. For both magnetized and non-magnetized electrodes coated only with nickel hydroxide, the peak currents increased with increasing scan rates.

cobalt powder, the performance of both types of electrodes was worse than that of the electrodes coated with only nickel hydroxide.

For the electrodes with different amounts of silane coated iron oxide and silane coated neodymium iron boron, the peak currents of the magnetized and non-magnetized electrodes decreases with the increasing iron oxide or neodymium iron boron content.

For the electrode with 5 wt % neodymium iron boron, the magnetized electrode had lower peak currents than the non-magnetized electrode, but for the electrodes having the same amount of iron oxide, the magnetized electrodes showed better performance than the non-magnetized electrodes.

The magnetized electrodes with 5 wt % iron oxide had better performance than the non-magnetized electrodes coated only with nickel hydroxide. At low testing temperatures, the magnetized and non-magnetized electrodes with 5 wt % iron oxide, and the magnetized and non-magnetized electrode with 5 wt % NdFeB showed better performance than the electrodes coated only with nickel hydroxide.

TABLE 54

Cathodic Currents for Non-magnetized and Magnetized Electrodes Tested at Ambient Temperatures (v = 200 mV/sec).

| | $i_p$ ($\mu$A) | | ratio | |
|---|---|---|---|---|
| | non-mag | mag | mag/non-mag | mag/non-mag($N_iOH$)$_2$ |
| Ni(OH)2 | 144 ± 36 | 192 ± 29 | 1.25 ± 0.16[a] | 133 ± 0.39 |
| Ni(OH)$_2$ + 5 wt % Glass Beads | 9.9 ± 8.8 | NA | | |
| Ni(OH)$_2$ + 5 wt % Co | 65.8 ± 23.6 | 83.6 ± 22.2 | 1.27 ± 0.57 | 0.58 ± 0.21 |
| Ni(OH)$_2$ + 5 wt % Fe$_3$O$_4$ | 211 + 140 | 267 ± 43.8 | 1.71 ± 0.83[a] | 1.85 + 0.55 |
| Ni(OH)$_2$ + 10 wt % Fe$_3$O | 64.9 ± 14.1 | 15 ± 6.4 | 3.31 ± 0.73 | 1.49 +0.37 |
| Ni(OH)$_2$ + 15 wt % Fe$_3$O$_4$ | 41.1 ± 13.5 | ~0 | | |
| Ni(OH)$_2$ + 5 wt % NdFeB | 169 ± 45 | 138 ± 31 | 0.82 ± 0.28 | 0.95 ± 0.3 |
| Ni(OH)$_2$ + 15 wt % NdFeB | 62.0 ± 9.9 | ~0 | | |
| Ni(OH)$_2$ + 5 wt % Sm$_2$Co$_7$ | 122 ± 32 | 34 ± 162 | 2.63 ± 0.12[a] | 2.32 ± 1.24 |
| Ni(OH)$_2$ + 10 wt % Sm$_2$Co$_7$ | 176 ± 49 | | | |

[a]These values were calculated from the pairwise analysis data, not the average data.

TABLE 55

Cathodic Currents for Non-magnetized and Magnetized Electrodes Tested at −15° C. (v = 200 mV/sec).

| | $i_p$ ($\mu$A) | | ratio | |
|---|---|---|---|---|
| | non-mag | mag | mag/non-mag | mag/non-mag($N_iOH$)$_2$ |
| Ni(OH)$_2$ | 65.7 ± 27 | 80.9 ± 8.1 | 1.23 ± 0.52 | 1.23 ± 0.52 |
| Ni(OH)$_2$ + 5 wt % Glass Beads | 2.0 ± 6.4 | NA | | |
| Ni(OH)$_2$ + 5 wt % Co | 29.0 ± 7.3 | 44.3 ± 24.8 | 1.53 ± 0.94 | 0.67 ± 0.46 |
| Ni(OH)$_2$ + 5 wt % Fe$_3$O$_4$ | 117 + 41 | 159 ± 3.96 | 1.35 ± 0.48[a] | 2.42 + 1.00 |
| Ni(OH)$_2$ + 10 wt % Fe$_3$O$_4$ | 36.2 ± 7.2 | 93.9 ± 68.3 | 2.59 ± 1.96 | 1.43 +1.18 |
| Ni(OH)$_2$ + 15 wt % Fe$_3$O$_4$ | 25.0 ± 7.7 | ~0 | | |
| Ni(OH)$_2$ + 5 wt % NdFeB | 126 ± 30.5 | 107 ± 13.5 | 0.85 ± 0.23 | 1.63 ± 0.70 |
| Ni(OH)$_2$ + 15 wt % NdFeB | 28.6 ± 3.9 | ~0 | | |
| Ni(OH)$_2$ + 5 wt % Sm$_2$Co$_7$ | 76.0 ± 35.8 | 149 ± 3.0 | 2.20 ± 1.00[a] | 2.27 ± 0.93 |
| Ni(OH)$_2$ + 10 wt % Sm$_2$Co$_7$ | 132 ± 26 | ~0 | | |

[a]These values were calculated from the pairwise analysis data, not the average data.

In the forward process, the system was cooled from 25 to −15° C. at 5° C. intervals. In the reverse process, the system was warmed back up from −15° C. to 25° C. Compared to electrodes containing 5 wt % glass beads, all other electrodes have better performance. Glass beads are not conductive and magnetizable, and they increase the resistance of the film. For the electrode of nickel hydroxide with 15 wt %

For the electrodes with 5 or 10 wt % samarium cobalt, the performance of the non-magnetized electrode gets better with increasing samarium cobalt content. The magnetized electrode containing 5 wt % of samarium cobalt had better performance than the non-magnetized electrode.

The above results are basically consistent with the magnetic materials magnetic energy product. As the magnetic energy product increases, films are more difficult to form because the particles agglomerate. Thus, there is a trade off between the amount of magnetic material and the magnetic energy product.

The results show that different magnetic materials have different effects on electrode performance. Electrodes coated only with nickel hydroxide have a relatively small magnetic energy product. While not wishing to be bound by theory, it is thought that in the presence of an external magnetic field during film casting and drying, the magnet modifies the film configuration, improving electrode performance.

From the analysis of the thickness data, at the 99.5% confidence level, it appears that the magnetization of electrodes coated only with nickel hydroxide enhances the cathodic currents. For the electrodes coated with relatively high contents of coated iron oxide and coated neodymium iron boron, the magnetized electrode performance is worse than the non-magnetized electrodes. While not wishing to be bound by theory, it is thought that this could be the result of the higher magnetic energy products of these materials.

For electrodes coated with nickel hydroxide and 5 wt % other magnetizable particles, the electrode performance is enhanced compared to electrodes coated only with nickel hydroxide. This is more pronounced at low temperatures. From the data, it appears that magnetized electrodes with relatively low concentrations of cobalt, coated iron oxide, neodynium iron boron, and uncoated samarium cobalt have better performance than the non-magnetized electrodes and better performance than electrodes coated only with nickel hydroxide.

While not wishing to be bound by theory, it is thought that the reaction proceeds faster in the presence of a magnetic field, which suggests higher rates for nickel metal hydride batteries charge and discharge. The higher peak currents for magnetized electrodes also means that battery resistance is reduced with magnetic field and could increase batteries capacity and working potential.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An electrode comprising: (i) a substrate having at least one surface and comprising a conductive material; and (ii) a plurality of magnetizable particles on said surface,
   wherein said magnetizable particles have been exposed to a magnetic field of sufficient strength for a sufficient time to align the magnetic moments of a portion of atoms within a majority of said particles and wherein said alignment is maintained upon removal of said magnetic field, and
   further wherein said portion of atoms aligned within each of said particles is sufficient to alter the rate of a chemical reaction involving said particle or occurring within the vicinity of said particle and/or the distribution of products resulting from a chemical reaction involving said particle or occurring within the vicinity of said particle.

2. The electrode of claim 1, wherein each of said magnetizable particles comprises a permanent magnetic material.

3. The electrode of claim 1, wherein each of said magnetizable particles comprises a paramagnetic material.

4. The electrode of claim 1, wherein each of said magnetizable particles comprises a superparamagnetic material.

5. The electrode of claim 1, wherein each of said magnetizable particles comprises a ferromagnetic material.

6. The electrode of claim 1, wherein each of said magnetizable particles comprises a ferrimagnetic material.

7. The electrode of claim 1, wherein each of said magnetizable particles comprises a superconducting material.

8. The electrode of claim 1, wherein each of said magnetizable particles comprises an anti-ferromagnetic material.

9. The electrode of claim 1, wherein said chemical reaction involves transfer of at least one subatomic particle.

10. The electrode of claim 1, wherein each of said magnetizable particles has a diameter of about 0.1 microns to about 10 microns.

11. The electrode of claim 1, wherein each of said magnetizable particles comprises at least one material selected from the group consisting of samarium cobalt, neodynium-iron-boron, iron and iron oxide, nickel, cobalt, zinc, misch metal, and ceramic magnets comprising barium ferrite and/or strontium ferrite.

12. The electrode of claim 1, wherein each of said magnetizable particles comprises at least one material selected from the group consisting of nickel hydroxide, nickel oxy hydroxide, zinc hydroxide, cobalt oxide, manganese oxide, lithium carbonate, and lithium hydroxide.

13. The electrode of claim 1, wherein each of said magnetizable particles has at least one coating layer on at least a portion of the surface thereof.

14. The electrode of claim 13, wherein said at least one coating layer comprises at least one of substituted polystyrene, unsubstituted polystyrene, and silane.

15. The electrode of claim 1, wherein said magentizable particle has a plurality of coating layers on at least a portion of the surface thereof.

16. The electrode of claim 1, further comprising an effective amount of at least one binder.

17. The electrode of claim 1, further comprising an effective amount of at least on gelling agent.

18. The electrode of claim 1, wherein each of said magnetizable particles comprises at least one ferromagnetic material selected from the group consisting of iron, nickel, cobalt, dysprosium, and gadolinium.

19. The electrode of claim 1, further comprising at least one permanent magnetic particle, wherein said permanent magnetic particle has a magnetic field of sufficient strength to maintain the alignment of the magnetic moments of a portion of atoms within said magnetizable particle.

20. The electrode of claim 19, wherein said permanent magnetic particle comprises at least one material selected from the group consisting of samarium cobalt, neodynium-iron-boron, iron and iron oxide, cobalt, misch metal, and ceramic magnets comprising barium ferrite and/or strontium ferrite.

21. An electrode comprising a plurality of magnetizable particles and a plurality of permanent magnetic particles, wherein said permanent magnetic particles have a magnetic field of sufficient strength to align the magnetic moments of a portion of atoms within said magentizable particles sufficient to alter the rate of and/or distribution of products resulting from a chemical reaction involving one or more of said magnetizable particles and/or said permanent magnetic particles or occurring within the vicinity of one or more of said magnetizable particles and/or said permanent magnetic particles.

22. An electrode comprising a plurality of magnetizable particles, wherein said magnetizable particles have been exposed to a magnetic field of sufficient strength to align the magnetic moments of a portion of atoms within said magentizable particles sufficient to alter the distribution of products resulting from a chemical reaction involving one or more of said magnetizable particles or occurring within the vicinity of one or more of said magnetizable particles.

23. The electrode of claim 21 or 22, wherein each of said magnetizable particles comprises a paramagnetic material.

24. The electrode of claim 21 or 22, wherein each of said magnetizable particles comprises a superparamagnetic material.

25. The electrode of claim 21 or 22, wherein each of said magnetizable particles comprises a ferromagnetic material.

26. The electrode of claim 21 or 22, wherein each of said magnetizable particles comprises a ferrimagnetic material.

27. The electrode of claim 21 or 22, wherein each of said magnetizable particles comprises a superconducting material.

28. The electrode of claim 21 or 22, wherein each of said magnetizable particles comprises an anti-ferromagnetic material.

29. The electrode of claim 21 or 22, wherein said chemical reaction involves the flux of a solute through a composite containing a plurality of said magnetizable particles.

30. The electrode of claim 21 or 22, wherein said chemical reaction involves mass transport.

31. The electrode of claim 21 or 22, wherein said chemical reaction involves transfer of at least one subatomic particle.

32. The electrode of claim 21 or 22, wherein each of said magnetizable particles has a diameter of about 0.1 microns to about 10 microns.

33. The electrode of claim 21 or 22, wherein each of said magnetizable particles comprises at least one material selected from the group consisting of samarium cobalt, neodynium-iron-boron, iron and iron oxide, nickel, cobalt, zinc, misch metal, and ceramic magnets comprising barium ferrite and/or strontium ferrite.

34. The electrode of claim 21 or 22, wherein each of said magnetizable particles comprises at least one material selected from the group consisting of nickel hydroxide, nickel oxy hydroxide, zinc hydroxide, cobalt oxide, manganese oxide, lithium carbonate, and lithium hydroxide.

35. The electrode of claim 21 or 22, wherein each of said magnetizable particles has at least one coating layer on at least a portion of the surface thereof.

36. The electrode of claim 35, wherein said at least one coating layer comprises at least one of substituted polystyrene, unsubstituted polystyrene, and silane.

37. The electrode of claim 21 or 22, wherein each of said magnetizable particles has a plurality of coating layers on at least a portion of the surface thereof.

38. The electrode of claim 21, wherein said permanent magnetic particles have at least one coating layer on at least a portion of the surface thereof.

39. The electrode of claim 38, wherein said at least one coating layer comprises at least one of substituted polystyrene, unsubstituted polystyrene, and silane.

40. The electrode of claim 21, wherein said permanent magnetic particles have a plurality of coating layers on at least a portion of the surface thereof.

41. The electrode of claim 21 or 22, further comprising an effective amount of at least one binder.

42. The electrode of claim 21 or 22, further comprising an effective amount of at least one gelling agent.

43. The electrode of claim 21 or 22, wherein each of said magnetizable particles comprises at least one ferromagnetic material selected from the group consisting of iron, nickel, cobalt, dysprosium, and gadolinium.

44. The electrode of claim 21, wherein said permanent magnetic particle comprises at least one material selected from the group consisting of samarium cobalt, neodynium-iron-boron, iron and iron oxide, cobalt, misch metal, and ceramic magnets comprising barium ferrite and/or strontium ferrite.

45. The electrode of claim 21, wherein said permanent magnetic particles have at least one coating layer on at least a portion of the surface thereof.

46. The electrode of claim 45, wherein said at least one coating layer comprises at least one of substituted polystyrene, unsubstituted polystyrene, and silane.

47. The electrode of claim 21, wherein said permanent magnetic particles have a plurality of coating layers on at least a portion of the surface thereof.

48. The electrode of claim 21, wherein said permanent magnetic particles have a diameter of about 0.1 microns to about 10 microns.

49. The electrode of claim 16, wherein said binder comprises at least one of polymers, starches, fatty acids, and liposomes.

50. The electrode of claim 17, wherein said gelling agent is selected from the group consisting of carboxymethycellulose, polyacrylic acid, and, sodium polyacrylate.

51. The electrode of claim 41, wherein said binder comprises at least one of polymers, starches, fatty acids, and liposomes.

52. The electrode of claim 42, wherein said gelling agent is selected from the group consisting of carboxymethycellulose, polyacrylic acid, and, sodium polyacrylate.

53. A composition of matter, comprising a plurality of magnetizable particles, wherein the magnetizable particles have been exposed to a magnetic field of sufficient strength to align the magnetic moments of a portion of atoms within the magnetizable particles sufficient to alter the distribution of products resulting from a chemical reaction involving the magnetizable particles or occurring within the vicinity of the magnetizable particles.

54. A composition of matter comprising a plurality of magnetizable particles in a binder, wherein the magnetizable particles have been exposed to a magnetic field of sufficient strength to align the magnetic moments of a portion of atoms within the magnetizable particles sufficient to alter the distribution of products resulting from a chemical reaction involving the magnetizable particles or occurring within the vicinity of the magnetizable particles.

55. A composition of matter comprising a plurality of magnetic particles, wherein a portion of atoms within the magnetic particles have magnetic moments aligned sufficient to alter the distribution of products resulting from a chemical reaction involving the magnetic particles or occurring within the vicinity of the magnetic particles.

56. A composition of matter comprising a plurality of magnetic particles in a binder, wherein a portion of atoms within the magnetic particles have magnetic moments aligned sufficient to alter the distribution of products resulting from a chemical reaction involving the magnetic particles or occurring within the vicinity of the magnetic particles.

* * * * *